(12) United States Patent
Dooley et al.

(10) Patent No.: US 8,452,450 B2
(45) Date of Patent: May 28, 2013

(54) APPLICATION OF LOCALIZATION, POSITIONING AND NAVIGATION SYSTEMS FOR ROBOTIC ENABLED MOBILE PRODUCTS

(75) Inventors: Michael Dooley, Pasadena, CA (US); Paolo Pirjanian, Glendale, CA (US); Nikolai Romanov, Oak Park, CA (US); Lihu Chiu, Arcadia, CA (US); Enrico Di Bernardo, Glendora, CA (US); Michael Stout, Rancho Palos Verdes, CA (US); Gabriel Brisson, Pasadena, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 843 days.

(21) Appl. No.: 12/429,963

(22) Filed: Apr. 24, 2009

(65) Prior Publication Data

US 2009/0281661 A1    Nov. 12, 2009

Related U.S. Application Data

(60) Provisional application No. 61/125,684, filed on Apr. 24, 2008.

(51) Int. Cl.
*A47L 11/00* (2006.01)
*B25J 5/00* (2006.01)
*G05D 3/00* (2006.01)
*G06F 19/00* (2011.01)
*B60L 11/00* (2006.01)

(52) U.S. Cl.
USPC ............ 700/258; 700/245; 700/260; 901/46

(58) Field of Classification Search
USPC ............... 318/568.12; 700/245–264; 901/46, 901/50
See application file for complete search history.

(56) References Cited

U.S. PATENT DOCUMENTS 5,440,216 A    8/1995    Kim
5,720,077 A    2/1998    Nakamura et al.
(Continued)

FOREIGN PATENT DOCUMENTS

WO    WO 01/91623 A2    12/2001
WO    WO 01/91624 A2    12/2001

OTHER PUBLICATIONS

European Patent Office; Notification of Transmittal of the International Search Report and the Written opinion of the International Searching Authority, or the Declaration, the International Search Report, and the Written Opinion of the International Searching Authority; Sep. 10, 2009; Rijswijk, The Netherlands.
(Continued)

*Primary Examiner* — Khoi Tran
*Assistant Examiner* — Dale Moyer
(74) *Attorney, Agent, or Firm* — Knobbe Martens Olson & Bear LLP

(57) ABSTRACT

A robotic cleaner includes a cleaning assembly for cleaning a surface and a main robot body. The main robot body houses a drive system to cause movement of the robotic cleaner and a microcontroller to control the movement of the robotic cleaner. The cleaning assembly is located in front of the drive system and a width of the cleaning assembly is greater than a width of the main robot body. A robotic cleaning system includes a main robot body and a plurality of cleaning assemblies for cleaning a surface. The main robot body houses a drive system to cause movement of the robotic cleaner and a microcontroller to control the movement of the robotic cleaner. The cleaning assembly is located in front of the drive system and each of the cleaning assemblies is detachable from the main robot body and each of the cleaning assemblies has a unique cleaning function.

18 Claims, 32 Drawing Sheets

U.S. PATENT DOCUMENTS

| | | | |
|---|---|---|---|
| 5,815,880 A | 10/1998 | Nakanishi | |
| 5,841,259 A | 11/1998 | Kim et al. | |
| 5,894,621 A | 4/1999 | Kubo | |
| 5,940,927 A | 8/1999 | Haegermarck et al. | |
| 5,959,423 A | 9/1999 | Nakanishi et al. | |
| 5,991,951 A | 11/1999 | Kubo et al. | |
| 5,998,953 A | 12/1999 | Nakamura et al. | |
| 6,012,618 A | 1/2000 | Matsuo | |
| 6,076,025 A | 6/2000 | Ueno et al. | |
| 6,119,057 A | 9/2000 | Kawagoe | |
| 6,142,252 A | 11/2000 | Kinto et al. | |
| 6,327,741 B1 | 12/2001 | Reed | |
| 6,338,013 B1 | 1/2002 | Ruffner | |
| 6,459,955 B1 | 10/2002 | Bartsch et al. | |
| 6,481,515 B1 | 11/2002 | Kirkpatrick et al. | |
| 6,580,246 B2 | 6/2003 | Jacobs | |
| 6,741,054 B2 | 5/2004 | Koselka et al. | |
| 6,771,217 B1 | 8/2004 | Liu et al. | |
| 6,779,217 B2* | 8/2004 | Fisher | 15/98 |
| 6,901,624 B2 | 6/2005 | Mori et al. | |
| 6,938,298 B2 | 9/2005 | Aasen | |
| 7,013,528 B2 | 3/2006 | Parker et al. | |
| 7,015,831 B2 | 3/2006 | Karlsson et al. | |
| 7,113,847 B2 | 9/2006 | Chmura et al. | |
| 7,135,992 B2 | 11/2006 | Karlsson et al. | |
| 7,145,478 B2 | 12/2006 | Goncalves et al. | |
| 7,162,338 B2 | 1/2007 | Goncalves et al. | |
| 7,177,737 B2 | 2/2007 | Karlsson et al. | |
| RE39,581 E* | 4/2007 | Stuchlik et al. | 15/49.1 |
| 7,272,467 B2 | 9/2007 | Goncalves et al. | |
| 7,320,149 B1 | 1/2008 | Huffman et al. | |
| 7,346,428 B1 | 3/2008 | Huffman et al. | |
| 7,480,958 B2 | 1/2009 | Song et al. | |
| 2002/0002751 A1* | 1/2002 | Fisher | 15/98 |
| 2002/0011813 A1* | 1/2002 | Koselka et al. | 318/445 |
| 2002/0175648 A1* | 11/2002 | Erko et al. | 318/560 |
| 2003/0229421 A1* | 12/2003 | Chmura et al. | 700/245 |
| 2004/0031113 A1 | 2/2004 | Wosewick et al. | |
| 2004/0143930 A1 | 7/2004 | Haegermarck | |
| 2004/0244138 A1 | 12/2004 | Taylor et al. | |
| 2005/0209736 A1 | 9/2005 | Kawagoe | |
| 2005/0217061 A1 | 10/2005 | Reindle | |
| 2005/0229340 A1 | 10/2005 | Sawalski et al. | |
| 2005/0278888 A1* | 12/2005 | Reindle et al. | 15/319 |
| 2006/0085095 A1* | 4/2006 | Reindle et al. | 700/258 |
| 2006/0288519 A1 | 12/2006 | Jaworski et al. | |
| 2006/0293794 A1 | 12/2006 | Harwig et al. | |
| 2006/0293809 A1 | 12/2006 | Harwig et al. | |
| 2007/0061040 A1 | 3/2007 | Augenbraun et al. | |
| 2008/0104783 A1 | 5/2008 | Crawford et al. | |
| 2009/0133720 A1* | 5/2009 | Van Den Bogert | 134/18 |

OTHER PUBLICATIONS

The International Bureau of WIPO; Notification Concerning Transmittal of International Preliminary Report on Patentability, International Preliminary Report on Patentability, and Written Opinion of the International Searching Authority; Nov. 4, 2010; Geneva, Switzerland.

USPTO; Office Action dated Jun. 8, 2012, from related application U.S. Appl. No. 12/976,786 (filed Dec. 22, 2010).

USPTO; Office Action dated Jun. 8, 2012, from related application U.S. Appl. No. 12/976,698 (filed Dec. 22, 2010).

* cited by examiner

APPLICATION OF LOCALIZATION, POSITIONING AND NAVIGATION SYSTEMS FOR ROBOTIC ENABLED MOBILE PRODUCTS

RELATED APPLICATION

This application claims priority to provisional application Ser. No. 61/125,684, filed Apr. 24, 2008, entitled "Application of Localization, Positioning & Navigation Systems for Robotic Enabled Mobile Products"

BACKGROUND OF THE INVENTION

At their core, robotic floor cleaners integrate at least two primary functional systems: (1) a cleaning mechanism, which cleans the floor in the area where it is placed or moved across, and (2) a mobile robotic platform, which autonomously moves the cleaning mechanism across the floor to different places. Both of these functional systems must work adequately for the robot to be effective at cleaning.

While both functional systems set requirements and constraints on the design of the overall robot, the challenge of developing a mobile robotic platform that can autonomously move around in nearly an infinite variety of highly unstructured environments (e.g. people's homes) tends to be the dominant consideration and has had a significant effect on the design of home cleaning robots to this date.

In terms of robotic floor cleaners currently available, the constraint is so great that the vast majority of units manufactured to this date follow the same general form factor. The mobile robot platform is contained within a shell having a circular base, similar in shape to hockey puck but much larger than that. Two independently controlled drive wheels are set within the circle on opposite sides of the robot. The wheels are along the center axis of the circle bisecting the forward and rear halves of the robot.

In addition, the mobile robot platform has one or more caster wheels for support at the forward and/or rear ends of the robot to provide lateral stability and act as part of the robot's suspension. Some designs use only one caster in the front, but distribute the weight to be heavier in the front to keep the robot from tipping backward.

The circular shape makes the robot much easier to navigate around obstacles and along walls. With the wheels fully nested within the circle and placed along the center axis, the robot can effectively turn in place to change its heading without the sides of the robot hitting any exterior obstacles.

The cleaning robot design also allows contact sensors (e.g., located on a bumper) and proximity sensors (IR sensors) to be placed along the outer sides of the robot to detect obstacles and follow along walls and furniture. In some designs, the bumper may extend outside the boundary of the circular base as a means for feeling for walls and obstacles as the robot turns. The current cleaning robot design also includes drop sensors beneath the robot for detecting drop offs in the floor before the robot drives over a hazard.

Examples following this design framework include robot vacuum cleaners such as Eletrolux®'s Trilobite®, iRobot®'s Roomba®, Yujin's iClebo, Samsung®'s Hauzen® robots, as well as floor scrubbing robots such as iRobot®'s Scooba® robot. The downside of the presently available solution for the mobile robotic platform is that the current configurations limit the size, reach and effectiveness of the cleaning mechanism.

In the typical robotic floor cleaner approach, the primary cleaning mechanism (such as a vacuum or beater brush) is designed to fit entirely within the footprint of mobile robot platform. Given that the dominant platform shape is circular for most robotic floor cleaners, the cleaning apparatus necessarily has be narrower than the robot itself, cover a smaller area of the floor relative to the size of the overall robot, and is not able to directly reach all the way to walls and into corners. This is particularly sub-optimal for cleaning mechanisms such as vacuums, brushes and other devices, which tend to be rectangular in shape and don't match well with the geometry of a circle.

To compensate for this limitation, designers of the robotic cleaners have added an "edge cleaning" feature in the form of a small side spinning brush that reaches out from the side of the robot. The small side spinning brush attempts to draw debris into the path of the cleaning apparatus, although this has limited effectiveness and often needs to be replaced due to wear.

The typical placement of the wheels and casters to support a circular robot platform places additional constraints on the cleaning mechanism. As one limitation, the cleaning mechanism can not extend to an area where there is a wheel or caster, further limiting its size and configuration. Additionally, the robot usually requires a more complex suspension system to keep the cleaning mechanism in contact with the floor to be effective in cleaning, while at the same time maintain primary contact between the floor and the wheels and casters in order for the robot to be effective in driving over the floor surface and over small obstacles.

A number of variations on the typical robot floor cleaner configuration have been proposed in an attempt to reduce the constraints on the cleaning apparatus and increase its effectiveness, but these solutions still prioritize the mobility and function of the robotic platform over the function of the cleaning mechanism itself.

Products with a non-circular shape, such as The Shaper Image®'s oval shaped eVac™ robotic vacuum, have been introduced to the market. In this oval-shaped robotic vacuum, the front leading edge was flattened to allow the vacuum to reach parallel to the wall in front of the robot, but the cleaning mechanism was still nested within the shell of the cleaning robot and did not extend to the sides.

Other robotic cleaner designs have been disclosed which combine a mobile robot platform with a cleaning apparatus that is partially or fully extending past the footprint of the mobile robot platform. These examples include a robot with a flexible tail extending outside the shell of the cleaning robot, Proctor and Gamble, ("P&G"), robots with a trailing clearing module (SC Johnson and Minolta), as well as a cleaning module that is movable relative to the mobile robot platform. (Minolta)

U.S. Pat. No. 6,779,217, assigned to P & G, discloses a mobile robot platform which utilizes the standard circular design, but also includes a flexible "appendage" in the form of a triangular tail, where the triangular tail holds a cleaning cloth. The advantage of this design is that it can reach into corners with the extended tail, as well as clean along the edges of furniture and walls. However, the extended reach of its cleaning abilities works only when the cleaning robot turns in place to "sweep" along the radius of the turn. While the "appendage" approach provides a beneficial supplementary function for catching extra dirt and dust, this approach does not overcome the limitation of the primarily cleaning mechanism being placed within the footprint of the mobile robot platform. For example, if the cleaning robot drives along the side of a wall, it will still not clean a majority of the gap between the primary cleaning mechanism and the wall, and will only do so in the limited area where the cleaning robot makes a turn.

SC Johnson, in U.S. application Ser. No. 10/218,843, disclosed a configuration which combines a circular mobile robot platform with a trailing external cleaning pad that could hold a cleaning cloth or other material. This cleaning robot design allows the external cleaning pad to be as wide as the cleaning robot, and provides that the edges of the cloth can extend past the width of the pad to reach along walls and into corners. The drive system and sensors for the robotic cleaner would be in the front circular section as part of the mobile robot platform. The limitation of this design is the larger size and longer shape of the combined form factor, which limits how well the robot would be able to navigate in tighter spaces. This robotic cleaner configuration would have the advantage of the standard circular design for turning along walls and, to some extent, maintain the benefits of being able to bump and turn to get around forward obstacles. However, the extended length of the cleaning robot would provide challenges for turning in tighter spaces, as well as for getting in and out of cluttered environments, such as between chair and table legs which are clustered together. The extra length of the trailing pad would prevent the cleaning robot from navigating into spaces a robot with just the circular section could enter.

In U.S. Pat. No. 5,894,621, Minolta disclosed a similar robotic cleaner configuration of a cleaning pad trailing the mobile robot platform, where the pad would be larger than the robot body to allow greater access to walls and side cleaning. However, this configuration would still have the same limitations of navigating in tight spaces given the overall length and distance from the wheels to the cleaning pad.

In U.S. Pat. No. 5,720,077, Minolta disclosed another cleaning robot design where the cleaning mechanism is external to the mobile robot platform. The cleaning robot expands its reach by making both (1) the cleaning mechanism's position adjustable to the mobile cleaning robot and (2) making the mobile robot platform drive wheels change the primary axis of direction, relative to the cleaning mechanism, in order to drive it in different orientations. This robotic cleaner design offers a greater degree of flexibility for cleaning in different spaces, but comes at a price of significantly more cost and complexity. Specifically, this robotic cleaner design includes more moving parts and more sensors to judge situational conditions and control the position of the cleaning mechanism, so this will likely result in a physically larger robot. While this may be appropriate for a commercial robotic cleaner for large office and commercial spaces, this disclosed cleaning robot design would not fit the requirements of a consumer robotic cleaner needing to clean in tight spaces, such as around a kitchen table that is positioned close to one or more walls, which also includes a number of chairs, as well as in places deep under low furniture.

The cleaning pattern and navigation strategy of consumer robots is also an area in need of improvement. The vast majority of current consumer cleaning robots on the market utilize a random or semi-random navigation scheme for controlling the robot's driving behavior. This is primarily because in the past there has not been an effective and low-cost navigation solution that can track the robot's position and guide it to intelligently cover the desired area for cleaning the floor.

Instead, cleaning robots normally rely on a relatively simple set of behaviors and algorithms that combine driving, obstacle detection and avoidance, wall following and random variables in an attempt to "bounce" the robot around the floor space. The rationale is that over enough time, the robot will reach all locations in the cleanable area just through the process of randomly exploring the room.

This approach has several major limitations. First, the robot must clean for very long periods of time to reach full coverage of a room or other designated area of a home. As noted in U.S. Pat. No. 6,076,025, the rate of new area covered drops significantly the longer the robot operates. Because the robot has little to no prior knowledge of where it has cleaned, it continues to clean over areas that it has already cleaned before as opposed to focusing on areas to it has not yet reached. As more area of the room or area of the home is covered, the random method works against the robot, as the robot spends proportionally more and more time cleaning areas it has already cleaned. For a typical large room or area in a home, the robot runs out of battery power before it's able to reach all locations in the target area.

In U.S. Pat. No. 6,076,025 ("the '025 patent") assigned to Honda, Honda discloses an enhanced approach by having the robot periodically clean in an outward spiral pattern during the course of randomly navigating through a room. This approach has the benefit of filling in more area in different locations and improving the efficiency curve relative to a pure random approach, but the same core dynamic exists in terms of making the robot becoming increasing inefficient as more of the room is covered.

As another limitation, cleaning strategies that are described as random or semi-random do not normally result in a random distribution of cleaning coverage across a typical room or area of a home. In a completely empty room where there are only walls and not interior obstacles, each area of the floor will have an equal chance of being cleaned within a certain amount of time. So on any given run, one part of the room is just as likely as another part of the room to get cleaned. As more runs are made or repeated, the odds increase that a specific part of the room will be cleaned.

However, rooms and areas in homes are not empty, and instead have a variety of interior obstacles which the robot must navigate around. Additionally, these obstacles are not randomly dispersed. Rather, large obstacles, namely furniture, are clustered together and form uneven barriers of entry for a robot to navigate through. A common example includes a dinning table and chairs, which create a "forest" of furniture legs concentrated in a certain area of a room. Another common example is a living room furniture set, such as a long couch, coffee table, side chairs and side tables clustered in a pattern, such as U-shape or L-shape configuration.

In theory, the random approach gives infinite opportunities for the robot to find openings in the room between obstacles by hitting them in all points along their perimeter at virtually all angles. However, this process takes time for enough permutations to take place and for a large percent of those permutations, the robot may be frequently blocked and/or deflected away from areas occupied by these obstacles. The net result is that the robot following a random approach is "corralled" away from dense or blocked areas, and tends to stay into more open spaces. This often causes the robot to significantly over-clean some areas of the room or areas of the home while under cleaning other areas. In other words, a random and/or semi-random guided robot can systematically avoid and under-clean certain areas, over and over. This results in poor cleaning of those areas, inefficient use of energy, as well as excess wear on the robot and potentially of the floor covering in the over-cleaned areas.

These limitations of a random or semi-random approach, the general low efficiency in reaching all areas of the floor, and the systematic pattern of repeatedly missing certain parts of the floor area, are counter-productive to the primary cleaning function of the robot. This is especially true for robotic cleaners which use a consumable material for cleaning that has a limited period of use. As an example, for robotic cleaners such as described in this invention which uses a wet cleaning pad, the dispersion of fluid on the floor would be concentrated in certain areas of the room, possibly to the point of pooling and leaving streaks and residue spots on the floor. At the same time, the pad dries up as it cleans, meaning areas that are not reached until later will not be wet or cleaned at all.

To address these limitations, companies have proposed and in a few instances developed robots which use a systematic or semi-systematic cleaning strategy. These robots generally follow some pre-defined cleaning behavior or pattern, such as crossing the floor in parallel rows, to provide a more even and controlled method of cleaning the floor area. For example, Samsung U.S. Pat. No. 7,480,958 discloses these types of robots.

For open areas of a room, a parallel row pattern can be much faster at covering a large amount of area in much less time than a random approach. These patterns can also have the benefit of using the driving pattern to probe for open areas amidst obstacles that lie in the path of the rows. In the case of a robot cleaning in a pattern of parallel rows, the ends of the rows provide an opportunity to probe for open spaces between obstacles in a fast and systematic way. For example, if the direction of the rows is roughly perpendicular to a boundary formed by a cluster of furniture, then the robot has the opportunity to attempt to pass into openings in the cluster on each returning pass. By controlling the spacing on the rows and using heuristics for when to attempt to follow around an obstacle, the robot can be much more methodical about finding spaces in between obstacles that a random approach would initially miss.

The challenge with systematic cleaning patterns is that the structure of the pattern may be too rigid to adapt enough for successfully covering all areas in a complex environment. While a random cleaning strategy over time will allow the robot to find its way almost everywhere just by chance, although not efficiently or with equal success, a systematic strategy alone can not guarantee full coverage. The problem is the pattern generally has one preferred direction and follows rules about which way to proceed when it has multiple directions to select from. So in the example of the parallel rows, the robot may end up cleaning on side of a kitchen aisle, but miss the other side.

To make structured patterns work in unstructured environments, more capabilities have to be added to the system to track the robot's position, keep a map of where it has cleaned and identify areas that have not been reached. To date, very few systems have been developed that would be suitable for a home cleaning robot. As one example, the Samsung® Hauzen® vacuum cleaning robot uses a camera to create a map of where it cleans to provide some of these functions, but this product requires complex image recognition software and more expensive sensors and internal computing hardware built into the robot. To date, this product is significantly more expensive than even the premium version of the leading models for robotic floor cleaners, and accounts for a very small share of the market. Evolution Robotics® has alternative vSLAM® localization system utilizing a camera and visual pattern recognition to construct a map of the environment, recognize where the robot is, and guide the robot, but this system too requires generally more processing and memory than is on the current generation of cleaning robots. Evolution's patents disclosing vSLAM localization system information include U.S. Pat. Nos. 7,272,467; 7,177,737; 7,162,338; 7,145,478; 7,135,992 and 7,015,831. For the vast majority of robots sold to consumers, random or semi randomly cleaning remains to be the standard.

DESCRIBED DESCRIPTION OF THE INVENTION

Figure 1:
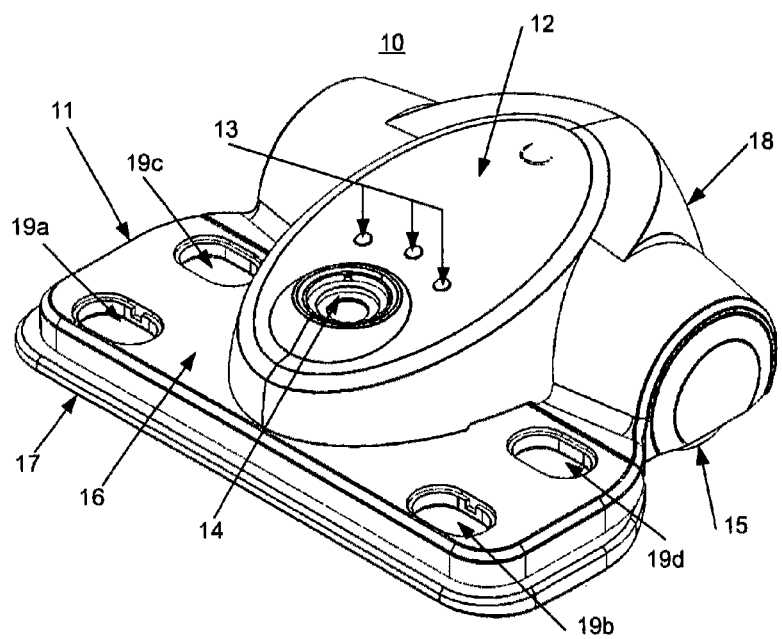
FIG. 1 illustrates a top perspective view of a robotic cleaner according to an embodiment of the invention.

In an embodiment of the invention, the cleaning robot solves a current problem of extending cleaning reach, while achieving reliable cleaning robot mobility by using a unique configuration where the cleaning apparatus (e.g., the cleaning pad which holds the cleaning cloth) forms a major part of the mobile robot platform and overall body. In this embodiment of the invention, the cleaning apparatus (1) is located at the front of the cleaning robot to reach any part of the cleaning path traveled, (2) fully extends along the forward leading edge and sides of the cleaning robot to enable the cleaning cloth to reach to walls, along furniture, into corners and under low objects, (3) provides a large surface at the bottom side of the cleaning pad for maximizing the floor area covered by the cleaning cloth, (4) maintains maximum contact between the cleaning cloth and floor by utilizing the cleaning pad itself as primary suspension point for the robot, and (5) minimizes the size of the drive portion of the cleaning robot relative to the size of the cleaning pad, to enable the overall robot to be small and capable of maneuvering in tight spaces a larger robot could not reach.

In this embodiment, the cleaning robot is designed utilizing the cleaning mechanism (or apparatus) as the base module in the mobile robotic platform, and then optimizing the remaining elements to complement the function of the cleaning apparatus.

This robotic cleaner configuration has additional advantages, which include, but are not limited to: (6) providing a form factor where the front of the robotic cleaner mimics the cleaning pad found on conventional manual cleaning mops that use an attachable cleaning cloth; (7) being compatible with standard size cleaning cloths sold for manual cleaning mops widely available on the market; (8) providing users an immediately familiar design that communicates its function; and (9) closely following a normal use pattern for attaching and removing cleaning cloths.

In an embodiment of the invention, a primary cleaning mechanism or assembly is a cleaning pad holding a dry or wet cleaning cloth. In alternative embodiments of the invention, the function of the cleaning mechanism (or apparatus) is changed, but the core cleaning robot configuration remains the same. In one alternative embodiment of the invention, a forward cleaning mechanism is included having a powered rotating brush and dust collection bin, which is in a rectangular form like the cleaning pad described in this invention. In this embodiment of the invention, the cleaning mechanism has one or more rotating brushes along the front leading edge, and one or more dust bins located behind the cleaning brushes in front of the wheels of the cleaning robot.

In another embodiment of the invention, the cleaning mechanisms or assemblies are detachable and swappable, so that a cloth cleaning pad holder can be removed from the robot and replaced with a compatible cleaning module that features, for example, the powered rotating brush and collection bin. In this embodiment, the compatible cleaning module may have both a physical interface for locking and unlocking with the rest of the cleaning robot, as well as an electrical interface for providing power from the cleaning robot to the compatible cleaning module, as well as provide any data communication between sensors located on the cleaning module and the robot's main computing unit.

In another embodiment of the invention, the cleaning assembly may support an automatic cloth changing function to allow the robot to operate for longer periods of time before requiring action from the user. In one embodiment of this function, the user may load multiple cleaning cloths onto the robot cleaning assembly, and the robot can mechanically remove a cleaning cloth to change to a fresh one. The trigger for removing a cleaning cloth may include but is not limited to: duration of cleaning time for a given cloth, amount of area covered with a given cloth, and/or sensing of the amount of dirt built up on a cloth, such as through utilizing a reflective light sensor position near the cloth. The user may have options for setting when and under what conditions the cloth is removed. The main body of cleaning robot may include cleaning cloth software, located in memory in a microcontroller or in a separate memory, that identifies when a cleaning cloth needs to be removed. Alternatively, the cleaning assembly may include a sensor which is connected to the microcontroller in the main robot body that identifies an amount of dust built up on a cloth and transfers such information to the microcontroller.

The mechanism for removing a cleaning cloth by the robot may include but is not limited to: having a motorized hook on the robot, such as a hook or set of hooks on a tread that rotates over an area of the cloth to grab the outer cloth and pull it back into a storage area on the robot, leaving a fresh cloth exposed to continue cleaning. In another embodiment of the invention, the cleaning robot may drive to an external pad changing device, where the robot drives to physically dock with the pad changing device, and the pad changing device includes a mechanical hook or set of hooks that make contact with outer cloth to remove it, either through powered rotation of the hooks to pull the cloth off, through a process of have the robot drive back away from the device as the hook or hooks on the pad changing device statically pull the cleaning cloth of the cleaning pad, or a combination of the two systems.

In another embodiment of the invention, the cleaning mechanism may include a cleaning cloth which is stored on a roll, where the cleaning cloth is fed from out of the roll, transitions across the bottom surface of the cleaning pad, and into a collection mechanism. In an embodiment of the invention, the collection mechanism may be a rotating dowel, which pulls on the cleaning cloth as it turns, and advances the cloth roll so that the section of the cloth that has been exposed to floor surface beneath the pad may advances to allow a new clean section of the cloth to be used. This mechanism allows the robot to roll a section of cleaning cloth as it becomes dirty off the pad and replace it with a clean section. In embodiments of this invention, the trigger for advancing the cloth may include but is not limited to duration of cleaning time for a given section or area of the cloth, amount of area covered with a given section or area of the cloth, and/or sensing of the amount of dirt built up on a section or area of the cloth, such as through utilizing a reflective light sensor position near the section of the cloth exposed to the floor. The user may have options for setting when and under what conditions the cloth is advanced. In an embodiment of the invention, the cleaning cloth roll may be attached by the user as a roll that loads into the cleaning mechanism, where the user feeds the roll onto a collecting spool included in the cleaning mechanism. In an embodiment of the invention, the cleaning cloth roll may be packaged within a cartridge with contains both the original roll and a collection spool for advancing the cloth material and rolling up the used material, along with mechanical and/ or electrical connections which allow the robot to control and advance the roll.

Embodiments of the invention as well as additional embodiments using alternative cleaning mechanisms or modules are disclosed below.

FIG. 1 illustrates a top perspective view of a robotic cleaner according to an embodiment of the invention. As illustrated in FIG. 1, the robotic cleaner 10 includes a cleaning assembly 11 and a robot drive body 12. The cleaning assembly 11 is located in a front part of the robotic cleaner and provides a rectangular form for attaching the cleaning cloth (not shown). The cleaning assembly 11 connects to the robot drive body 12 to form the overall mobile robot platform 10. The cleaning assembly 11 includes a top 16 and a bottom pad 17 for holding the cleaning assembly 11 to the floor. The top 16 may be a hard, flat plastic top or may be made of other material. The bottom pad 17 may be a soft rubber pad. The bottom pad 17 extends around the bottom and lower edge of the top 16 to provide a surface for the cleaning cloth to wrap around the sides. The bottom pad 17 also provides a flexible edge for when the robotic cleaner makes contact with walls, furniture and other obstacles. This configuration of the cleaning assembly 11 is similar to the standard placement of cleaning cloths on manual mops, and provides all the of same cleaning advantages provided by exposing a broad bottom surface area as well as side edges as part of the cleaning cloth. For example, it allows the cleaning assembly 11 to reach into corners, along walls, under and around furniture and other objects.

Figure 5:
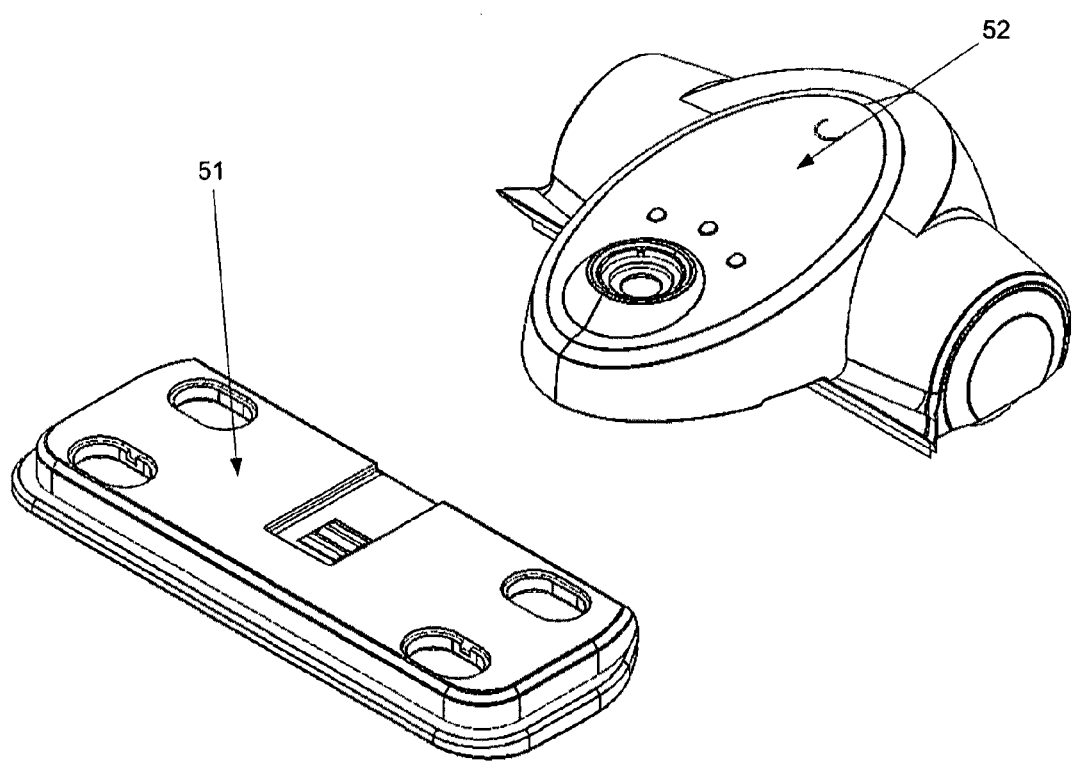
FIG. 5 illustrates a cleaning assembly separated from a robot drive body accordingly to an embodiment of the invention.

FIG. 5 illustrates a cleaning assembly separated from a robot drive body accordingly to an embodiment of the invention. FIG. 5 shows the two elements in isolation, with the cleaning assembly 51 separated from the robot drive body 52 to show the boundaries of the two elements and their relative size with respect to one another. In the embodiment of the invention illustrated in FIG. 5, the cleaning assembly 51 may be detachable from the robot drive body 52.

Figure 3:
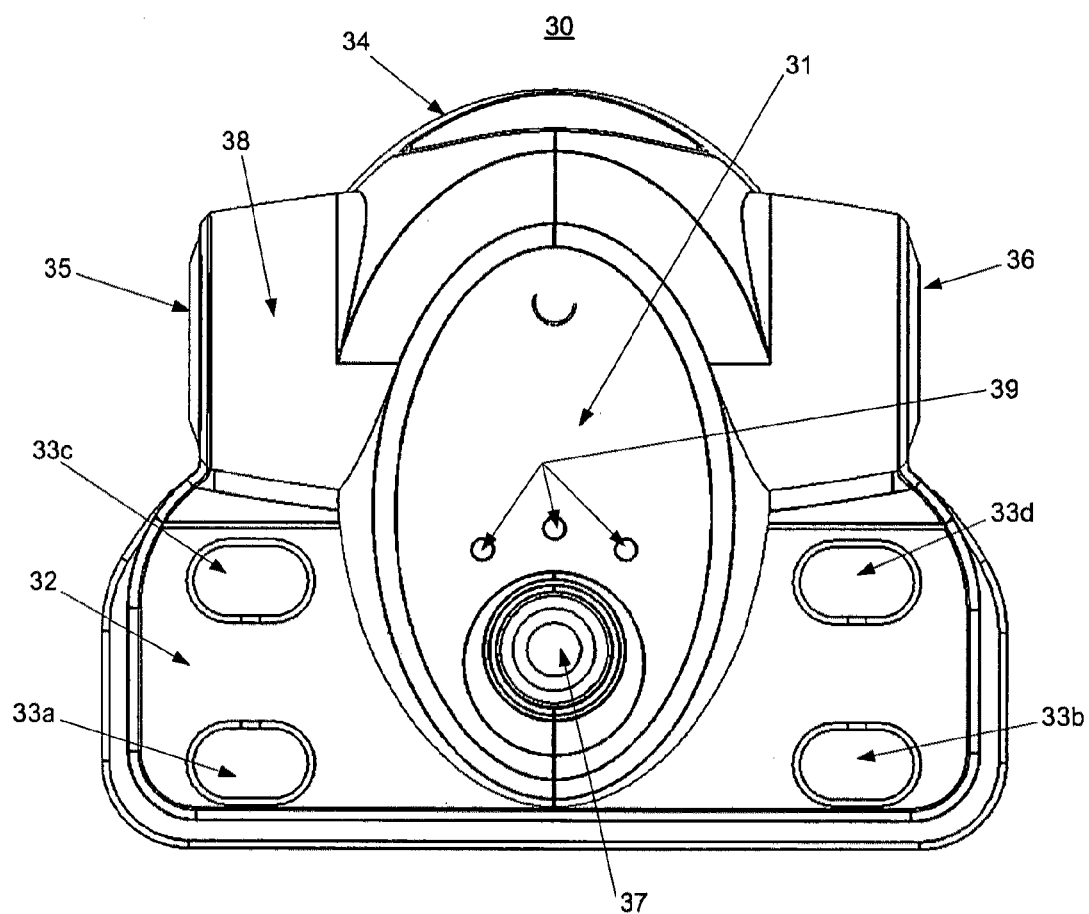
FIG. 3 illustrates a top down view of the robotic cleaner according to an embodiment of the invention.

FIG. 3 illustrates a top down view of the robotic cleaner according to an embodiment of the invention. The cleaning cloth is attached to the cleaning assembly 32 through four plastic cloth holders 33a, 33b, 33c and 33d mounted at the corners of the top 32 of the cleaning assembly. Referring back to FIG. 1, the shape of the cleaning assembly 11 is very close in the design to standard manual cleaning mops that use disposable cleaning cloths, and is compatible with the standard sized cleaning cloths used by those mops.

In an embodiment of the invention, the cleaning assembly 11 is not removable (or detachable) from the main robot body 12, but the cleaning assembly 11 may slide out forward a few centimeters from the robot drive body 12, like a drawer. In this embodiment of the invention, the cleaning assembly 11 may be pulled away from the robot drive body 12, and a user may drape one end of the cleaning cloth around the rear of the cleaning assembly 11 and lock it into the rear cloth holders (e.g., 19c and 19d of FIG. 1), then wrap it around the front and lock it in to the front cloth holders (e.g., 19a and 19b of FIG. 1), just like the user would on a normal manual mop for cleaning clothes. Once done attaching the cleaning cloth, the user pushes the cleaning assembly 11 back into a closed position relative to the robot drive body 12.

Figure 8:
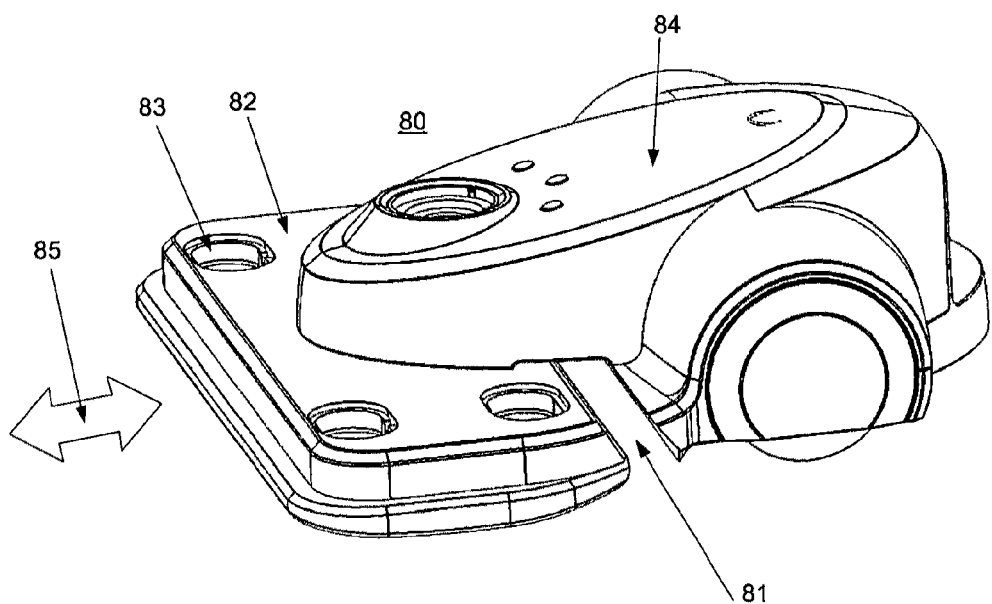
FIG. 8 illustrates a robotic cleaner with a movable cleaning pad relative to the robot drive body according to an embodiment of the invention.

FIG. 8 illustrates a robotic cleaner with a movable cleaning pad relative to the robot drive body according to an embodiment of the invention. As is illustrated in FIG. 8, the cleaning assembly 82 can be moved away from the drive body 84 as is illustrated by the arrow 85. This movement creates a space 81 between a bottom part of the robot drive body 84 and the cleaning assembly 82.

In another embodiment of the invention, the cleaning assembly may open a gap up between the cleaning assembly and a robot shell in a different type of configuration than sliding out, but with the same effect of creating a gap for attaching and removing the cleaning cloth. This embodiment of the invention may include having the cleaning assembly pull out at an angle relative to the robot shell, such as in a direction that combines downward and forward movement relative to the shell rather than strictly forward movement relative to the shell. In another embodiment of the robotic cleaner, the cleaning assembly may swing open from the rear of the cleaning assembly, with the cleaning assembly pivoting at a forward point near the front of the shell, and the rear of the cleaning assembly drops below the level of the wheels to open up a gap for attaching and removing the cleaning cloth along the rear of the cleaning assembly.

In an embodiment of the invention, the cleaning assembly 11 is comprised on a hard, flat plastic top 16 and a soft rubber bottom pad 17 for holding the cleaning cloth to the floor. The soft rubber bottom pad 17 extends around the bottom and lower edge of the plastic top 16 to provide a surface for the cleaning cloth to wrap around the sides. The soft rubber bottom pad 17 also provides a flexible edge for when the robotic cleaner makes contact with walls, furniture and other obstacles. This configuration of the cleaning assembly 11 is similar to the standard placement of cleaning cloths on manual mops, and provides all the of same cleaning advantages provided by exposing a broad bottom surface area as well as side edges as part of the cleaning cloth. For example, it allows the cleaning assembly 11 to reach into corners, along walls, under and around furniture and other objects.

Figure 7:
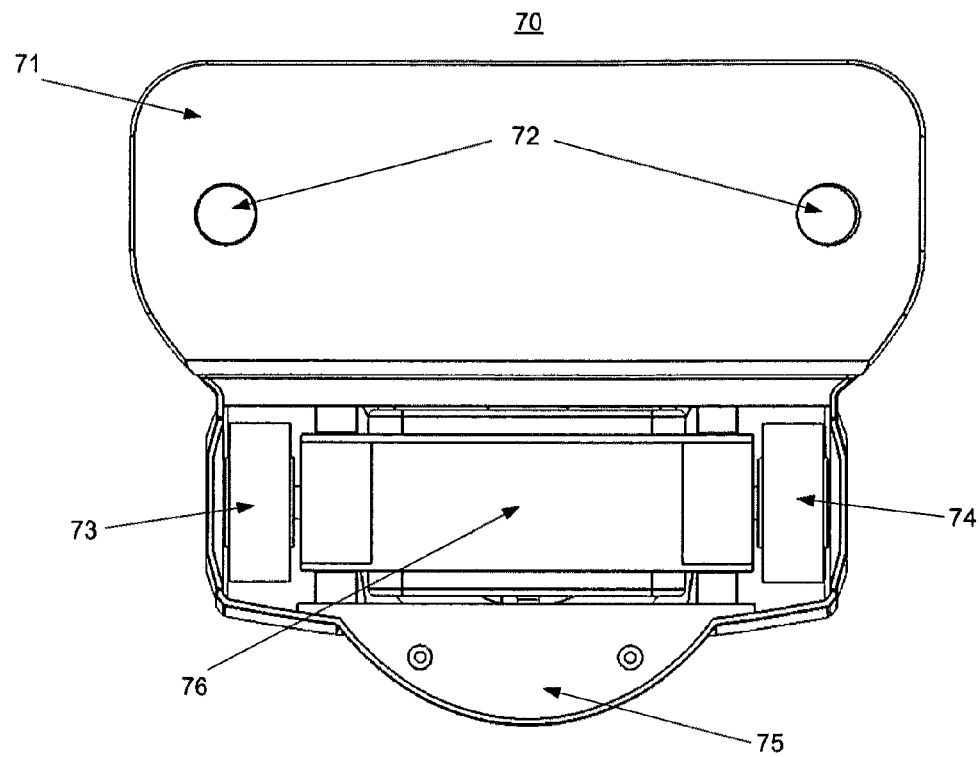
FIG. 7 is a bottom view of a robotic cleaner accordingly to an embodiment of the invention.

FIG. 3 illustrates a top down view of the robotic cleaner according to an embodiment of the invention. In the embodiment of the invention illustrated in FIG. 3, the cleaning assembly 32 comprises nearly half of the overall footprint of the robotic cleaner, which provides for a large surface area for cleaning within a small bodied robotic cleaner. FIG. 7 is a bottom view of a robotic cleaner accordingly to an embodiment of the invention. FIG. 7 further illustrates the footprint of the cleaning assembly 71 in relation to the overall robotic cleaner. As illustrated in FIG. 3, the robot drive body 31 may be covered by a shell 38. In the embodiment of the invention illustrated in FIG. 3, the robot drive body 31 extends over a middle top section of the cleaning assembly 32 in the front of the robot. In an embodiment of the invention, a rear portion of the robot drive body 31 houses at least one motor, batteries, and left and right drive wheels. Reference numbers 35 and 35 point to the side of the shell 38 that covers the left and right drive wheels. In an embodiment of the invention, the left and right wheels are set inside the shell 38 a few millimeters. The shell 38 extends over the left and right drive wheels. The left and right drive wheels are independently controlled to provide a differential drive system. The placement of the wheels so closely behind the cleaning assembly 32 provides a tight turning radius for the robotic cleaner and also provides the robotic cleaner 30 with a small length for getting in and out of tight spaces. The wheels are nested into the robot drive body 31 so that the width of the drive body is narrower than the width of the cleaning assembly 32, as is illustrated in FIG. 3. This configuration allows the cleaning assembly 32 to extend to reach along walls and also provides a wider sweep of coverage when cleaning.

As illustrated in FIG. 3, the combination of a large exterior cleaning assembly 32 with a minimally sized robot drive body 31 provides a more compact yet effective design for cleaning household floors. By contrast, in the traditional cleaning robot designs, the cleaning assembly would need to be either shrunk down to fit within a body of a circular robot, or the circular robot body would have to be significantly larger (and thus be less able to fit into tight spaces) to provide enough internal space for holding a full size cleaning assembly.

Returning to FIG. 1, the robot drive body 12 makes contact with the floor with two wheels, a left wheel 15 and a right wheel (not shown), located behind the cleaning assembly 11 at the outer left and right edges of the drive body 12, respectively. The cleaning assembly 11 provides a 3rd area of contact on the floor. In the embodiment of the invention illustrated in FIG. 1, the bottom pad (along with a cleaning cloth) provides a $3^{rd}$ area of contact on the floor. The cleaning assembly 11 runs along the surface of the floor with the cleaning cloth providing both the cleaning function as well as skid surface to allow the cleaning robot 10 to travel across the floor surface, as if the cleaning assembly 11 was a ski. This 3 area system ensures that each point, the two wheels and the cleaning assembly 11 with the cleaning cloth, maintains contact with the floor during normal operation.

Figure 4:
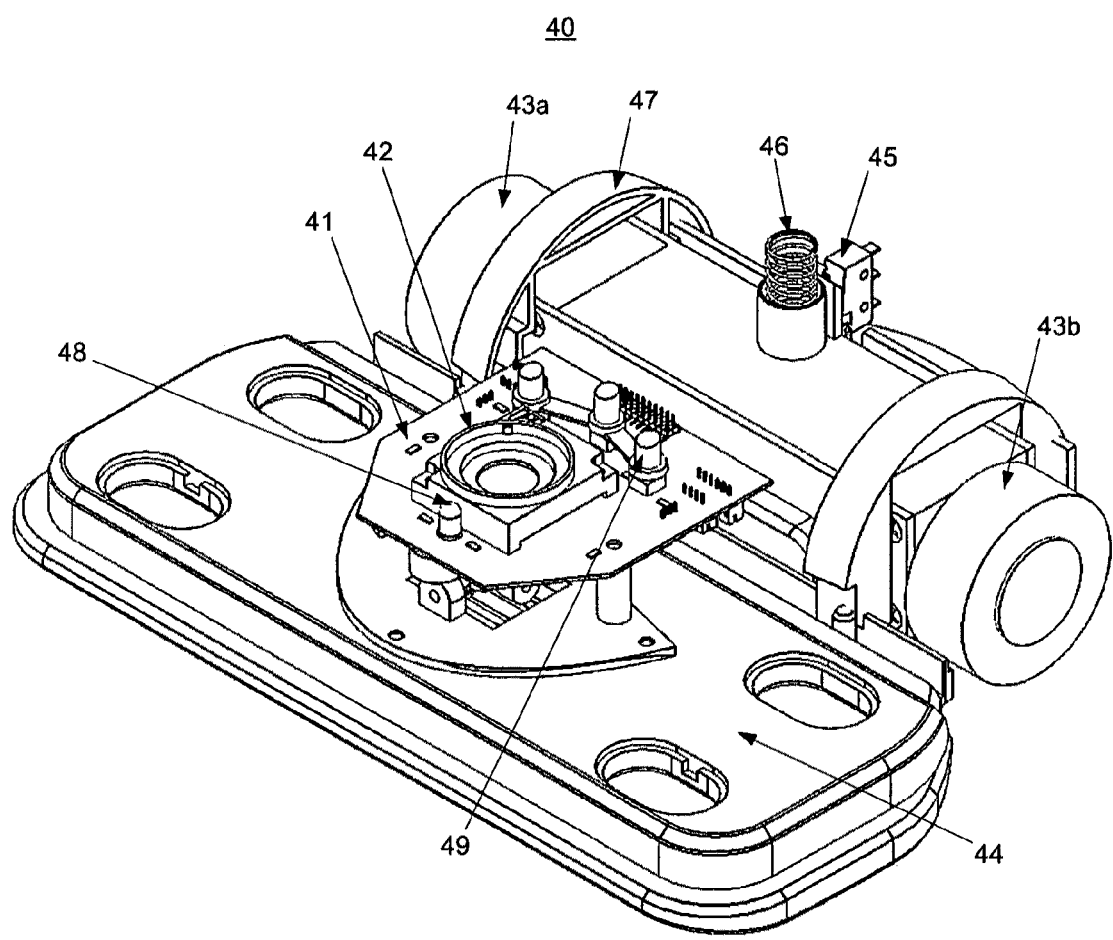
FIG. 4 illustrates a robotic cleaner with a shell removed according to an embodiment of the invention.

FIG. 4 illustrates a robotic cleaner with a shell removed according to an embodiment of the invention. FIG. 4 shows the 3 areas of contact with the shell of the robotic cleaner 40 removed, with the right wheel 43*a* and the left wheel 43*b* and the cleaning assembly 44. The 3 area contact system eliminates the need for any other support, such as having a caster wheel in addition to the two drive wheels (e.g., 43*a* and 43*b*). The use of a caster wheel for additional support is typical on most all robot vacuum cleaners to stabilize the mobile robotic platform.

Figure 2:
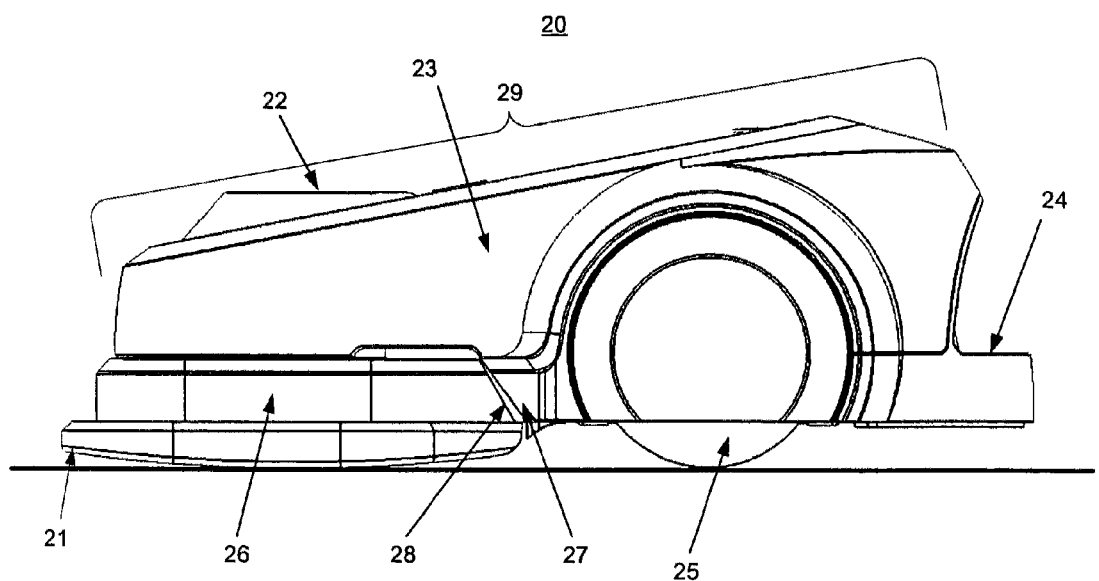
FIG. 2 illustrates a side view of a robotic cleaner according to an embodiment of the invention.

FIG. 2 illustrates a side view of an embodiment of a robotic cleaner according to an embodiment of the invention. In the embodiment of the invention illustrated in FIG. 2, the robotic cleaner 20 includes a cleaning assembly 26, a robot drive body 23, and wheels (one of which is shown, wheel 25). The cleaning assembly 26 is located under the front of the robot body 23 and the wheel 25 located under the rear of the robot body 23. The bottom surface 21 (e.g., the bottom pad) of the cleaning assembly 26 is slightly curved (e.g., from front to back of the cleaning assembly) in relation to the floor, following the standard design of manual floor mops that use cleaning cloths. This curve helps the cleaning cloth pick up dust and dirt that would otherwise collect in the front of a flat cleaning pad. Through the robotic cleaner's forward motion, the curve pushes dust and dirt under the cleaning pad and uses more of full surface area of the cleaning cloth along the bottom pad of the cleaning assembly 26 to trap the dust and dirt onto the cleaning cloth. The cleaning assembly 26 may be slightly curved in the front, the back or both the front and the back. A curve in the back allows the robot to trap more dirt when the robotic cleaner is driving in reverse. In the embodiment of the invention illustrated in FIG. 2, the curvature in a bottom surface 21 of the cleaning assembly 26 also allows the cleaning assembly to maintain even contact with the floor when the cleaning assembly 26 pitches slightly up or down on uneven floors.

The robot drive body is covered by a shell 29 (in FIG. 2) and 38 (in FIG. 3) which covers the wheels and all internal electrical and mechanical parts of the robot drive body 31 (in FIG. 3) and 23 (in FIG. 2). The shell 29 provides openings for sensors, such as a navigation sensor 14 (in FIG. 1), 22 (in FIG. 2) and 37 (in FIG. 3). The shell 29 also provides openings for buttons and lights 39 (in FIG. 3) and 13 (in FIG. 1) which provide the user interface for the robotic cleaner 20. In this embodiment of the invention, the shell 29 may also include a handle 24 for carrying the robotic cleaner, which in FIG. 2 is located at the rear of the robotic cleaner 20 (e.g., behind the wheels 25 and on a back surface of the shell 29).

The shell 29 may also provide a critical function relative the cleaning assembly 26, in that in closes off any open gaps or catch points between cleaning assembly 26 and the rest of robotic cleaner 20 when the cleaning assembly 26 is in the closed position. If open gaps were exposed, the robotic cleaner 20 may catch on wires or other objects and get tangled. As illustrated in FIG. 2, a bottom edge 27 of the shell in front of the wheels 25 provides a smooth lock (engagement or fit) with the cleaning assembly 26 when the cleaning assembly 26 is in the closed position. In the embodiment of the invention illustrated in FIG. 2, a back portion of the cleaning assembly 26 forms a smooth fit (or engagement) with the bottom edge of the shell. In this embodiment of the invention, an enclosed space 28 is provided between the rear of the pad and the shell to allow the rear edge of the cleaning cloth to rest under the shell.

If the cleaning assembly is in the closed position, the cleaning assembly and shell are rigid relative to one another and form a unit that moves together. If the cleaning assembly is lifted, the shell moves with the cleaning assembly. This robotic cleaner configuration also applies weight and stability to the cleaning pad. For example, if the cleaning robot drives into an obstacle and a force pushes on the cleaning assembly in a direction where it would push the front of the cleaning assembly down and the rear of the cleaning assembly up, the weight of the shell and the resistance of the spring holding the shell over a rear drive assembly of the robotic cleaner would provide leverage for counter-acting that force.

Figure 14:
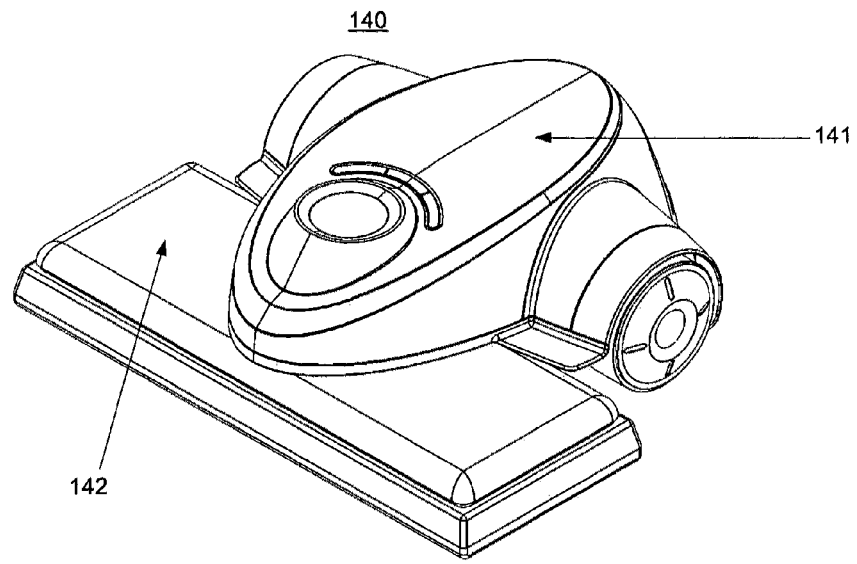
FIG. 14 illustrates an embodiment of a robotic cleaner according to an embodiment of the invention.

In another embodiment of the robotic cleaner, the cleaning assembly may be designed to freely pivot in one or more directions relative to the shell. The cleaning assembly may freely pivot relative to the shell because there is no rigid connection between the cleaning assembly and the shell. Rather, the two components (i.e., shell and cleaning assembly) would be joined by a pivot joint that provides the desired movement in one or more directions. In this configuration of the robotic cleaner, a gap around the top and the rear of the cleaning assembly with relation to the shell would be present, to allow space for the cleaning assembly to move, such as to tilt up and down (or move side-to-side). In this embodiment of the robotic cleaner, a flexible gasket or skirt on a surface of the shell around or near the cleaning assembly may close off the gap, while still allowing the cleaning assembly to move, and this may present the gap from becoming a catch point for dust or other debris. FIG. 14, described later, illustrates a robotic cleaner with a flexible skirt around a bottom of a forward section of the shell to cover the gap between the shell and the cleaning assembly. In an embodiment of the invention where the shell and cleaning pad lock or are closed together, the gasket or skirt may be eliminated.

Figure 9:
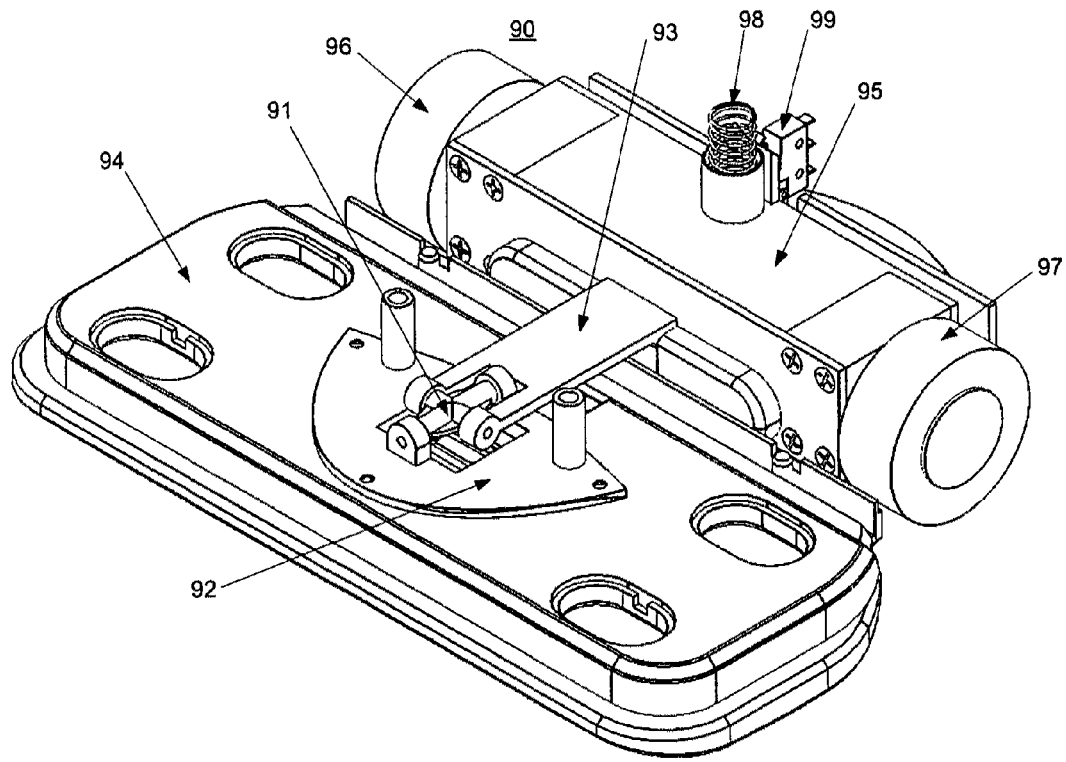
FIG. 9 illustrates a robotic cleaner with a shell removed according to an embodiment of the invention.

If the cleaning assembly and shell lock or close together, a robotic cleaner drive system including the two wheels is designed to move independently relative to the cleaning assembly and the shell. This configuration allows the wheels to maintain contact with the floor regardless of the cleaning assembly position. To achieve this freedom of movement and maintain all three areas on contact on the floor, the drive system may be connected to the shell and cleaning pad through a pivot joint assembly. FIG. 9 illustrates a robotic cleaner with a shell removed according to an embodiment of the invention.

FIG. 9 is a top perspective view of the robotic cleaner with the top of the shell removed. The pivot joint 91 connects on one end to a mounting plate 92 near the front of the robotic cleaner. This mounting plate 92 is a fixed part of the robot drive body and connects to the base of the shell. It may also provide support areas for internal electronics housed under the forward section of the shell, such as a PCB 41 (see FIG. 4). The PCB 41 may be located in a position above the mounting plate 92. The PCB 41 may be mounted to the mounting plate 92 via posts. The mounting plate 92 connects with top of the cleaning assembly 94, and may provide a sliding mechanism that allows the user to move the cleaning assembly 94 in and out from the robot drive body. In this embodiment of the invention, the sliding mechanism may include a stop to limit how far the cleaning assembly may be pulled out relative to the shell. In another embodiment of the robotic cleaner, the sliding mechanism may be designed in such a way that the entire cleaning assembly may be pulled off of the mounting plate. In another embodiment of the robotic cleaner, the cleaning assembly may connect with the shell and not directly interface with the mounting plate, where the connection between the shell and the cleaning assembly provides for the desired means of moving the cleaning assembly relative to the shell.

Also connected to the pivot joint 91 is a center bracket 93 which connects to the drive box 95. The drive box 95 is connected to the left and right wheels 96 and 97, to form the inner drive assembly. The internal motor assemblies supporting the wheels 96 and 97 (e.g. motor, gearbox and drive shaft,) in an embodiment of the invention, are mounted rigidly to the drive box 95, allowing for strong traction and stability when travelling over the floor.

This configuration, in combination with the pivot joint 91, allows the drive assembly to lift up and down relative to the cleaning assembly (as would be seen from a side view), as well as roll relative to the cleaning assembly 94 (as would be seen from a rear view.) This mechanical configuration provides a simple but highly effective gravity based suspension system, where the any one of the 3 areas of contact (i.e., wheels 96 and 97 or cleaning assembly 94) on the floor can lift or fall relatively freely without impacting the other areas of contact.

In this embodiment of the invention, the shell is locked with the motion of the cleaning assembly, and room is provided within the shell to allow for movement of the drive assembly. A spring 98 provides support for the shell in the rear of the robotic cleaner over the drive box 95. In an embodiment of the invention, the spring 98 is set along center axis of the robot so that the shell can "float" over the drive assembly without putting much resistance on the ability of the wheels 96 and 97 to move up and down within the shell. The broad width of the cleaning assembly 94 over the floor provides additional stability to the shell, so while the drive box 95 and wheels 96 and 97 may twist within the shell, the shell itself stays very level because it is stabilized by the cleaning assembly 94.

In this embodiment of the invention, the shell can compress over the drive box 95 when pressed down from a force external to the robotic cleaner. This has two advantages. First, the shell may lower down if the robotic cleaner travels under low clearance furniture and this may avoid the robotic cleaner getting wedged in place. In addition, a limit or contact switch 99 may provide detection if the shell compresses below a certain safety point, triggering the robotic cleaner to reverse its course before it gets wedged.

The ability of the shell to compress on the rear spring 98 also provides room for the shell to drop if the shell is stepped on or has something dropped on top of it. In an embodiment of the invention, a rubber pad is placed along the bottom of the shell at the rear handle 24 (see FIG. 2) so that if the shell is pushed to the ground, the rubber pad would provide a stopping point with a non-slip grip to the floor. The spacing is such that the shell will make contact with the floor prior to the point where the shell would make contact with the drive box 95 (see FIG. 9). As an added precaution in an embodiment of the invention, the clearances between the shell and the drive box would result in the shell making contact with the rubber tires 25 (see FIG. 2) and come to rest on the tires 25 before compressing directly on the drive box 95 and putting pressure on it or any other internal structures.

A post at the back of the drive box can fit into a slotted guide rail along the rear inner shell (in front of a handle recess) for keeping the drive box aligned in place along the cleaning robot axis. This post and rail may also provide a drop limit for setting how far the drive box and wheels can fall away from the shell. In an embodiment of the invention, the post can be set so that it compresses that spring with some tension when the shell is in its level position, providing for a firmer hold on the shell, but still provide some degree of freedom in the drive assembly. In another embodiment of the invention, the post and rail can be set with adequate clearance, so that in the level position, the shell is lightly resting on the spring, and the drive box has free room to drop without interference.

In another embodiment of the invention, the placement of the post and/or bottom limit may be adjustable by the user through a mechanical interface, such as a sliding switch with different preset positions. By using a sliding switch with different preset positions, a user may adjust the tension and freedom of movement of the robotic cleaner to optimize the suspension for their environment. In addition, in an embodiment of the invention, one or more limit switches may be used to detect if the wheels have dropped as an added safety measure to turn the motors off if a wheel loses contact with the floor surface or detect that the user has lifted the robot up.

Figure 6:
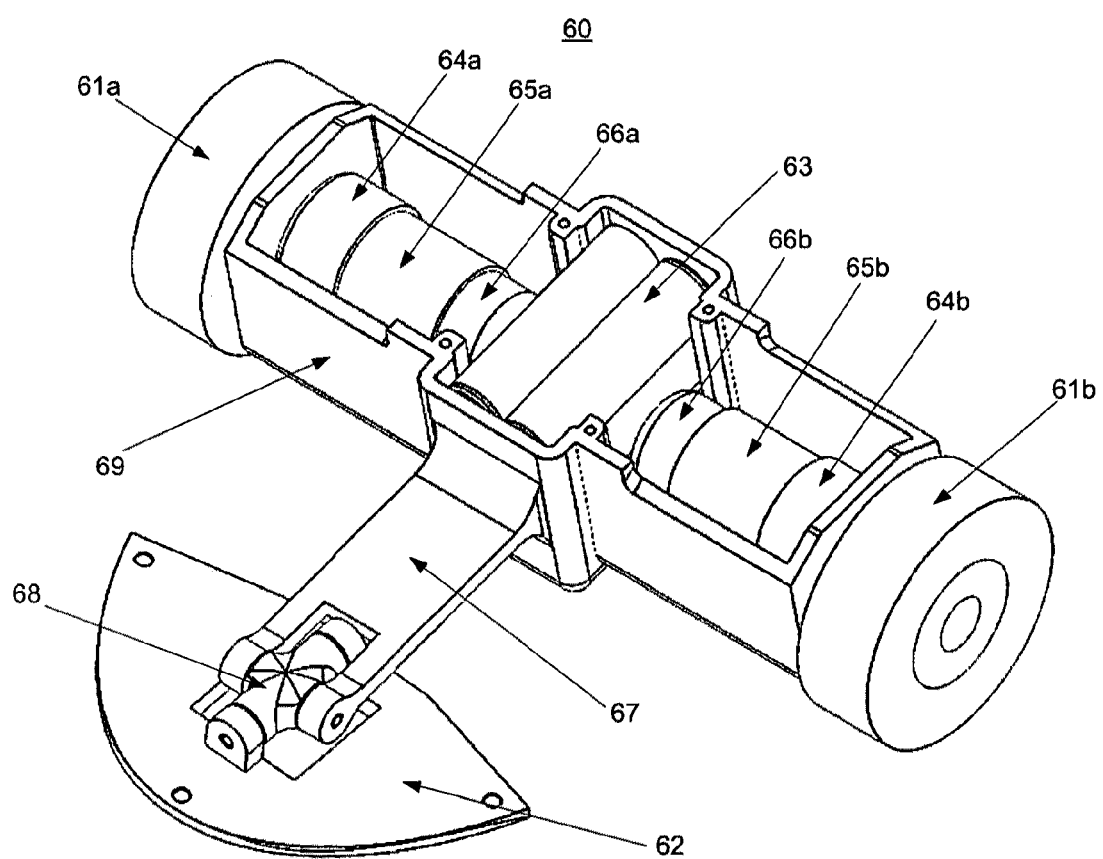
FIG. 6 illustrates a drive assembly according to an embodiment of the invention.

FIG. 6 illustrates a drive assembly according to an embodiment of the invention. FIG. 6 illustrates the primary components of the drive assembly, including the center bracket 67 which connects to the pivot joint 68 and travels relative to the mounting plate 62. FIG. 6 also illustrates the drive box 69 which holds the motors 65*a*, 65*b*, batteries 63 and the wheels 61*a* and 61*b*. In this embodiment of the invention, the batteries 63 are centered over the drive box 69 to provide weight for the wheels to maximize traction with the floor. The drive box also includes the gear box 64*a* 64*b* attached to the motor 65*a* 65*b* for reducing the RPM to the target speed of the wheels 61*a* and 61*b* and for generating enough torque to push the cleaning pad (not shown), and drive box 69 also includes the wheel tachometers 66*a* 66*b* to measure the effective rotation of the wheels 61*a* and 61*b*.

In addition to mechanical design of the robotic cleaner, the sensory system is also important to allow the cleaning pad to be fully exposed and not fit within the traditional designs of robotic floor cleaners.

In an embodiment of the invention, one specific design consideration is that the cleaning cloth of the cleaning assembly fully covers the leading edge of the cleaning assembly. The cleaning assembly and cleaning cloth are designed to have the cleaning cloth make full contact with walls and objects in its path, and thus there is no room for mechanical devices such as bumpers or feelers obstructing the cleaning cloth. Further, it is difficult for there to be proximity sensors placed in the cleaning assembly in any way where the cloth may cover them. This also applies for ease of use, so that the users do not have to work around any mechanisms when placing the cloth on the cleaning assembly.

By comparison, traditional robotic cleaners use simple contact sensing devices to detect obstacles, such as a bump sensor, mounted on the leading edge of the main robot body. Additionally, the same robots may also use one or more IR distance sensor or other type of proximity sensor placed along the leading edge of the robot to detect obstacles in the robots path and help avoid them. This placement of sensors along the leading edge of the robot is a very common design, and is in part one of the factors that drives these standard robots to place the cleaning mechanism within the robot body, so that its design and operation does not interfere with the sensors.

In the cleaning mechanism-centered approach described herein, alternative sensors or sensing techniques may be utilized to detect obstacles or drops in surface levels. For bump detection (or detection of obstacles), the robot's main controller (MCU) may detect increases in the motor current, which generally means that the robotic cleaner has hit an obstacle and the wheels are generating additional load on the motors while attempting to still move the robotic cleaner on its desired course. In an embodiment of the invention, a current sensor may transmit this information to the MCU. For wet cleaning application, where the wheels may slip too easily due to loss of traction, in order for enough current load to be detected, an accelerometer may be added to supplement the robotic cleaning system to detect changes in movement without relying on the wheels. The accelerometer may transmit information to the MCU. In both embodiments of the invention, the sensing function is delivered by internal systems within the robot, thus minimizing the external constraints on the robot's exterior design.

In another embodiment of the robotic cleaner, a gyroscope may be used to enhance the functionality of the robotic cleaner while maintaining its non-traditional design. Most traditional robotic cleaners include some type of edge cleaning behavior, often referred to as wall following. In wall following, the traditional configuration was to use side mounted IR proximity sensors to allow the robot to follow parallel with the wall, but just slightly away from the wall, to minimize bumping with the wall. In these traditional robotic cleaners, the bumping could trigger the robot's mechanical bump sensor as well as mark up the wall and furniture over extended periods of contact.

In the robotic cleaner described herein, where the cleaning pad is fully exposed and set to be wider than the shell of the robot, the function for edge cleaning requires that the cleaning robot purposely engages and rubs along the wall with the cleaning cloth wrapped around the sides of the cleaning pad, rather than avoiding the wall at a distance. In one embodiment of the invention, a gyroscope may be used to help perform this function, whereby when the cleaning robot makes contact with the wall, turns in one direction, and then drives with slightly more speed on the wheel opposite the wall, causing the side of the cleaning pad near the wall to plow in toward the wall and drive along it while cleaning. In this embodiment of the invention and under these conditions, the gyroscope may be used to help determine that the cleaning robot is maintaining a straight heading along the wall even through the wheels are purposely slipping to keep pressure against the wall.

In another embodiment of the robotic cleaner, the same approach may be used to clean along furniture and around obstacles, where the edge may not be a straight line. When the edge is not a straight line, the same plowing technique is used to hug along the furniture or obstacle, and the gyroscope provides information about the robot's amount of turn to the microcontroller (MCU) that allows the MCU to compare the estimated turn from the wheels tachometers and, and if there is a difference within a certain threshold, determine the presence of surface providing a resisting force.

In another embodiment of edge cleaning, the robotic cleaner may leverage the flat shape of the leading edge of the cleaning pad to align perpendicularly with walls and other straight surfaces such as area rugs, and the gyroscope is used to then turn the robot 90 degrees to clean in a direction parallel with the wall or the area rug.

In another embodiment, the gyroscope can support the robotic cleaner functionality by also supplementing the bump detection system, (especially on a wet surface). The gyroscope may indicate that the robotic cleaner may be twisting when one side of the pad hits an obstacle. The information from the gyroscope may be provided to the microcontroller (MCU) which would instruct the drive assembly to operate and have the cleaning robot to avoid the obstacle. This would allow the wheels to continue to spin and drive the cleaning robot to skid around the obstacle if desired. In a similar application, the gyroscope may indicate that the robot is not turning when it gets blocked by an obstacle on a turn, and the wheels are continuing to spin.

In another embodiment, the microcontroller (MCU) may make use of the robot's geometry in combination with the gyroscope to determine the general location of an obstacle. As one example, by having a straight and wide leading edge to the front of the robot (as the cleaning pad and cleaning assembly provide), and having the wheels nested in narrower than the width of the cleaning pad, the robot will experience different rotational forces when it hits an obstacle based on the location of the obstacle. For example, if the cleaning robot drives into a chair leg where the right side of the cleaning pad makes contact with the chair leg, the placement of the wheels will create a tendency for the opposite side of the robot to rotate forward and the right side is held back by the chair leg. If the cleaning robot hits the chair leg on the opposite side of the pad, the rotational force with be in the opposite direction. And if the robot hits the chair leg in the middle of the cleaning pad, the rotation force will be centered and canceled out. By measuring the degree of turn when contacting an obstacle, the gyroscope may allow the microcontroller (MCU) to estimate the position of the obstacle relative to the robot, and use that as input to plan a path around the obstacle or perform other maneuvers. This approach provides the benefit of what would normally require a segmented bumper or multiple proximity sensors in the front of the robot to determine obstacle location, without the need to use such sensors and keep the leading edge of the cleaning assembly free of obstructions. In embodiments of the invention, a similar method may be used to detect obstacles along the sides or rear of the cleaning robot based on the resisting rotational force created by the contact with the obstacle. In embodiments of the invention, back current from the motors, wheel tachometer input, accelerometer input and/or other sensors feedback regarding the cleaning robot's motion may be incorporated to assist in detecting contact with an obstacle and/or to help in measuring the direction of the resistance force from the obstacle.

Figure 10:
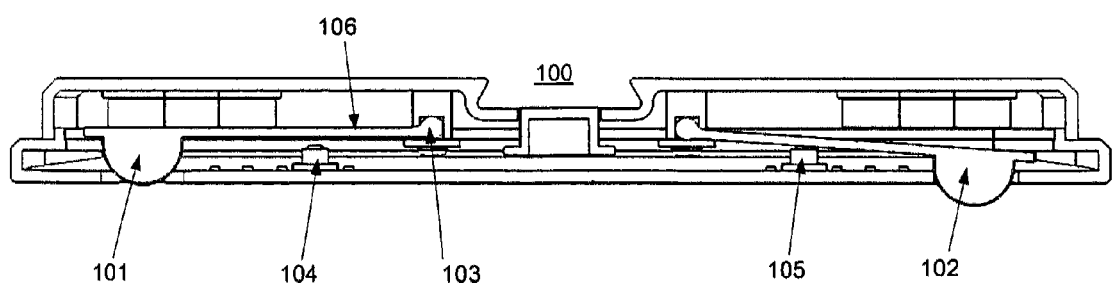
FIG. 10 illustrates a sensory system according to an embodiment of the invention.

FIG. 10 illustrates a sensory system according to an embodiment of the invention. FIG. 10 shows a sectional view of the cleaning assembly. FIG. 10 provides another example of adjusting the sensory function to fit within the cleaning mechanism. In traditional robotic cleaners, IR sensors are used to detect drop-offs in the floor surface to prevent to the robot from driving off ledges and down stairs. To function, the drop-off sensors need to be placed far enough in front of the wheels to allow the robotic cleaner to stop in time. They also need to be pointing relatively straight down with relation to the floor and are thus hidden some place under the robotic platform. The cleaning assembly provides a challenge for using traditional IR sensors, in that there is no place to locate the traditional IR sensors on the pad, since the cleaning assembly is covered by a cleaning cloth during normal operation.

In an embodiment of the invention illustrated in FIG. 10, a custom drop sensor system is used, which is built into the cleaning assembly itself. The system comprises of a mechanical lever 106 that is mounted on one end on a single pivot 103, and where the other end has a weighted object 101 that extends through a hole in the cleaning assembly. In an embodiment of the invention, the hole may be in the bottom pad of the cleaning assembly and keeps the lever 106 in a level position while the object is being supported by the floor surface beneath the cleaning assembly and the cleaning cloth. If the cleaning assembly begins to travel over a ledge, the weighted object 102 will drop to a lower position (as illustrated on the right hand side of FIG. 10) just as the weighted object cross over the edge, and the lever will tilt down with it to trigger a contact switch 105 or 104 or other limit detecting sensor which is wired to the robot's MCU to trigger the avoid behavior (or to stop the robotic cleaner from moving in this direction).

Because the weighted object 101 is mounted toward the middle of the cleaning assembly relative to the points where the cleaning cloth wraps around the forward and rear edges of the cleaning pad, the natural play (or travel) in the cloth material allows the weighted object 101 to drop even when the user wraps the pad tightly on top. In an embodiment of the invention, a small amount of flexible material may be permanently affixed over the drop sensor 101 and 102 to provide a sealed barrier for preventing fluid from a wet cleaning pad or dust from seeping into the cleaning assembly through the opening around the drop sensor 101 and 102.

Figure 11:
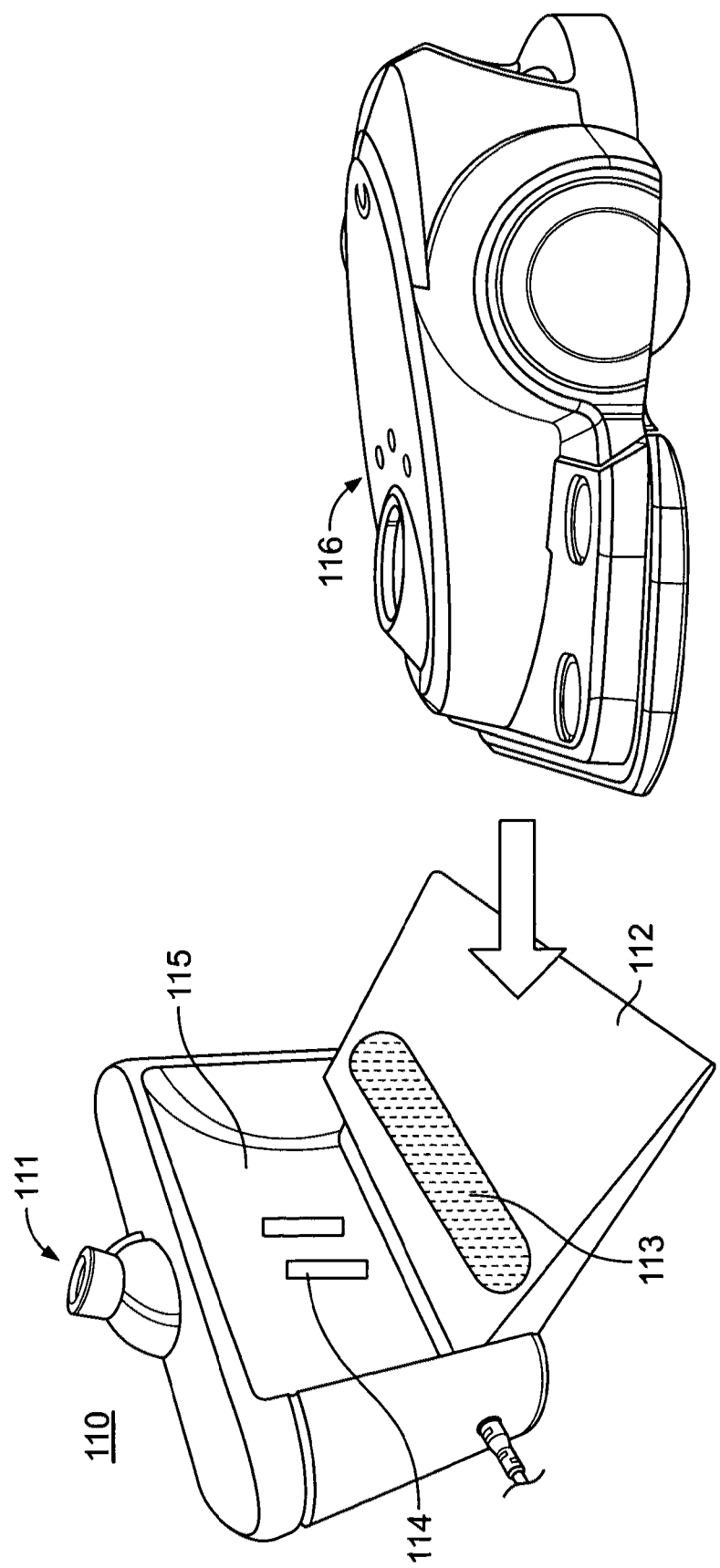
FIG. 11 illustrates a cleaning robot and a docking station according to an embodiment of the invention.
Figure 12:
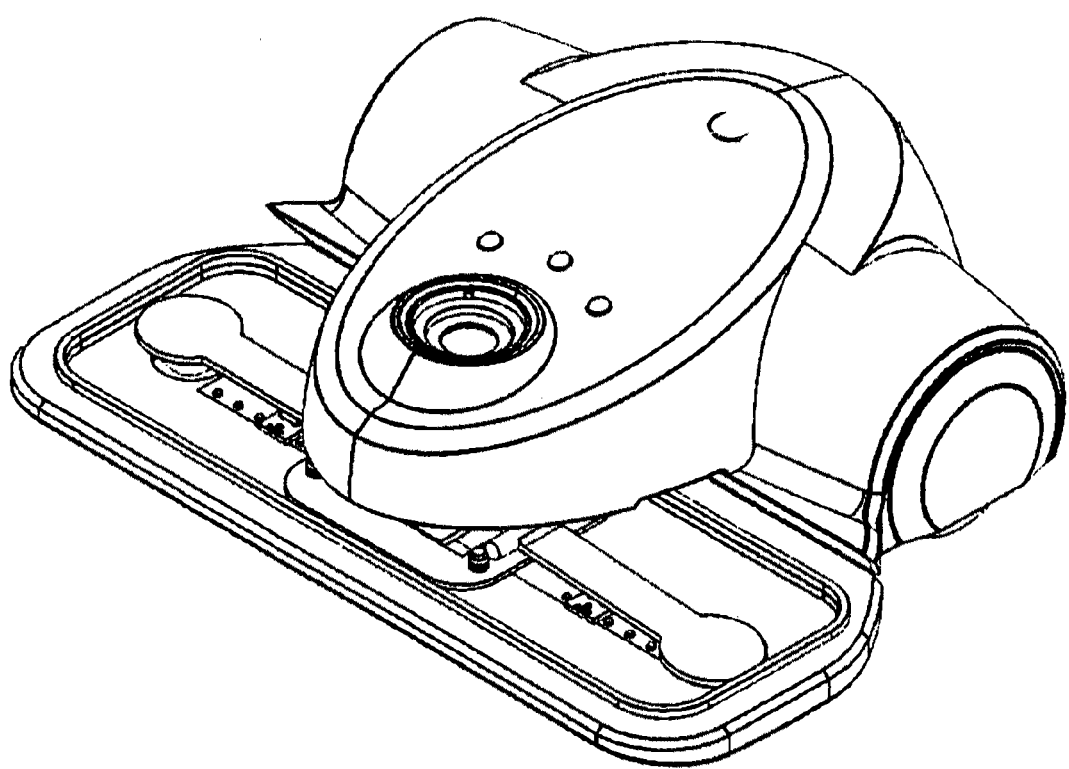
FIG. 12 illustrates a cleaning assembly of a cleaning robot with a top surface of the cleaning assembly removed according to an embodiment of the invention.

FIG. 11 illustrates a cleaning robot and a docking station according to an embodiment of the invention. The docking station 110 may also be referred to as a docking bay. In an embodiment of the invention, the robotic cleaner 116 may drive up to a docking station 110. The docking station 110 may include a ramp 112 and in one embodiment of the invention, the ramp 112 may be a foldable ramp. The docking station may include a pad removing strip 113. In this embodiment of the invention, the pad removing strip 113 may take used pads off of the cleaning assembly. The docking station 110 may include a used pad storage well 115. The docking station 110 may include charging connections 114. The charging connections 114 may dock with a rear section of the robotic cleaner. The docking station 110 may include a North-Star room projector 111 to provide a localization signal. In an embodiment of the invention, the docking station may include a secondary navigation beacon, which may be located on a front part of a top section of the docking station 110 to provide a directional signal for helping the robot locate, align with and/or drive into the docking station. In an embodiment of the invention, the docking station 110 may include a new pad storage well.

Figure 13:
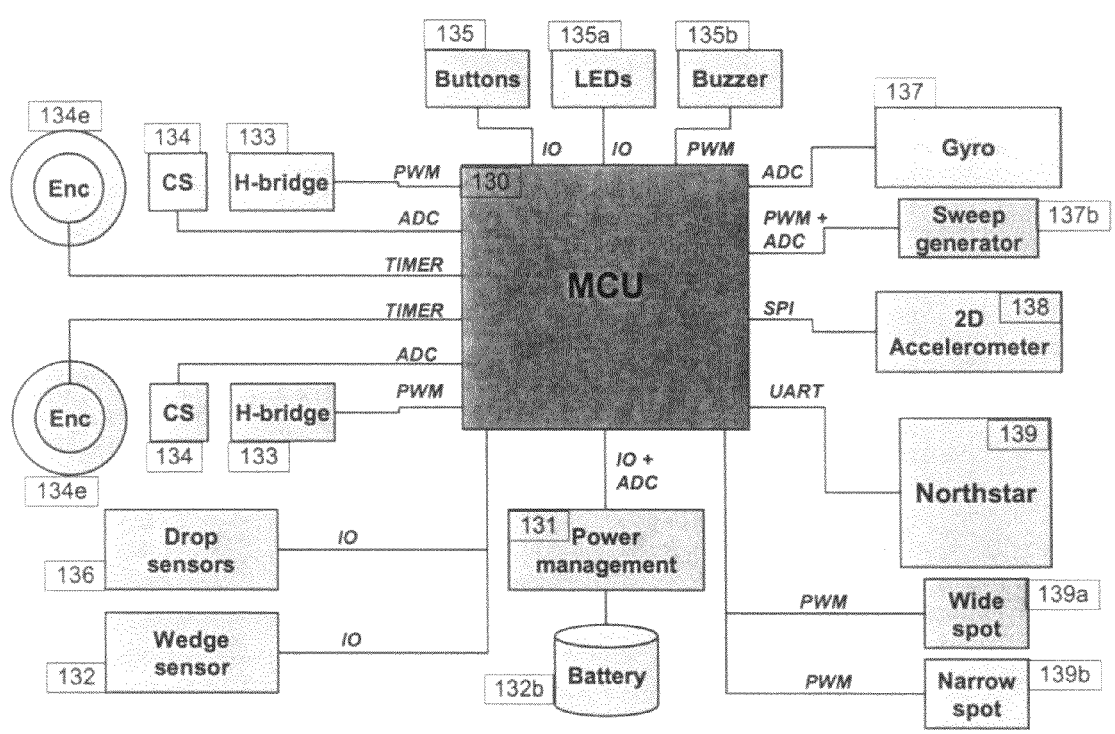
FIG. 13 illustrates a block diagram of the robotic cleaner according to an embodiment of the invention.

FIG. 13 illustrates a block diagram of the robotic cleaner according to an embodiment of the invention. The robotic cleaner may include a central microcontroller unit (MCU) 130, a power management module 131, a wedge sensor 132, a battery 132b, an H-bridge 133, a current sensor 134, an encoder 134e, user interface buttons 135, and LEDs 135a. The robotic cleaner may also include drop sensors 136. The MCU 130 is a central microcontroller unit responsible for running all navigation software and cleaning software, servicing sensors (e.g., receiving information and controlling sensors), receiving information and controlling user interface buttons 135, and interfacing with the power management module 131. In an embodiment of the invention, the navigation software and the cleaning coverage software is stored in memory on the microcontroller. In an embodiment of the invention, the navigation software and the cleaning coverage software is stored in a memory separate from the microcontroller. The memory, which includes the navigation software and the cleaning coverage software may be updateable or modifiable. The power management module 131 includes electronics and circuitry responsible for controlling battery charging, limiting charge/discharge currents to ensure safety, and conditioning the battery voltage. The wedge sensor 132 is utilized to detect situations where the robotic cleaner is about to get jammed under obstacles, e.g., low clearance furniture.

The drop sensors 136 are designed to detect sudden drops in the front of the robotic cleaner such as stairways and other types of ledges. In an embodiment of the invention, the drop sensors 136 may also detect if the cleaning assembly is lifted up from the floor, such as if the robot drives onto the edge of a rug or other low object, as a means to avoid driving onto those areas. A motor control module 133 is an electronics assembly or circuitry for controlling torque, speed and direction of rotation of the DC motor. The motor control module may be an H-Bridge which is utilized for controlling a brushed DC motor. The current sensor 134 may provide current feedback to a control algorithm for the DC motor. In an embodiment of the invention, the control software may be located in memory in the microcontroller 130. The encoder 134e provides speed and direction of rotation feedback for the control algorithm of the DC motor. The user interface buttons 135 are located on the robotic cleaner. The user interface buttons 135 include buttons for power on/off and cleaning mode selection. The LEDs 135a are light emitting diodes for providing visual feedback to a user. The LEDs may provide feedback on battery status, charging status and cleaning mode types.

The robotic cleaner may include a buzzer 135b. The buzzer is a speaker for providing audio feedback to the user.

In an embodiment of the invention, a robotic cleaner may include a gyroscope 137. The gyroscope 137 may sense changes in the robotic cleaner's orientation. In an embodiment of the invention, the robotic cleaner may include a sweep generator 137b. The sweep generator 137b is a circuit that provides a calibration circuit for an analog-to-digital converter. In an embodiment of the invention, the robotic cleaner may include a 2D accelerometer 138. The 2D accelerometer 138 is a sensor for measuring sudden changes in robot velocity. The 2D accelerometer may measure changes in velocity in two directions. The 2D accelerometer 138 assists in detecting bumping into obstacles and detecting robot kidnapping, e.g., when a robotic cleaner is picked up and moved by the user. The 2D accelerometer provides any detected change in velocity information to the MCU 131. For example, when a robotic cleaner bumps into an obstacle, the velocity of the robotic cleaner changes rapidly and the 2D accelerometer detects these changes. Similarly, if a user picks up a robotic cleaner, the accelerometer may detect a slowly changing velocity (or acceleration) caused by gravity and the user motion.

In an embodiment of the invention, the robotic cleaner may include a NorthStar® sensor 139. The NorthStar® sensor provides absolute position of the robotic cleaner relative to one or more infrared spots projected onto the ceiling or other surfaces above the robot by one or more external projecting devices and supplies this information to the MCU 130 for utilization by navigation software. In an embodiment of the invention, NorthStar® sensor may also detect and track the position of a line-of-sight infrared beacon or beacons powered by one or more external devices. In an embodiment of the invention, a wide spot NorthStar® point source infrared LED 139a may be located on the robotic cleaner in combination with the NorthStar® sensor 139. The refection from the wide spot NorthStar® point source infrared LED 139a as measured by the NorthStar® sensor may provide information about the environment such as proximity and direction to walls, furniture and other large objects. In an embodiment of the invention, a narrow spot NorthStar® focused infrared LED 139b may be located on the robotic cleaner in combination with the NorthStar sensor 139. The reflection from a narrow spot NorthStar® point source LED 139b as measured by the NorthStar® sensor may detect when the robotic cleaner is driving under low hanging surfaces such as chairs, beds, sofas and tables. In an embodiment of the invention, the sensor readings from the wide spot LED 139a and/or narrow spot LED 139b may be used to identify specific locations within a room or area of a home either by the value of the measurements themselves, or in combination with other sensory data relative to a location within a room or area of a home.

FIG. 14 illustrates an embodiment of a robotic cleaner according to an embodiment of the invention. The robotic cleaner 140 includes a main robot body 141 and a cleaning module 142. The main robot body may include the drive system and chassis, the navigation sensor and control electronics, the user interface, a handle and a docking connection. The cleaning module 142 may includes a cleaning cloth, pad or other material, which is applied to a floor surface. In this embodiment of the invention, the cleaning module 142 carries the batteries. The cleaning module 142 may mount to the robot chassis. In some models of the robotic cleaner, the cleaning module 142 is detachable and may be swappable with other cleaning modules having other cleaning functions.

Figure 15:
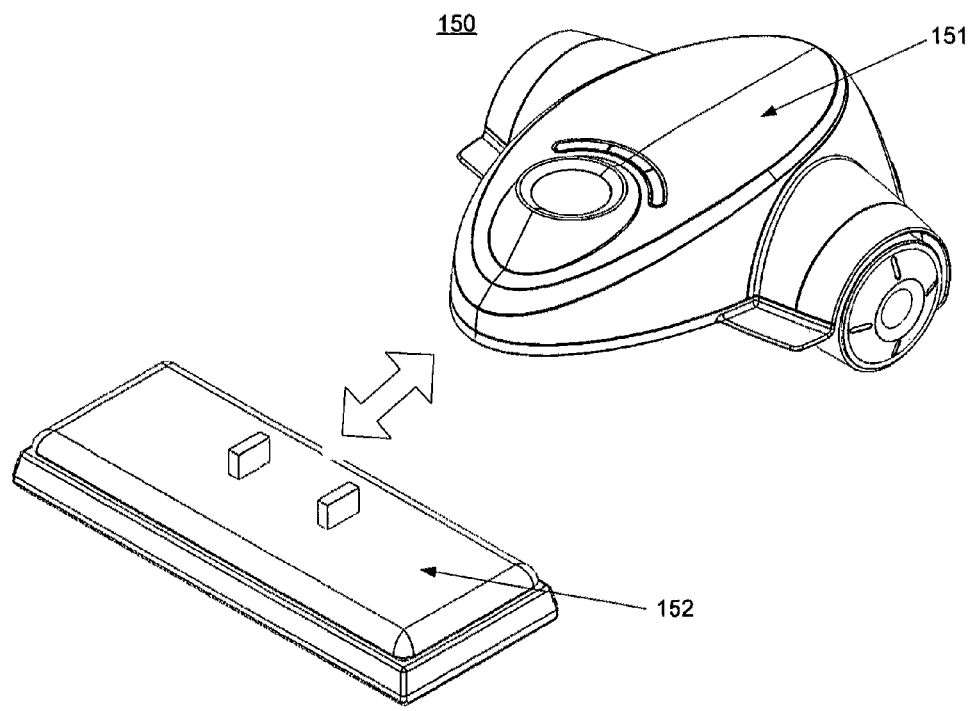
FIG. 15 illustrates a three quarter view of a robotic cleaner according to an embodiment of the invention.

FIG. 15 illustrates a three quarter view of a robotic cleaner according to an embodiment of the invention. The robotic cleaner 150 includes a main robot body 151, a universal joint with quick release option (not shown) and a cleaning module 152. The main robot body 151 and cleaning module 152 are similar to the embodiment illustrated in FIG. 14. The universal joint attaches the cleaning module 152 to the robot chassis. In an embodiment of the invention, the universal joint allows a degree of freedom for the cleaning module 152 to follow the floor surface. The universal joint provides a detachable option on some models of the robotic cleaner so that the cleaning module 152 may be switched out with another cleaning module with different cleaning functions. The universal joint may also connect power from the batteries to the main wiring harness in the main robot body 151 in an embodiment of the invention where the batteries are located within the cleaning module 152.

Figure 16:
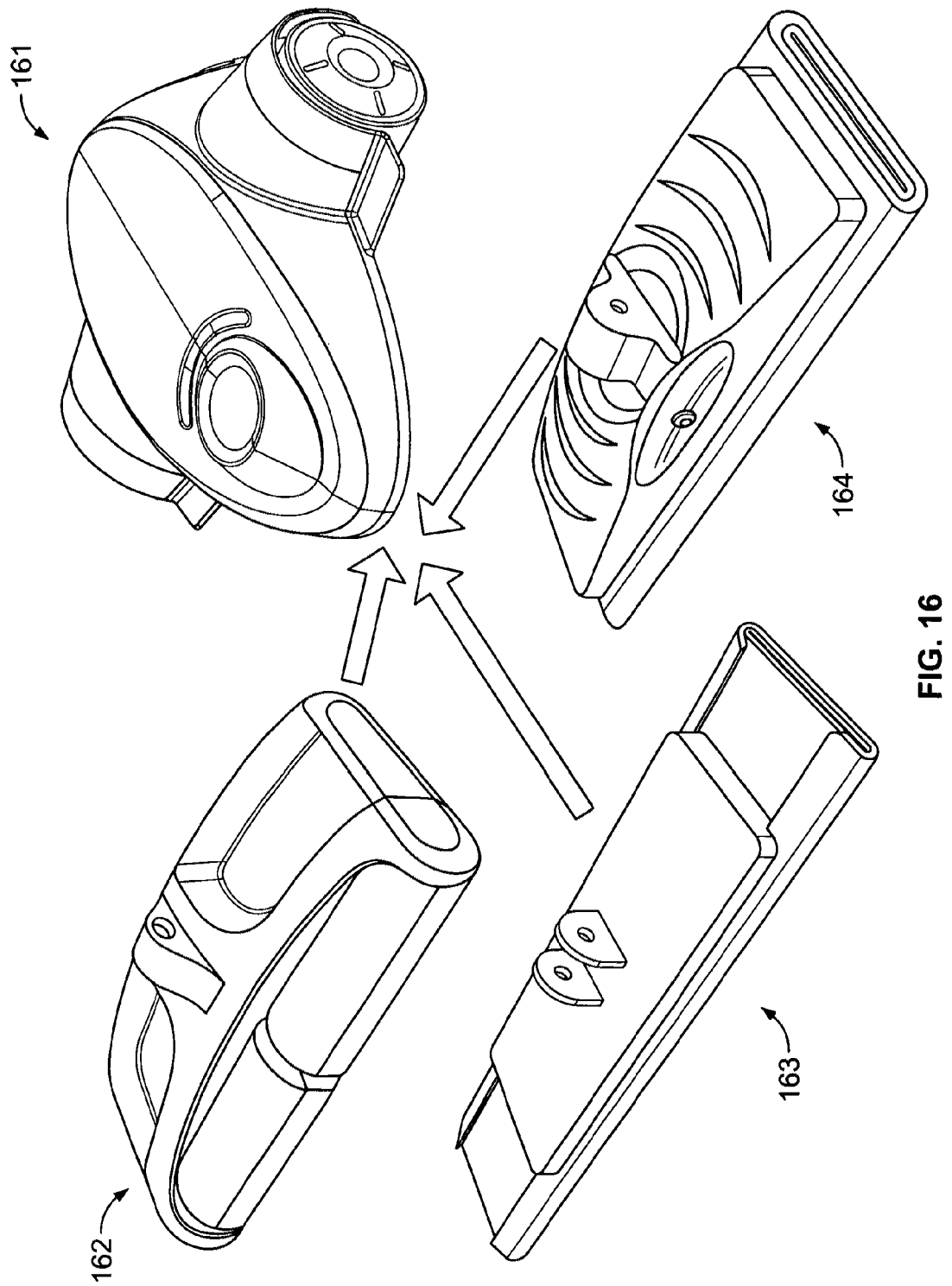
FIG. 16 illustrates examples of different cleaning modules for the main robot body.

FIG. 16 illustrates examples of different cleaning modules for the main robot body. Cleaning module 162 is a cleaning module with a motorized sweeper brush and dust bins. Cleaning module 163 includes an extra-wide cleaning pad which may be utilized for wet mopping or dry mopping. Cleaning module 164 includes a cleaning solution well, a sprayer or dispenser, and an absorbent cleaning pad.

Figure 17:
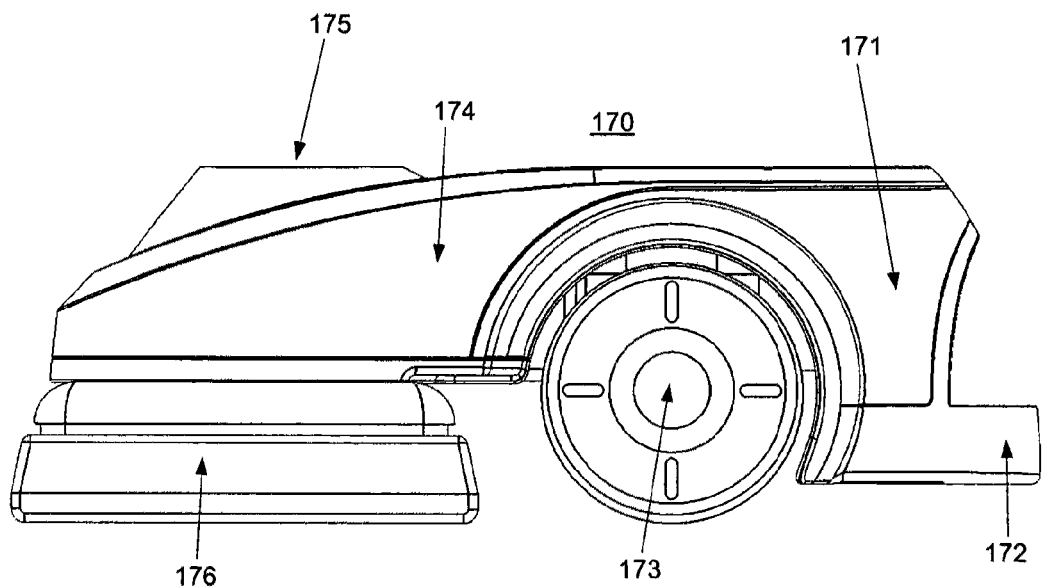
FIG. 17 illustrates a side exterior view of a robotic cleaner according to an embodiment of the invention.

FIG. 17 illustrates a side exterior view of a robotic cleaner according to an embodiment of the invention. The robotic cleaner 170 includes a internal power supply and motor control 171, a rear handle 172, a drive system 173 including wheels, a main robot body 174, an assembly 175 including a primary sensor and CPU and a cleaning module 176. The cleaning module 176 is similar to the cleaning module 142 in FIG. 14. The assembly 175 includes software installed thereon into a memory, which when executed, controls navigation and cleaning behaviors.

Figure 18:
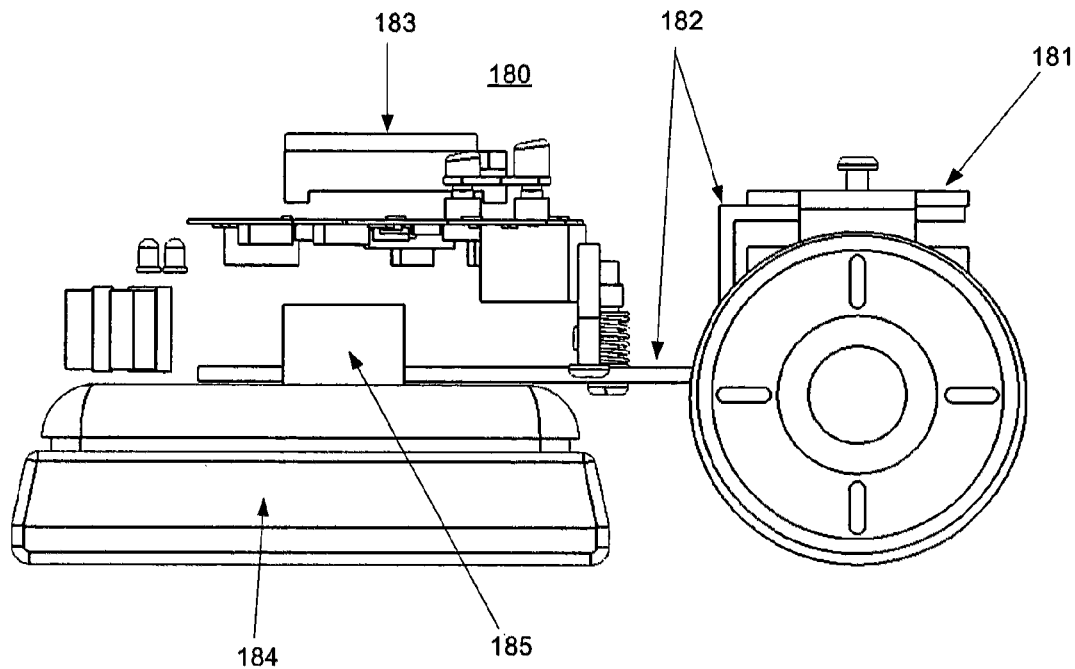
FIG. 18 illustrates a side cut-away view of the robotic cleaner with covers removed according to an embodiment of the invention.

FIG. 18 illustrates a side cut-away view of the robotic cleaner with covers removed according to an embodiment of the invention. The robotic cleaner 180 includes a power supply and motor control board 181, a robot frame and chassis 182, an assembly 183 including a primary sensor and CPU, a cleaning module 184 and a universal joint with quick release mechanism 185. The cleaning module 184 is similar to the cleaning module 142 in FIG. 14. The universal joint 185 includes functionality as described in FIG. 15. The assembly 183 including the primary sensor and CPU includes functionality described above in FIG. 17.

Figure 19:
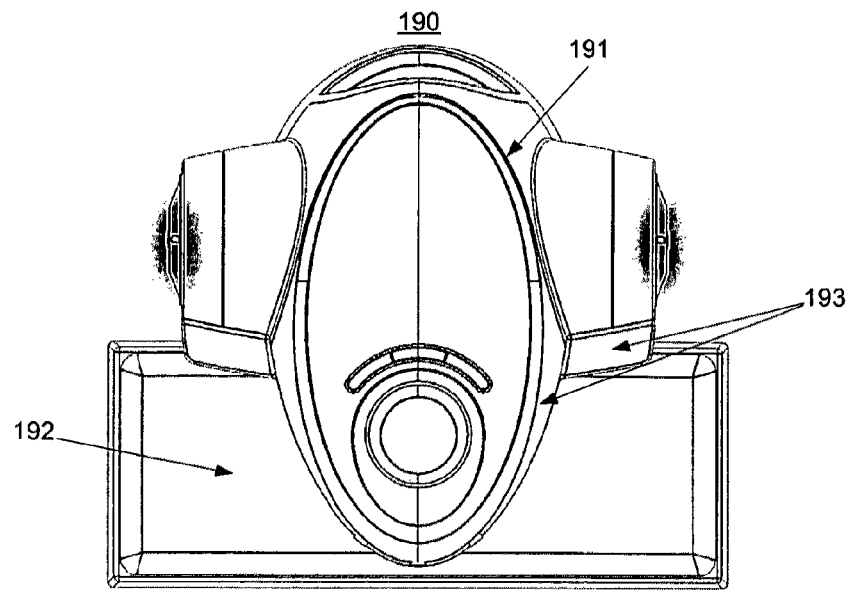
FIG. 19 illustrates a top view of a robotic cleaner according to an embodiment of the invention.

FIG. 19 illustrates a top view of a robotic cleaner according to an embodiment of the invention. The robotic cleaner 190 includes a cleaning module 192, a protective gasket/skirt 193 and a main robot body 191. The protective gasket/skirt covers 193 gaps between the robot body 191 and the cleaning module 192, while allowing the cleaning module 192 to pivot and tilt with the floor surface.

Figure 20:
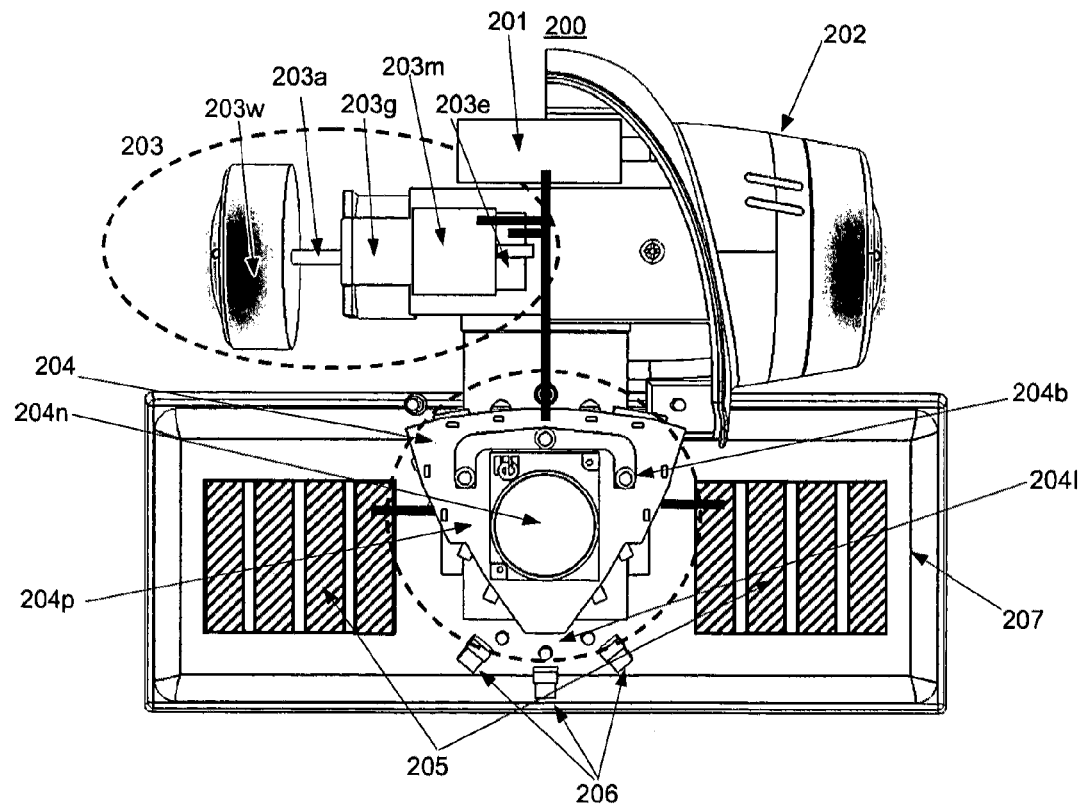
FIG. 20 illustrates a top view of a robotic cleaner with a cover (or shell) removed according to an embodiment of the invention.

FIG. 20 illustrates a top view of a robotic cleaner with a cover (or shell) removed according to an embodiment of the invention. The robotic cleaner 200 includes a power supply and motor control board 201, an outer shell 202, an inner frame and chassis, a left-right wheel differential drive system 202, a wheel assembly 203, a main control board 204, battery bays 205 and proximity sensors 206. The robotic cleaner 200 includes a cleaning module 207 which is similar to the previously described cleaning module 142 in FIG. 14. The power supply and motor control board 201 connects to a main harness for data and power. The power supply and motor control board 201 may also support (or interface) with an external charging port. The wheel assembly includes a wheel 203w, an axle 203a, a gearbox 203g, a motor 203w and an encoder 203e. The main control board may 204 include a Northstar® sensor 204n, a PCB with a main CPU 204p, program selection button(s) 204b, and indicator lights 2041.

The cleaning module 207 may house left and right battery bays 205. The proximity sensors 206 may be an option and may be utilize for forward, side and downward views.

Figure 21:
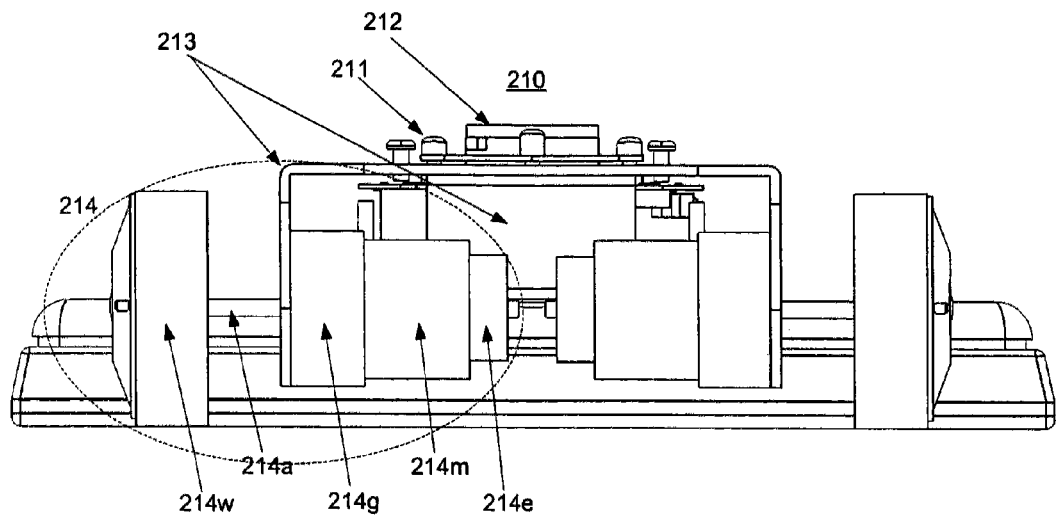
FIG. 21 illustrates a back view of a robotic cleaner with a cover removed according to an embodiment of the invention.

FIG. 21 illustrates a back view of a robotic cleaner with a cover removed according to an embodiment of the invention. The robotic cleaner illustrated in FIG. 21 includes user interface buttons 211, a NorthStar sensor 212, an inner frame and chassis 213, a left-right wheel differential drive and a drive system 214. The drive system xxx includes wheels 214w, an axle 214a, a gearbox 214g, a motor 214m and an encoder 214e.

An embodiment of the invention may include a robotic cleaner and a docking station according to an embodiment of the invention. The docking station may include a NorthStar® Room Projector, a foldable ramp, a pad removing strip, a used pad storage well, a secondary navigation beacon and charging connectors. The pad removing station takes used pads off of the cleaning module of the robotic cleaner. The charging connectors may dock with a rear section of the robotic cleaner.

Figure 22:
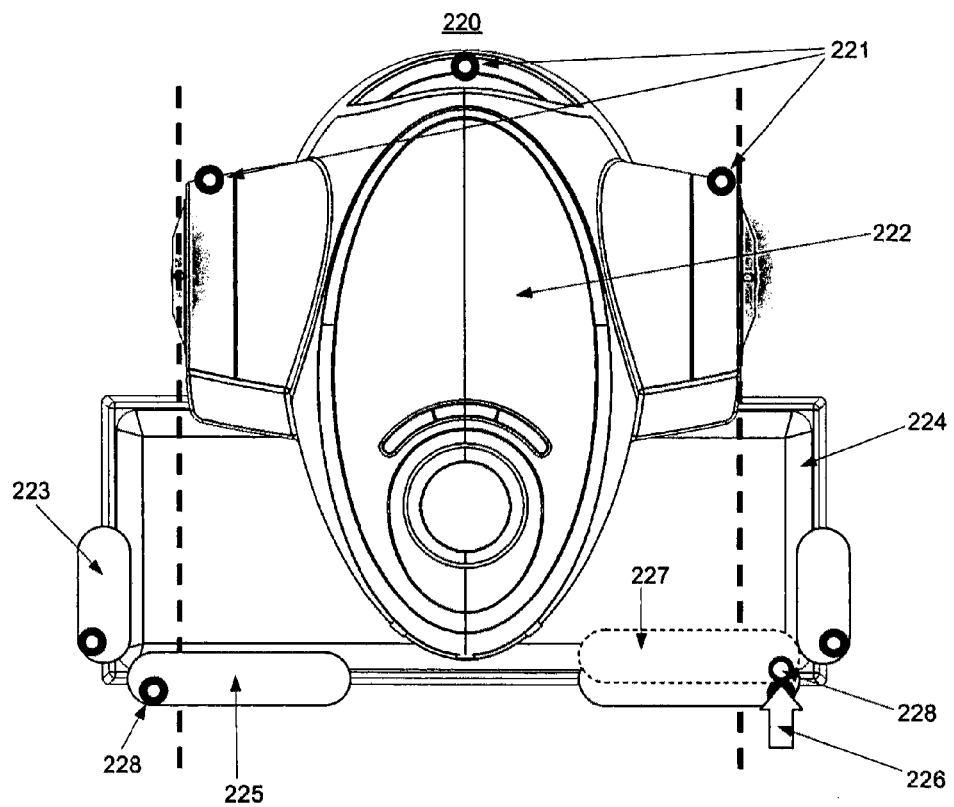
FIG. 22 illustrates a robotic cleaner with optional sensors according to an embodiment of the invention.

FIG. 22 illustrates a robotic cleaner with optional sensors according to an embodiment of the invention. The robotic cleaner 220 may include rear drop-off sensors 221, which are located on the rear of the main robot body 222. The rear drop-off sensors 221 may protect the wheels from backing off an edge of a surface while turning or travelling in a reverse direction. In an embodiment of the invention, the optional rear drop-off sensors may be built into the main robot body shell. The robotic cleaner 220 may include a retractable sensor/bumper 223, which is mounted on a side (or both sides) of the cleaning module. The side retractable sensor/bumpers 223 extend over and edge of the cleaning module 224. When the side retractable sensor/bumper 223 senses or hits a wall or obstacle, the side retractable sensor/bumper 223 retracts over the cleaning module 224 to allow for full reach to the wall and thus for cleaning to the wall.

The robotic cleaner may also include a front mounted retractable sensor bumper or bumpers 225. FIG. 22 illustrates a left front retractable bumper 225 and a right front retractable bumper 226. The right front retractable bumper is illustrated in the retracted position by the dotted line 227. The front retractable bumpers 225 and 226 retract behind a front edge of the cleaning module 224 when in contact with a wall or obstacle. The robotic cleaner may also include a drop off sensor mounted on the cleaning module 224. The front drop off sensor may detect edges, stairs and other drop-off conditions that are to be avoided. The front drop-off sensor 228 may be located on a retractable sensor bumper 225, 226 or 223 (as illustrated in FIG. 22) and may retract out of the way when the retractable bumper makes contact with a wall or objects.

The following section describes the design and functions of cleaning robot platform. This robotic cleaner platform can executed in a variety of embodiments, which include but are not limited to: a cleaning robot with a single purpose cleaning mechanism, a single cleaning robot with two or more cleaning mechanisms, and cleaning robot which is compatible with a variety of detachable cleaning accessories, or a combination of the above. An embodiment of a robotic cleaner shown as an example in includes:

1) Front cleaning module for holding a cleaning material directly to the floor surface (such as a disposable cloth or pad) where the module may be attached to the main chassis of the robot, with or without a flexible joint to allow maximum contact with the floor.

2) A battery pack located in the front cleaning module to provide power to the robot, as well as level apply weight to the cleaning module to for increase the amount of pressure applied to they floor surface by cleaning cloth or pad 3) Two powered wheel assemblies connected to the robot chassis (with or without suspension) position behind the front cleaning module 4) A main chassis holding all of the components together 5) A NorthStar® positioning sensor placed near the front cleaning module to provide positioning information 6) A main control board with microprocessor, memory and I/O into all of the electrical components for controlling the robotics functions and behaviors 7) Software that runs on the microprocessor to perform all functions and behaviors 8) Wheel or motor encoders that track the movement of each wheel on the robot and use that information to help control its path and calculate its movement 9) Circuitry that enables the microprocessor to measure the current of the motors, as a means of detecting when the robot has made contact with an obstacle through some part of its shell without the need for a mechanical bumper, proximity sensor or other electronic device (although those systems could be optionally employed)

10) A shell that covers the body of the robot

11) Buttons, lights and/or other means of user interface that enable the user to turn the robot on and off, select programs and understand its status Additional sensors may be integrated with the robot based on the desired functionality, which is described in more detail below.

The robotic cleaner may include additional modular options. Additional modular options for an embodiment of the robotic cleaner may include but is not limited to:

1) Detachable wheels for changing to different drive surfaces.

2) Sensor modules for adding additional components.

3) Detachable and/or updatable main processor and/or memory for updating the cleaning programs and capabilities of the robot.

4) Detachable front cleaning module, that is connected by a mechanical release, magnetic connection, electrical connections and/or other mechanisms to provide the user one or more functions, which may include but are not limited to:

a) Enabling the user to detach the cleaning module from the robot body to make it easier for the user to clean the module and/or change out cleaning materials used in connection with the cleaning module, such as a pad, cloth, sponge, brush, canister, solution and/or other cleaning component, and then reattach the cleaning module to with refreshed materials.

b) Enabling the user to detach the cleaning module and reattach the module in an alternative position or positions, to adapt the cleaning module for different tasks and/or surfaces, and/or make more efficient use of the cleaning materials. One embodiment includes is not limited to allowing the user to turn the cleaning module 180 degrees so that the cleaning surface that was facing the rear of the robot is now facing the front, for cases where dirt and/or other material may tend to build up on the forward most area of the pad.

c) Enabling the user to detach the cleaning module to plug it into a charging device to recharge the batteries, without having to connect the entire robot.

d) Enabling the user to detach the cleaning module to replace it with either a new but similar replacement cleaning module and/or replace it with a functionally different cleaning module that is compatible with the robot body, but provides additional and/or different capabilities for cleaning. Embodiments of these accessories include but are not limited to:

i) a cleaning module that holds a stationary cleaning material, such as a cloth, pad, sponge or other material.

ii) a cleaning module that may include a powered mechanical cleaning device, such as a motorized brush, duster, buffer, vacuum, fluid or steam cleaning apparatus, motorized pad, cloth or sponge, and/or other powered device, either by itself or in combination with another powered device, stationary cleaning material, and/or waste collection bin for gather material from the floor.

iii) a cleaning module that may dispense cleaning solutions and/or fluids, apply steam for cleaning, use sprays, foaming solution and/or other dispensable material for cleaning.

iv) a cleaning module that includes an air and/or floor surface freshening device a cleaning module that includes a secondary drive system and/or unpowered wheels to provide more support, traction and payload capacity if needed for the modules' function. a cleaning module that uses two or more of the approve systems in combination.

5) Leveraging the ability to have detachable modules for different cleaning tasks to provide other supporting functions, which can include but are not limited to:

a) adjusting form factor of the cleaning device to optimize for performance while maintaining a standard robot body.

b) adjusting the number of batteries or power source located within the cleaning module to match it with the specific requirements of the cleaning mechanism. including stored software, data, instructions and/or control electronics in the cleaning module that the robot can utilize to update and/or adapt its available programs to match the functions of the cleaning module.

c) including enhanced sensors, drive mechanism, and/or other systems that expand the robot's capabilities and/or enhance its performance.

Some of the robotic cleaner configurations utilize expanded sensor capabilities. Design executions of the robot and/or cleaning module may additional sensor configurations for enhance performance, where embodiments of the additional sensor configurations include but are not limited to:

1) The placement of one or more drop-off sensors on the robot and/or cleaning module to detect and help the robot avoid, stairs, ledges and other drop off areas.

2) The placement of one or more mechanical bump sensors on the robot to detect contact with objects.

3) The placement of one or more proximity sensors for measure distance to walls, objects and/or other obstacles to avoid them without the need to make contact and/or engage in specific navigation and/or cleaning behaviors such as wall following.

4) The placement of one or more light emitting optical flow sensors to provide additional measure for relative ground motion and/or provide an alternative means for detection drop off areas, detecting when the robot has been picked up, detecting if and/or tracking how the robot has been manually moved.

5) The placement of NorthStar signal emitting projectors on the robot itself to utilize NorthStar's capabilities to provide additional information on the surrounding environment and/or expand the operation of the robot, which may include but is note limited to:

a) Detecting when the robot is under a table or other object that may be obstructing its direct view of the main navigation signals from a NorthStar room project.

b) Detecting the presence, proximity and/or general location of walls and/or other objects.

c) Detecting user gestures through reflection of the projected light off of their body and/or movement near the sensor.

d) Any combination of the above systems.

One option for a design execution of the robot cleaner addresses the problem of placing the cleaning module, material and/or mechanism in the front of the robot, to enable it the module and reach all the way to walls and edges around obstacles, while at the same time wanting to detect obstacles and/or avoid falling over edges and stairs. In a conventional cleaning robot, sensor mechanisms are placed in front in maximize detection of obstacles and hazards. These sensors usually include a bumper sensor, IR or sonar proximity sensors and/or IR drop-off sensors. The cleaning mechanism is traditionally placed behind these sensors, limiting how far it reaches when the robot comes into contact with a wall, obstacle and/or other hazard.

As an alternative embodiment, a possible design that can be integrated in this base configuration is a retractable drop-off, wall and/or obstacle detection system. This option can be used independently and/or integrated with the use of other sensors placed in other locations of the robot, such as on the sides and/or the back of the robot to provide additional capabilities and/or protection. This system can consist of but is not limited to the following design:

One or more bumpers than extend over the front edge of cleaning module and/or over the sides of the cleaning module, where the bumpers retract over the cleaning module and/or get pushed in (such as through a spring and/or other tensor mounted mechanism) when they come into physical contact with wall, object and/or obstacle, and return to their neutral position when the robot moves away from the obstacle.

Where when pushed in, the bumpers allow the cleaning module and associated cleaning material and/or mechanism make full contact with the floor to the edge of the wall, objects and/or other obstacles, and/or if needed, may make contact to clean the vertical base of the wall and/or other objects as well.

The bumpers include one or more sensors that, when the bumpers are extended, the sensors can see past the edge of the cleaning module and be used for one or more of the following tasks, which include but are not limited to:

1) Drop-off detection to prevent the robot from driving over a ledge and/or down the stairs through the use of one or more sensors focused on the floor area in the path of the robot.

2) One embodiment can include but is not limited to where the drop-off sensor or sensors can also be used to detect if the robot has been lifted off from the ground and change its operation mode accordingly.

3) Motion tracking, where one or more optical motion tracking sensors directed toward the floor, which can track the robot's movement over the floor surface.

4) One embodiment can include but is not limited to a system that has at least two sensors, mounted on opposite sides of the robot to track both the forward and backward motion, but also the turning motion of the robot. This information can be used independently when the other positioning information is not available to estimate the robots' location and/or can be fused with information from other positioning sensors and navigation systems to enhance the estimate of the robots' position.

5) Embodiments of the sensor system can also include the function but not be limited to where the same sensor or sensors can also be used to detect if the robot has been lifted off from the ground and change its operation mode accordingly. Obstacle detection in the path of the robot, such as for travelling forward and/or turning.

6) Wall and side object detection, enabling the robot to align itself to walls and/or other contours formed by objects and engage in classic wall following behaviors, which can include but are note limited to:

7) Cleaning along the edges of walls

8) Cleaning along the perimeter of furniture and other objects

Aligning its systematic path to the outline of walls and barriers in a room, where one embodiment can include but is not limited to the patterns shown in FIGS. 1-7 earlier, where the robot aligns part or most of its be parallel to the main boundaries of the room or area.

9) Engaging in perimeter following behaviors to navigate back to another location in a room when position information is not available or reliable.

10) Mapping the boundaries of the room and/or area.

11) Beacon and/or other object detection that can be used to help the robot dock and/or perform operations which require the robot to align the cleaning module to another device.

12) One embodiment can include but is not limited driving onto a docking ramp and stopping over a specific area marked with a pattern and/or reactive material, where the placement of the robot in that location on the ramp is part of performing a maintenance, self-cleaning and/or other operational function.

13) Bump detection, where the change in position of the bumper or bumpers provides indication of contact with a wall, obstacle and/or object.

Embodiments can include but are not limited to contact switch mechanisms which detect the change in position and/or retraction of the bumper.

Other embodiments can include but are not limited to use of the function of the integrated sensor, to detect that the bumper has been pushed in. Examples include using the change in readings from an edge detection sensor, proximity detection sensor, motion tracking sensor and/or other sensor to detect that the sensor is in the retracted position, as well as any combination of the above approaches.

Where the placement of the bumpers and integrated sensors in the neutral position provides for protection of having the robot go too far over an edge before being able to correct its path. Embodiments of this sensor system can include but are not limited to:

1) Placing sensors capable of edge detection either in parallel with the outer most point of the rear wheels (measured from the perpendicular distance from the center axis that travels back to front through the robot), or extended further out to the sides than the wheels are.

In an embodiment of the invention, the cleaning module is designed to be wider than the wheel base, so sensor placement could either be on the sides of the cleaning module, and/or on the front leading edge on the left and right sections of the cleaning module that extend past the wheel base.

Another embodiment for drop-off detection can include but is not limited to having the drop-off sensor built into the underside of the cleaning module in the desired regions needed to protect the robot from falling over edges and/or down stairs, but modifying the sensor design to work in the specific conditions of the cleaning mechanism, such as being able to function when covered by a cleaning pad, cloth or other material.

In one embodiment where the robot has a cleaning cloth or pad attached to the base of the cleaning module for cleaning floors, the drop off sensors could project a signal through the cloth or pad material, and be calibrated to account for the disruption of the signal passing back and forth through the material, and using a range of thresholds, detect when the sensor was travelling over a drop-off area. This calibration could be pre-calculated and/or dynamically adjusted based on environmental conditions and/or the specific material used for the cleaning task. In one embodiment, this could be performed as an auto diagnostic, which may or may not involve having the robot drive around to calibrate, and/or having the robot travel to controlled environment such as on a base station, that allowed it to calibrate thresholds for the presence and/or absence of contact with the floor. Another embodiment can include but is not limited to using the sensor readings to also assess the amount of dirt and/or other material built up on the cloth or pad, and/or the amount of dirt and/or material being picked up in a specific areas of the floor, in order to enhance the robot's cleaning performance and/or provide user feedback.

Additional embodiments of robotic cleaners may include different product concepts or design elements that can be use used in combination with systematic and/or non-systematic localization systems to enable intelligent cleaning. The range of possible embodiments includes but is not limited to the concepts, functional elements and/or design elements listed below, or combinations thereof.

Key Functional Attributes may include low-cost mobile robots, each designed for a specific cleaning task or select set of task (simple but effective cleaning mechanisms & accessories), which are fast, agile, lightweight, quiet and have super smart navigation and control system for systematic cleaning.

The design attributes may include an open/organic design. Aspects of the robotic cleaning device should echo the functional elements of everyday household cleaning products and appliances to help communicate purpose and function to consumers. FIGS. 23-28 provide popular reference points as cases of common cleaning products according to the prior art. However, each robot needs to incorporate and emphasize significantly evolved robotic/functional features that clearly distinguishes the product and conveys elements of its intelligence and autonomous capabilities.

Additional design attributes may include that 1) the robotic cleaner should appear much less bulky than existing robotic cleaning products on the market, such as Roomba® (less mass); 2) the robotic cleaner be much more sportier, faster, agile, (e.g., if Roomba® is a minivan, the robots described herein are sports cars); 3) it is ideal for the robotic cleaner to stay low to the ground for clearance and reach; and 4) that the active cleaning function for each robot is a "hero" feature (takes prominent focus).

For effective coverage, the robot may need to be as large as 10 to 12 inches in width for medium-scale robots. Small-sized robots would emphasize speed and ability into tight spaces. The drive system for the robotic cleaners may be placed in rear, and should feel smaller in proportion (e.g., have a narrower footprint). The drive system may have either two rear wheels or two tank treads that fit within the curved boundary. The drive system of the robotic cleaner may be driven by off-the self batteries (e.g. 4-8 AA) and may be rechargeable.

Structure can extend on sides to provide part of forward structure as well (fenders)—such as for mounting stair and wall detection IR sensors. Some designs of the robotic cleaner may connect front and back on some of the robots with flexible joint/swivel, e.g. for reaching into corners with the pad cleaner. Any external edges of the robot made of solid plastic should be curved to avoid catching on objects as robot turns. The robotic cleaner may have ways for front cleaning devices to be flexible, at least on leading corners, e.g., making the ends for cleaning pad holder be flexible rubber so the pad lifts up as it rubs along something Other components of the design for a robotic cleaner may include: 1) NorthStar navigation sensor would go on highpoint on top of drive system; 2) the robotic cleaner has power leads for docking with recharging station, which are most likely towards rear of chassis, and possibly underneath.

Figure 23:
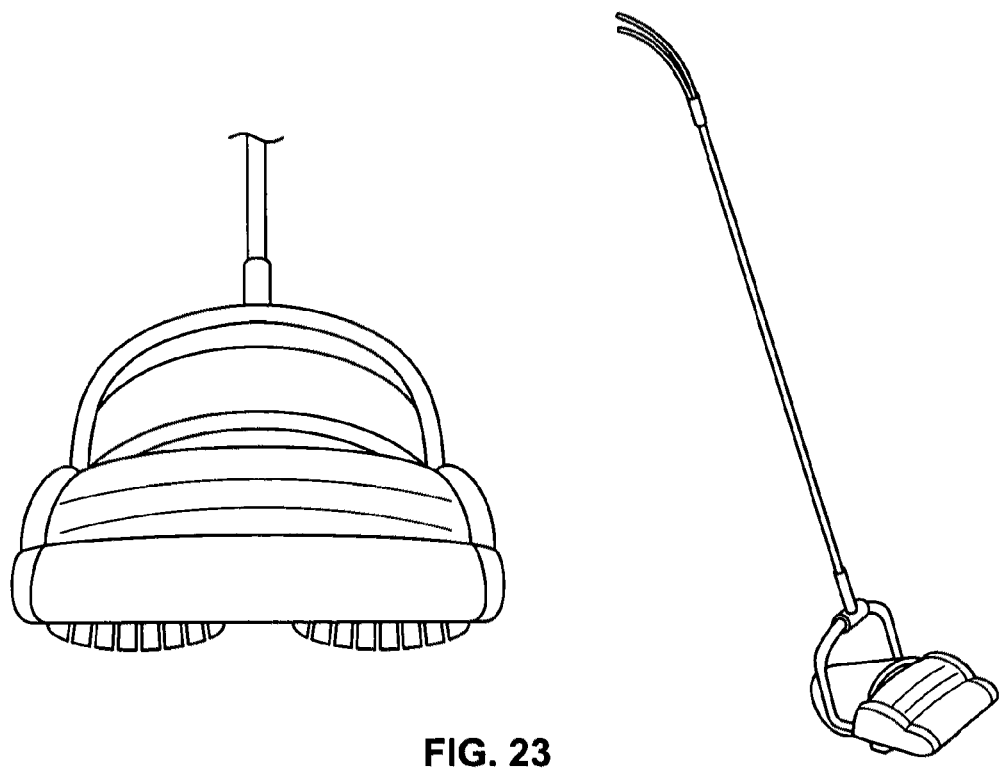
FIG. 23 illustrates a manual floor cleaning device with rotating brushes as a cleaning mechanism according to the prior art.

FIG. 23 illustrates a manual floor cleaning device with rotating brushes as a cleaning mechanism according to the prior art.

Medium-sized robots or robotic cleaners may include, but are not limited to: a floor sweeper, a dry pad cleaner, a web pad cleaner, a combination vacuum with dry pad cleaner, a robotic floor polisher/buffer, and a robotic floor scrubber.

The Floor sweeper may include a rotating brush with rear bin. The floor sweeper is:
1) Designed for $1^{st}$ level of cleaning
2) Brushes up dust bunnies, pet hair, small debris
3) Designed to work on hard wood floors, tile floors and short length carpeting
4) May or may not have cloth or pad to be used in combination with the sweeping mechanism, where brush can be placed in front with the cloth or pad grabbing remaining dirt Two executions of the floor sweeper may be implemented including a horizontal roller brush or two counter rotating brushes.

F1: The Horizontal roller brush includes features such as:
1) Can incorporate front roller brush, that may or may not extend beyond the frame of the robot (show one with exaggerated size to emphasize function)
2) Extend beyond the frame would improve reach for getting to the bottom of walls and underneath furniture
3) Apply a lot of surface area contact where ever they reach
4) Roller brush could be disposable or reusable and/or washable
5) Robot chassis and drive system exists behind the brush in one scenario
6) Semi-circular rear body is probably the most pragmatic for navigation, but a more square-like shape can be an option.

F2: Two counter rotating brushes (street cleaner style) configuration may, as in F1, include a brushing mechanism that can extend beyond the sides for the robot for maximum reach.

Accessories for the floor sweeper include:
F3: A Docking station which may:
1) Recharges batteries
2) Empties dust bin into larger stationary container (such as having vacuum in station)
3) Vacuum can also self clean the duster brush or brushes.
F4: One embodiment can include but is not limited to:
1) The duster robot drives into the dock. (e.g., maybe backs in). It cradles under a nozzle that goes right over a port at the top of the dust bin—which lets the station suck out the dirt from the dust bin into a larger container.

2) The docking station may be designed so that the robot could also drive forward into the dock, and use the vacuum to clean the brush as well.
3) If there is a cloth or pad, some sort of catching mechanism underneath on the docking station right below the cloth or pad. When the robot reverses out, the dirty pad gets pulled off and then the vacuum sucks that into the storage bind as well.

Another medium robotic cleaner is a dry pad cleaner for hardwood and tile floors. The dry pad cleaner may include features such as:
1) Designed for $2^{nd}$ level cleaning
2) Uses cloth-like pad for collecting smaller particles, dirt and dust
3) Should include some forward feeler/bumper for detecting and avoiding driving onto carpet There may be three executions of the dry pad cleaner:
D1: A first design is a Basic design with single fixed pad on front
1) This design looks like mop with drive mechanism behind
D2: A second design includes the same rear chassis but with auto-changing pad multiple pads on roller/belt mechanism
D3: A third design puts a Swiffer® pad underneath the body robot, so that it picks up the dirt the roller misses.
1) If it was on the square version, it could go towards the back—with the wheels in the middle.
2) Building on that approach, one idea would be to let the user load a small stack of pads into the back. (maybe 5 or 8 in a spring loaded tray—that's mounted upside down) That way they can just pull out a dirty one and have a clean one underneath ready to go. (or make removal automatic at the docking station). If there is a stack, can showcase that by having the side or rear corners transparent as well, where the user sees the stack and how many are left.

Accessories for the dry pad robotic cleaner may include:
D4: Drive-on docking station elements and option
1) Low ramp-based shape—robot drives in and up, backups to exit
2) Recharges batteries
3) Static brushes catches extra bits of dust from cleaning pad and drops debris in bin (such as when robot drives on and exits off)
4) For robot with multiple pads, can grab and tear dirty pad off to expose clean one. Mechanisms can include: a) Mechanism on docking station that has teeth or other elements that grab and pull the pad off while the robot is parked on the station (which can be driven by its own motor, or powered by the wheels of the robot when it is parked on the docking station; b) Static and/or retracting directional teeth or other gripping elements that are built into the docking station, designed to allow the robot drive up onto the station, and then engage and hold the cloth or pad when the robot backs out of the docking station; c) Automatic pulling and/or flipping mechanism for moving the dirty cloth or pad out of the way and/or into a storage area, to make room for the robot to repeat the process when the next dirty cloth or pad needs to be exchanged
5) Alternatively, the docking station and robot can be designed so the robot can push the dirty cloth or pad into a storage/waste bay once the pad is removed, where one embodiment can include but is not limited to having the robot back out, turn and back into the docking station, where a bumper or edge provides a surface on the robot for shoveling the pad off the docking station and into a storage bay.

Figure 24:
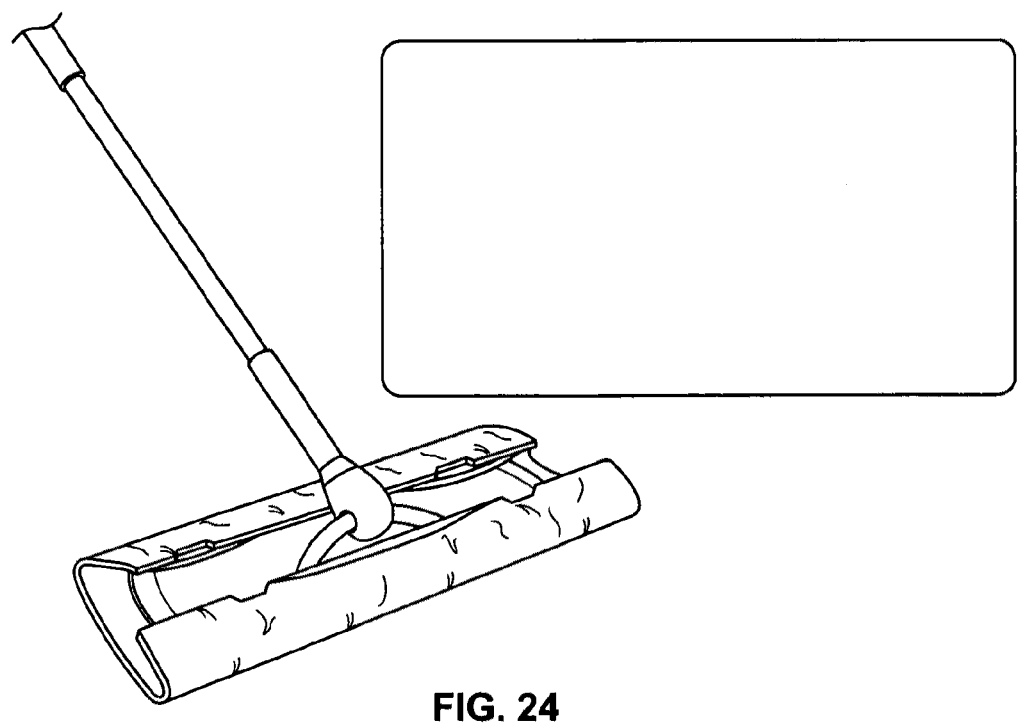
FIG. 24 illustrates a Swiffer sweeper in its packaging and also the cleaning pad assembly of the Swiffer Sweeper according to the prior art.

FIG. 24 illustrates a Swiffer sweeper in its packaging and also the cleaning pad assembly of the Swiffer Sweeper according to the prior art.

Figure 25:
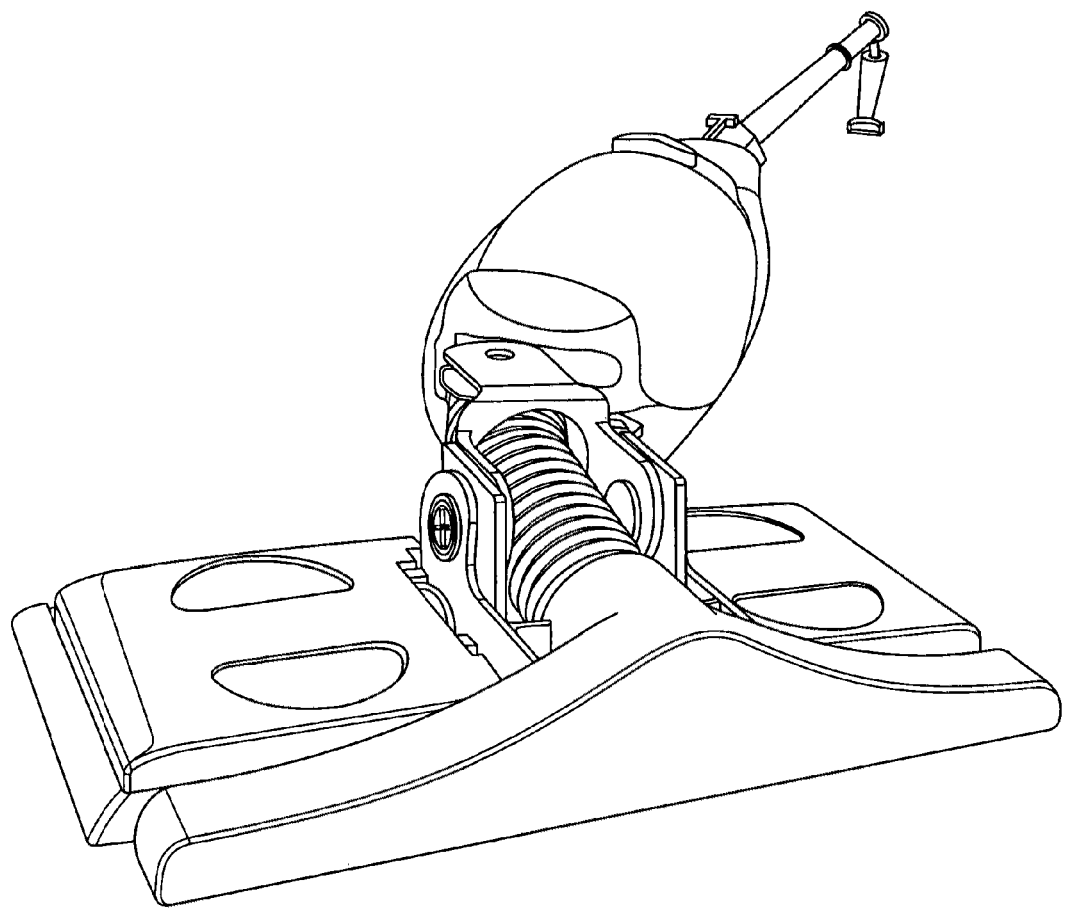
FIG. 25 illustrates a Swiffer® SweeperVac® according to the prior art which is a combination vacuum with dry pad cleaner.

The robotic cleaner may also be a combination vacuum with dry pad cleaner for cleaning hardwood and tile floors. The combination vacuum with dry pad cleaner is:

1) Designed for $1^{st}$ and $2^{nd}$ level cleaning
2) Uses vacuum to get larger debris first
3) Uses cloth-like pad for collecting smaller particles, dirt and dust One execution of the combination vacuum with dry pad cleaner is: V1: Combination of design D1 of the dry pad cleaner with a vacuum in front of pad FIG. 25 illustrates a Swiffer® SweeperVac® according to the prior art which is a combination vacuum with dry pad cleaner.

The medium sized robotic cleaner may also be a wet pad cleaner for hard surface floor. The wet pad cleaner is:

1) Designed as alternative for mopping
2) Different floor surfaces would have different cleaning solutions, such as:
3) Kitchen and bath tile cleaner
4) Hard-wood floor cleaner There may be two executions of the wet pad cleaner:

1) W1: Absorbent pad with on-board sprayer with a single pad design that includes cleaning solution stored in on-board reservoir (or swappable bottle). This design includes a forward spraying jet that dispenses solution. This design also should include mechanism to prevent accidental spray on carpet/on to wall, over edge of floor (e.g. embodiment could be to have low feelers or an extended bumper in front of pad to detect for changes in the floor surface.)

W2: Same concept as design W1, but with auto-changing pad

W3: Similar concept as designs W2 and W1, but with a steam based cleaning system integrated to help loosen more dirt and other target material from the floor which, depending on temperature and the heated solution used, helps kill germs and/or sterilize the surface, plus re-absorb dirt, material and fluid from floor surface through absorbent pad material, a suction device, and/or other means. Accessories for the medium sized wet pad cleaner may be:

1) W4: Drive-on charging, drying station. The basic implementation could be similar to dry pad cleaner accessory D3, but with drip pan underneath for catching any excess wetness & letting pad(s) dry out after cleaning is complete 2) W5: Mini tower beacon that is used to set boundary for cleaning area (such as at the boarder at a doorway). This may be a tall, thin free standing device that could look something like a street light fixture/or very thin desk lamp. This may be 12 to 18 inches tall, with top for placing two diodes about 8 inches apart (could be U shape with two vertical posts, or T shaped)

Figure 26:
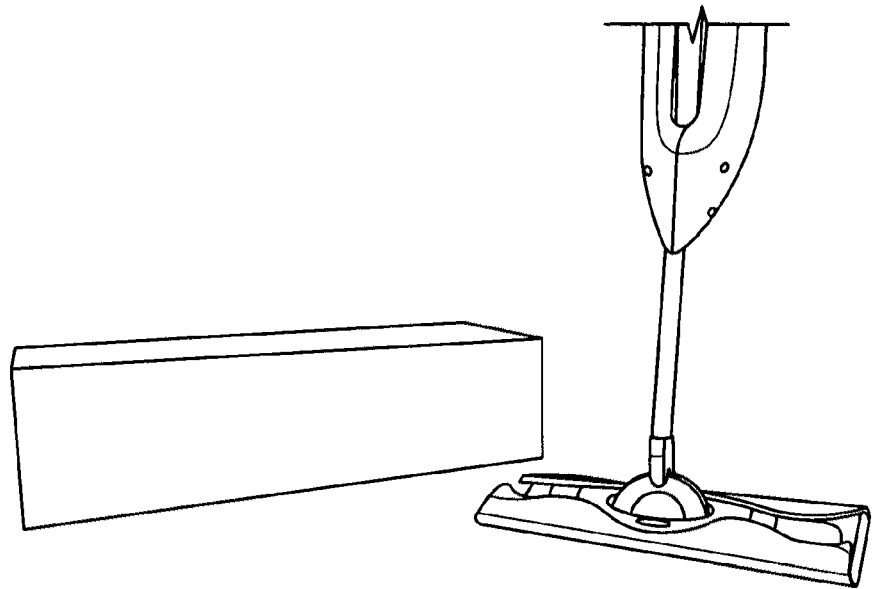
FIG. 26 illustrates a Clorox Ready to Go Mop according to the prior art.
Figure 27:
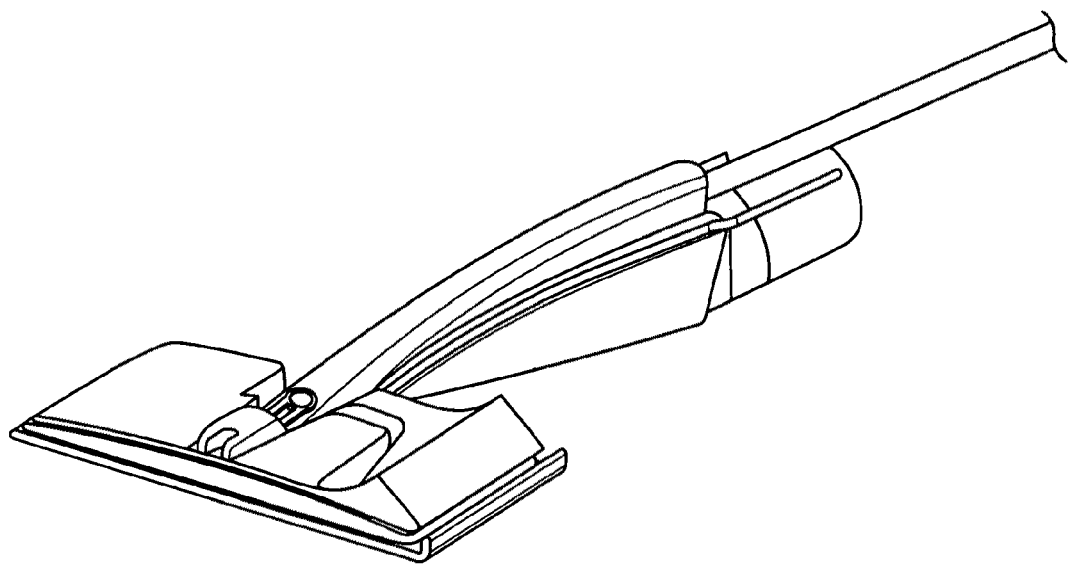
FIG. 27 illustrates a Swiffer® Wet Jet® according to the prior art.

FIG. 26 illustrates a Clorox Ready to Go Mop according to the prior art. FIG. 27 illustrates a Swiffer® Wet Jet® according to the prior art.

An embodiment of the invention may be a robotic floor scrubber which is designed for deeper wet cleaning of durable hard surface floors (especially kitchens and baths). One execution of the robotic floor scrubber is:

S1: A robotic floor scrubber may be a combination of wet pad auto-changing pad (W2) with scrubbing brushes in front. Robot sprays cleaning fluid in front and systematically scrubs back and forth. The robot wipes up area & soaks up solution with pad. One embodiment would be to have pads on other end of robot—where robot turns 180 degrees and goes over area with its pad. An alternative embodiment is to have scrubbing mechanism to be relatively compact and placed just in front of pad, so robot absorbs cleaning solution as it drives forward Another embodiment of the medium robotic cleaner may be a robotic floor polisher/buffer which is designed as finishing step as means for adding protective coating/enhancing shine of hard floor surfaces One execution of the robotic floor polisher buffer may include:

1) B1: Floor unit with high speed buffing pads. The buffing pads may be either a pair of counter rotating pads (like F2 configuration) or other design (such as horizontal rollers with pads wrapped around them). The robotic floor polisher/buffer includes waxing, polishing liquid reservoir and spray dispenser and soft pads that both polish and absorb excess liquid.

There also may be micro robotic cleaners which are smaller than the medium robotic cleaner. In other words, micro robots are small robots for smaller tasks. The micro robots may be half to one third the size of medium-scale robots. The micro robots may have different configuration of NorthStar®, where the sensor is placed in center base unit and beacons are on the robotic cleaner. The micro robot may or may not need to auto-dock. Examples of the micro robots include, but are not limited to:

Table Top Robotic Cleaner

The table top robotic cleaner may be designed to clean up dinning tables, coffee tables, small floor areas (e.g. spot cleaning).

One execution of the table top robotic cleaner includes:

T1: Mini version of F1 or F2 (rotating brush and bin) for collecting crumbs, etc. with a pad added 1) Has edge detection to keep from falling off the table
2) Small pad would provide for cleaning/dusting/polishing Mini Wet Floor Robotic Cleaner The mini wet floor robotic cleaner is designed to clean up small bathrooms, spots in kitchen or spills. The mini wet floor robotic cleaner gets in corners and behind things.

Two executions of the mini wet floor robotic cleaner include:

MW1: Simple Wet Pad Cleaning Robot

1) Pad is most likely in fixed position (non-changing)—almost like a wet pad version of D1
2) Flairs up on sides of pad to clean along walls and other edges as it drives MW2: Mini Version of S1 (Scrubbing Brushes) But without Sprayer 1) The cleaning robot just has brushes and an absorbent pad Other accessories for the mini wet floor robotic cleaner include:

MW3: Portable Cleaning Base Station.

1) Base station holds warm water, cleaning solution, and reservoir for capturing during water
2) Robot drives up and base station rinses out pad and applies fresh solution on to pad
3) Base station has NorthStar®, tracks the position of one or more robots
4) User should be able to pick base station up by handle and plug it into the wall for recharging when needed Mini Dry Floor Robotic Cleaner/Duster The mini dry floor robotic cleaner/duster is designed to get into hard to reach places (behind furniture) and cover corners and base boards Two executions of the mini dry floor robotic cleaner/duster:

MD1: Brush based cleaner. The brush based cleaner:

1) Has rotating brushes that get at both the floor and sides (such as base boards)

2) Could include a pad or disposable duster material

3) Has tank drive and streamlined design to avoid getting hooked on cords or stuck on things.

4) Can incorporate front roller brush, that may or may not extend beyond the frame of the robot cleaner (show one with exaggerated size to emphasize function)

5) Extends beyond the frame would improve reach for getting to the bottom of walls and underneath furniture 6) Applies a lot of surface area contact where ever they reach 7) Roller brush could be disposable or reusable and/or washable 8) Robot chassis and drive system exists behind the brush in one scenario 9) Semi-circular rear body is probably the most pragmatic for navigation, but a more square-like shape can be an option.

Figure 28:
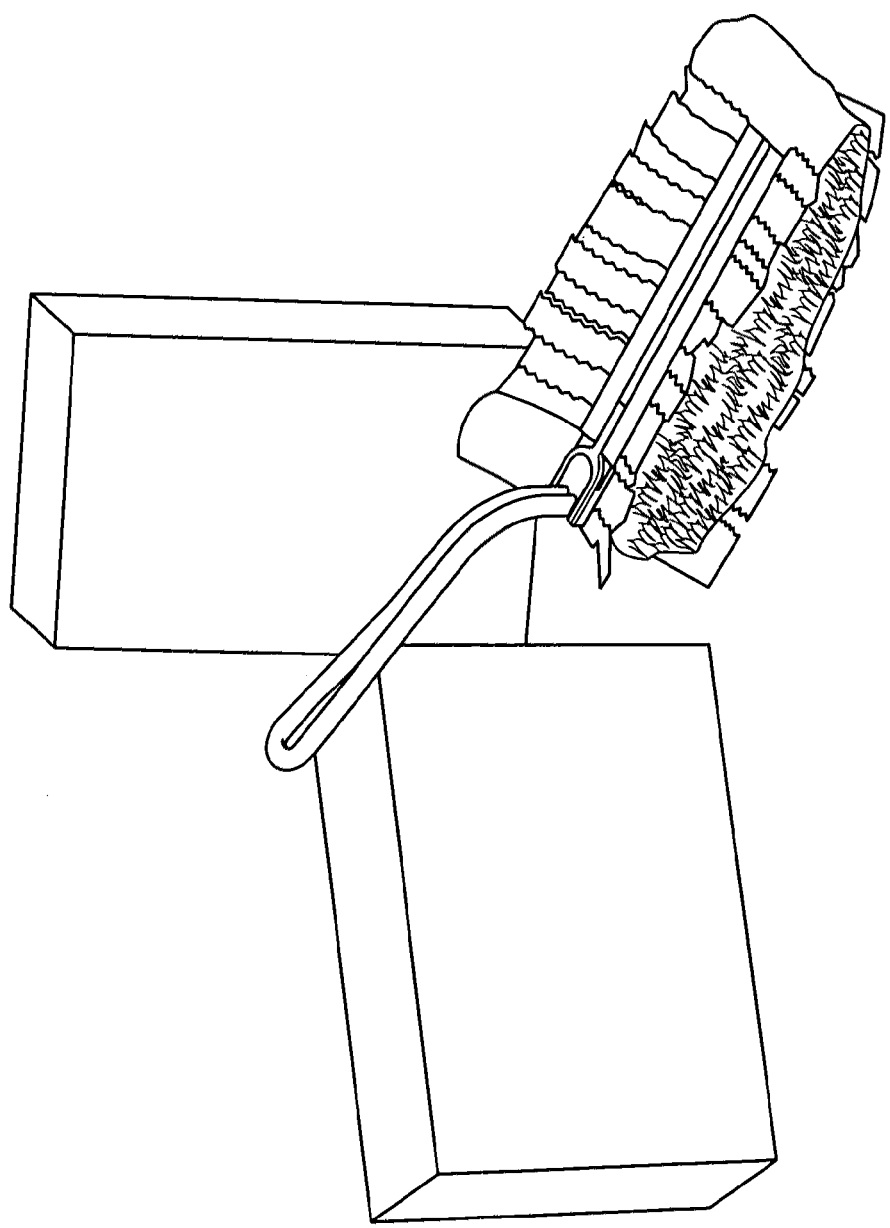
FIG. 28 is a Swiffer® Scrubmagnet® device according to the prior art.

FIG. 28 is a Swiffer® Scrubmagnet® device according to the prior art.

The goal of the navigation system described in this invention is to provide the full benefits of systematic cleaning in unstructured environments, but at a significantly lower cost to make the products affordable to the mass consumer market.

In an embodiment of the invention, this goal is achieved by cleaning in a region by region approach, where the robot systematically cleans one section of a room or an area of a home at a time though the use of a local map and local sensory position system, and then moves on to clean additional regions. The reduced size of the region allows for lower cost sensors to be used, where the size of the region is set so the robot is able to track its position through the region before the normal accumulation the noise and drift from the sensors causes the robot to lose its position.

In an embodiment of the invention, the system supports the use of dry and/or wet consumable cleaning cloths, where the regional cleaning approach enables the robot to use of the cloth to clean in a even progression through the room, so that if the user changes the cloth during the cleaning process, the fresh clean cloth is generally used to clean new areas of the floor, as opposed to clean areas already covered.

In an embodiment of the invention, the robot uses a global positioning system in combination with the local positioning system, to arrange the regions to ensure good overall coverage of the room or area of the home, so that target areas set by the system are reached. As with the local positioning system, the sensors for the global positioning system are cost optimized so that the range, accuracy and reliability of the global system is effective enough for being able to provide adequate overlap of the local regions, but is not required to maintain highly accurate global position by itself throughout the full room or area of the home.

These functions are accomplished by using a cleaning strategies and software algorithms that work with a unique combination of low cost sensors and components.

In an embodiment of the invention, the combination of sensors and components includes any or all of the following elements: a low cost IR-base global localization sensor mounted on the cleaning robot; a low cost IR projector built as a separate physical device from the robot which projects an IR light spot (or spots) which the robot can detect; wheel tachometers which are connected to the drive motors of the robot; motor current sensing connected to the drive motors of the robot for sensing when the robot has contacted obstacles through feedback detected in the resistance on the wheels; and a gyroscope mounted on the robot. An example of the NorthStar® system and its potential functions is described in NorthStar patent application Ser. No. 11/090,621, filed Mar. 25, 2005, Additional capabilities and configurations are also described in Robotic Game patent application Ser. No. 12/234,565, filed Sep. 19, 2008.

The system may include a variety of configurations for the IR projector. Embodiments can include but are not limited to a battery powered unit, a wall pluggable unit, or a combination of a wall pluggable unit which is also battery operated. The projector has one or more IR LEDs that project IR spots on the ceiling which the NorthStar sensor can detect to localize its position. In an embodiment of the invention, the projector may have three, four, five, or more spots at different frequencies pointed at different directions to expand the range for detecting the signal, where the sensor may also localizes on at least the two of the spots to determines its location. Utilizing this approach, the sensor may select different spots which provide better location information, such as by selecting spots that have an optimal orientation relative to its position for calculating the robots location, and/or selecting the spots based if their signal intensity to provide for the best signal to noise ratio. In an embodiment of the invention, two or more IR projectors may be used to expand the range of coverage by projecting IR spots at different IR frequencies in different areas of the room or home, including but not limited covering different rooms or areas in the home to enable room-to-room cleaning and navigation.

In an embodiment of the invention, the cost of sensors and components is so reduced that none of the sensors or components provide enough reliable information by themselves to provide the full solution, but when used in combination with each other and the cleaning strategy, the overall system can deliver system cleaning that is far more effective than random cleaning robots, and as effective or more effective as more complex and expensive navigation systems.

Alternative sensors may be used in alternative embodiments, which may include but are not limited to: accelerometer for another means of detecting with the robot has made contact with obstacles; IR proximity sensors for detecting obstacles and following along walls and obstacles, drop sensors for detecting if the robot is about to go over a ledge, and/or other sensors that may support the navigation of the robot, such as referenced herein.

In an embodiment of the invention, the local cleaning behavior can be implemented in the following configuration. The robot uses a gyroscope and wheel tachometers to track its location within a local map of the region, where the tachometers enable the robot to plot its position on the map based on distance traveled, and the gyroscope enables the robot to correct for the drift in tachometry as the robot turns to provide better accuracy of the robot's direction and position in the local map. Detection of obstacles and other location-based sensory information may be included in the local map for us in plotting areas to clean, path planning around obstacles, exploring for new regions and uncovered areas, and closing off areas marked as completed.

In an embodiment of the invention, the robot initially cleans following a rank pattern of parallel rows progressing across the room in one direction. The robot utilizes the gyroscope to make even 180 degree turns and maintain the parallel orientation of the rows, where the angle is close enough between rows so that the rows overlap and minimize any gaps not covered between the rows. As the robot turns from one row the next row, the alternation between left and right turns helps counteract internal gyroscope drift and extend that pattern for a longer period of time (and thus larger area.) The robot uses wheel tachometry for measuring the length of the rows, and with correction from the gyroscope and detection of obstacles from other sensors, builds a map of the region.

In embodiments of the invention, the robot may be programmed to clean along a row and then turn onto the next row until one or more events occur, which may include: reaching an obstacle; reaching a maximum row length; attempting to follow around an obstacle or obstacles until the robot has traveled a minimal amount of distance along the row; attempting to follow around an obstacle or obstacle based on the position relative to the prior row; attempting to follow around an obstacle until a maximum number of obstacles are hit; and/or reaching and end boundary of the target region with the robot's internal local map.

In an embodiment of the invention, the robot can make a full sweep though the region, and then use algorithms that identify areas that have not yet been cleaned in the local map to have the robot navigate to those areas and clean them and update the map while localization is still reliable. The robot may also close of any frontiers determined to be blocked by obstacles as non-cleanable areas. Boundaries along the perimeter of the cleaning region which are not blocked off by obstacles may also be stored on the map and used later in determining adjacent regions to clean.

In embodiments of the invention, the robot sets limits for the maximum length of the rows and the number of rows allowed within a region so attempted area of coverage stays within the tolerance allowed for accumulated error and drift from the combined readings and corrections of the sensors. The limits can be set through a number of means, which include but are not limited to: fixed value for either the length of the row and/or the number of the rows; a dynamic setting to one or both of the dimensions based on the environment, such as if the robot detects the cleanable area to be narrow and wide, and thus able to be completed with more rows, but at shorter lengths; a measure of time or area traveled; and/or though feedback on the sensor drift through comparison of the values with other sensors, where the cleaning region size grows until the accumulated error reaches a threshold.

In an embodiment of the invention, once completing one region, the robot would re-localize its position using readings from the global positioning system (e.g. Evolution Robotics' NorthStar positioning system) and then plan the location for the next regional area of cleaning. This processing may include uploading data from the locally mapped area in the region to a global map, which fills in as the robot cleans more regions in the room.

In an embodiment of the invention, the global positioning system may track the progress of robot while it is cleaning the local region as a parallel process. In cases where the global positing system is determined to have a minimal level of reliability for that region, gaps of a certain size found in the global map may be copied down onto the local map to have the robot revisit and re-clean those areas if needed to provide for redundancy in the system.

In an embodiment of the invention, re-localization may be accomplished thorough a number of means in cases where access to reliable global position information is limited or not immediately available at the robot's current location. An example may include but is not limited to returning to a specific reference point (or one of many available reference points) where the robot can re-calibrate its position, plot the target location for the next cleaning region, and drive to that region to begin the next regional pattern. In the case where the global positioning system is used, the robot homes on the signal provided from the global positioning system until it reaches an area where it can plot a course to a reference point.

In the minimal case, the reference point may be in close range to a charging station or some other form of "home base" for the robot to use as starting location. The robot may use one or more emitted signals to home back to the charging base, and if needed, position itself relative to the base where its position and orientation are estimated to be at a high confidence level.

In an embodiment of the invention, the robot may also re-localize using information from the gyroscope, odemetery and other sensors are used to test for the reliability of a global positioning system, to dynamically determine when the global system is providing accurate enough information on which to re-localize. As one example, the local sensors provide readings for several samples over a certain time, and when the change in the global position reading matches the estimated change from the local sensors, then the robot can re-localize. As a fall back method, the robot may use the global localization system to return to a "safe point" where it has high certainty of its relative position without the need for additional or new validation from other sensors.

In an embodiment of the invention, the robot may clean in a regional method using a local map and input from local sensors (gyroscope and tachometers, etc.), and move from region to region without the use of global positioning system either for part or all of its operation during a cleaning run. In embodiments of the invention, upon the completion of one cleaning region, the robot may move to a new location to begin a new cleaning region through a number of means, which include but are not limited to: driving to an estimated location within the existing regional based on the local map and sensors, and begin cleaning a new region that extends outside the area of the existing cleaning region; driving to an estimated location outside the existing region based on use of the local sensors to reposition the robot and then begin a new cleaning region; and/or driving to a random location relative to the existing cleaning region and then begin a new cleaning region.

In embodiments of the invention, a number of techniques can be used to expand the regional area of cleaning and/or more efficiently organize the placement of regions based on the environment. In the case of using a low-cost global positioning system which may have limited range or only certain patches of coverage in a room, the regional cleaning pattern can be combined with periodic re-localization to allow for the regional pattern to run longer and over a larger area. As one example, if the center area of a room has a good global localization signal (such as emitted from an IR spot projector or other point source) the robot can align the cleaning pattern (such as parallel rows) so that the robot is passing in and out of the global area of coverage in the course of travelling through one or more of the rows (such as on the middle or at one of the ends of the row.) By recalibrating its position when the robot is in the global area of coverage, the robot can essentially re-set the drift to zero or some lower value, and rely on the local sensor to continue the cleaning pattern. This process can also be performed ad hoc, when ever a reliable global position signal is found.

In an embodiment of the invention, strategies for arranging the cleaning patterns may be used to further improve coverage of the regions and or entire area. As an example of a technique, the robot may do two or more passes over the same region or set of regions to ensure more though cleaning. This may include changing the primary direction of the systematic pattern between the passes to expose different frontiers between the passes and possibly extend into areas missed on the first pass. Examples may include but are limited to: having the robot clean the area in one direction in a single session, and then start over an redo the entire area in a different direction (either perpendicular or some other angle), where the room or area may be divided into different regions based the pattern and environment; have the robot do two passes over each region each time the robot is run, in either a perpendicular or other angle; or vary the angle in paired set, so that the robot pick a new angle on each cleaning, and then follows with a pass on a perpendicular angle. The benefit of these approaches is that they additional passes will likely remove additional dirt in the areas that are covered more than once—and possibly make the cleaning function work better across different grains in the floor surface—while providing much more even coverage than a random approach.

In an alternative embodiment of the invention, the regions can be more flexible and emergent based on the discovered areas. One example may include using mapping to expose open frontiers in global map after the first pass of a systematic cleaning pattern. The robot can then use that information to clean into the frontiers, and where new areas are discovered, repeat the systematic cleaning pattern and frontier selection process.

In any of the embodiments described above, the robot may also use perimeter cleaning (including wall following and obstacle following) to close off frontiers in the area covered by a systematic pattern, as well as initiates another area of systematic cleaning in new areas discovered. The perimeter cleaning could be done as a process within a region before the region is marked as finished, as a process across regions after multiple regions are visited, or as a combination of both within and between regions based on the size of obstacles found and the length the robot can travel along the wall without going to far from its target location.

New approaches, methods, designs, technologies and solutions for integrating localization, positioning and navigation systems to provide new and unique benefits and capabilities for mobile robotic-enabled products that need to operate in everyday environments. For illustration purposes, the specific embodiments described and illustrated in this document are described primarily in the context of mobile floor cleaning robots, where the benefits and capabilities represent a significant advance in performance over random, semi-random methods for floor cleaning and/or other methods employed by leading consumer robotic floor cleaning products on the market. A description of possible embodiments of robotic cleaning devices that could utilize localization, positioning and navigation systems includes but is not limited the products, concepts and designs described in the drawings.

The scenarios described herein using an infrared-based localization system, but may easily be enabled by devices that use other means for localization, including but not limited to devices that utilize visual pattern recognition, visible light detection, laser reflection, odemetery, optical navigation sensing, inertial sensing, thermal detection, motion detection, sound detection, radio wave detection, physical contact detection, proximity detection, magnetic field detection, electrical field detection, or any combination thereof. One embodiment of an infrared-based localization system would include the NorthStar® system from Evolution Robotics, which is cited in prior applications, namely U.S. patent application Ser. No. 11/090,621, filed Mar. 25, 2005, which is hereby incorporated by reference herein.

For the purposes of these descriptions, the application of localization, positioning and/or navigation systems includes but is not limited to: the ability to determine the position of one or more devices, objects, locations and/or boundaries within a physical space along one or more dimensions; the ability to provide partial information on the relative position of one or more devices, objects, locations and/or boundaries from one or more other points that is useful in the performance of an application; the ability to make estimates of position of one or more devices, objects locations and/or boundaries that are useful in the performance of an operation; the ability to guide one or more mobile devices and/or objects along a planned and/or unplanned course through one or more physical spaces; the ability to navigate between two or more objects, devices, locations, and/or boundaries within a physical space where information on the points between the devices, objects, locations and/or boundaries may or may not be available; the ability to store position information, identification and/or other indication of location of one or more devices, objects, locations, boundaries, paths, and/or areas of coverage for retrieval and use at a later point in time; the ability to map one or more represented locations, devices, objects, boundaries, paths, and/or areas of coverage for use in the performance of an application; the ability to detect and/or discover position information about one or more physical environments that is used to adapt and/or enhance the performance of one or more tasks within those environments; the ability to use position information to help identify and/or classify one or more environments to adapt the performance of one or more tasks within those environments; and/or the ability to directly and/or indirectly control one or more devices using the one or more of the above abilities and/or other abilities related to localization, positioning and/or navigation.

The implementation of the localization system may take a variety of embodiments, but can still enable the functions described herein. Examples of embodiments of the localization system include:

1) The placement of a sensor (or set of sensors or integrated sensory system) on a robot or robot-enabled device, which enables the robot or robotic-enabled device to derive relevant position information, where other objects and/or devices that emit one or more signals may or may not be used for helping derive position information.

2) The placement of a sensor (or set of sensors or an integrated sensory system) on a robot or robot-enabled device, which enables the robot or robotic-enabled device to derive relevant position information through passive and/or active measurements of its environment, through measurement of position by one or more systems at a single point of time and/or through integration of measurements taken by one or more systems from a series of measurements over time, and/or in conjunction with the control of movements, execution of navigational patterns and/or performance of location related behavior. One embodiment of this approach includes but is not limited to the vSLAM® system from Evolution Robotics, which is cited through U.S. Pat. Nos. 7,015,831, filed Mar. 21, 2006, 7,135,992, filed Nov. 14, 2006, and 7,145,478, filed Dec. 5, 2006, which are hereby incorporated by reference herein. Another embodiment can include but is not limited to the use of one or more proximity sensors in combination with one or more path following behaviors that guide the movement of the robot or robotic-enabled device relative to the physical characteristics of the environment. One example of this approach would be to have a robot that included one or more proximity sensors that measured distance to walls, objects and/or other fixed boundaries within a setting, and engage a path following behavior where robot followed the contours of the walls, objects and other boundaries in a repeated series of cycles or laps around the environment, with the robot initially following the perimeter of the area and shifted its position inward as measured by the proximity sensor(s) upon each completion of a lap, so that it progressively moved to the center of the area until it reached the center and/or covered most of the of area within the perimeter. (See FIG. 31)

3) The placement of a sensor (or set of sensors or integrated sensory system) on a central device, which detects and provides position information of one or more robots, robot-enabled devices and/or other devices and relays that information and/or sends commands back to one or more robots or robotic-enabled devices, which may or may not emit a signal or signals that help the sensor determine their position.

4) The placement of a sensor (or set of sensors or integrated sensory system) among one or more independent devices, where the data from the sensor(s) is relayed to one or more robots, robotic-enabled devices and/or other devices.

5) Any combination of the above approaches—or other method for reading and reporting position information and/or identification of robots, robotic-enabled devices and/or other devices.

6) Any use of the above approaches, with the added integration of a $3^{rd}$ party platform or device, such as a video game system (e.g. Nintendo® Wii®, X-Box 360®, PlayStation 3®, etc.), handheld game system (PSP, Nintendo®DS®, etc), mobile phone, smart phone, PDA, mp3 device, television, computer, or Internet enabled game system (e.g. online games), to help incorporate the position information, identify devices, transfer information, provide calculations, plan paths, monitor task performance and completion, pass information gathered from one operation to a later operation, update reference data sets and/or behaviors, enable user interface, and/or otherwise assist in operations related to the localization of one or more robot and/or robotic enabled devices.

The sensor or sensors used by the localization system may be any component, set of components or integrated system that help provide the identification and/or any related position information of the various game objects. These sensor components and systems can include but are not limited to: infrared sensors; cameras, imagers and/or other visual sensors; laser range finders or other laser sensors, infrared detectors and/or emitters; wheel encoders or other odemetery sensors; optical navigation sensors; accelerometers, tilt sensors, gyroscopes, or other position and/or inertial sensors; thermal sensors; motion sensors; microphones, ultrasonic sensors and/or other sound sensors; RFID sensors and/or other radio sensors; contact sensors; proximity sensors; magnetic sensors; electrical field sensors; and/or any combination thereof. The system may take the raw reading from the sensors and/or involve processing of the raw sensor values either as part of the sensing device, as part of another processing device, or as a combination of processes.

Devices and/or objects can be designed to provide means for the sensors to detect them, through active and/or passive methods, as part of the localization system. Active methods can include but are not limited to the placement of beacons on one or more devices that emit a signal the sensors can detect and use to derive the identification and/or relative position information of the object. Beacons can include but are not limited to: infrared light emitters, infrared spot projectors, other visible or non-visible light emitters, laser emitters, thermal emitters, sound and sound wave emitters, motion emitters or devices that control the motion of objects, RFID or other radio emitters, magnetic emitters, electric field emitters, or any combination thereof. Passive methods can involve any approach where the sensors can detect one or more object or devices without the need for a signal to originate from the object or device. These methods can include but are not limited to visual recognition of one or more objects or devices or a pattern on the object, reflected light detection of the object, recognition of the physical shape or construction of the object, recognition of motion of the object, or any combination thereof.

Additional examples of such and other embodiments, techniques and/or applications for employing a localization system may be found in Evolution Robotics' application for U.S. patent application Ser. No. 12/234,543, filed Sep. 19, 2008, which is hereby incorporated by reference herein.

Figure 29:
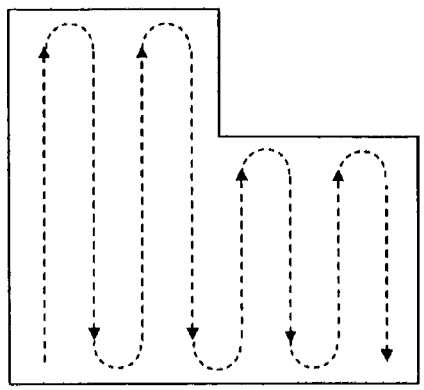
FIG. 29 illustrates a single pass parallel row cleaning pattern according to an embodiment of the invention.
Figure 30:
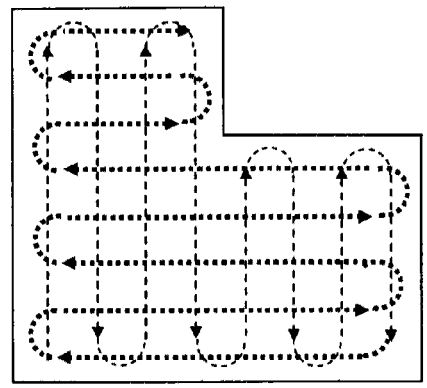
FIG. 30 illustrates a double-pass cross-row cleaning pattern according to an embodiment of the invention.
Figure 31:
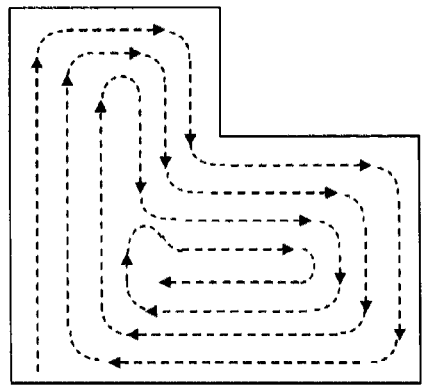
FIG. 31 illustrates a contour following cleaning pattern according to an embodiment of the invention.
Figure 32:
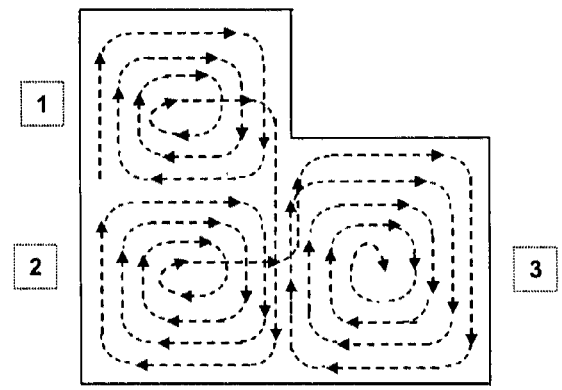
FIG. 32 illustrates a combination of macro and micro cleaning patterns according to an embodiment of the invention.
Figure 33:
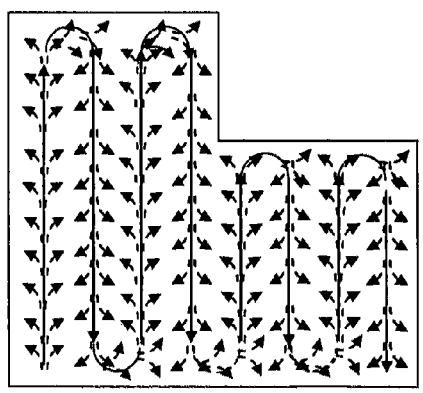
FIG. 33 illustrates a deep cleaning pattern with a systematic path according to an embodiment of the invention.
Figure 34:
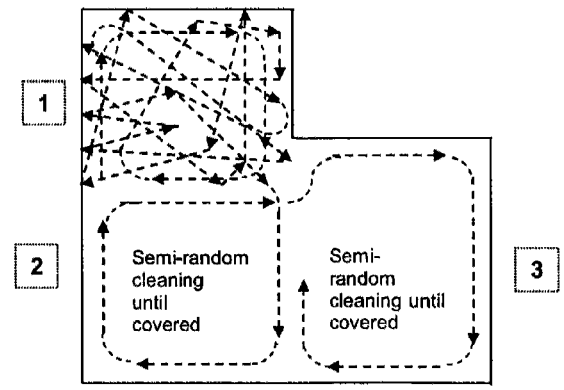
FIG. 34 illustrates a semi-random cleaning with a system pattern according to an embodiment of the invention.
Figure 35:
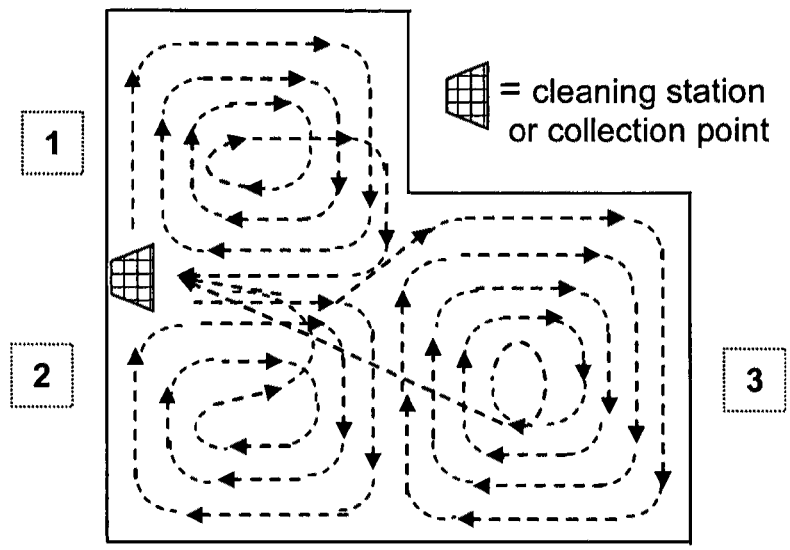
FIG. 35 illustrates a cleaning pattern with a refreshing station according to an embodiment of the invention.

The use of localization system to enhance the performance and capabilities of a robot or robotic-enabled device in tasks such as floor care and other localization-related applications as described earlier includes but are not limited to:

1) The ability to use position information to clean a floor systematically by controlling the location and/or path of a robot; executing coverage and/or cleaning patterns relative to the floor surface to ensure good and even coverage; executing customized coverage and/or cleaning patterns relative to the floor surface based on user input; optimizing coverage and/or cleaning patterns adapted to environmental conditions, the location of obstacles, different types of floor surfaces (e.g. carpeting vs. hardwood vs. tile, etc.) and/or other location specific information; keeping track of cleaned and un-cleaned areas and/or explored and unexplored areas; and/or a combination of the above methods. Embodiments of coverage and cleaning patterns using position information can include but are not limited to:

a) Paths involving one or more rectilinear patterns, which could include but are not limited to where a robot cleans as it travels in a row-like pattern from one side of the room to the other (see FIG. 29), and/or where the robot cleans and travels in a row-like pattern in from one side of the room to the other and then crosses back in a second row-like pattern perpendicular to the first (FIG. 30), and/or where a robot cleans by combining an overall rectilinear path with other non-rectilinear motions. FIG. 29 illustrates a single pass parallel row cleaning pattern according to an embodiment of the invention. FIG. 30 illustrates a double-pass cross-row cleaning pattern according to an embodiment of the invention.

b) Cases where a robot cleans with a contour-following method using the walls and/or edge of a room (and/or other objects and boundaries) to help define its path and engages in systematic adjustments in navigation to cover the floor surface, where one embodiment can include but is not limited to driving parallel to the edges of a room and/or objects and shifting some distance inward upon the completion of each completed lap until it reaches the center of the area or the closest it can get to the center of the area. (FIG. 31). FIG. 31 illustrates a contour following cleaning pattern according to an embodiment of the invention.

c) Cases where a robot cleans a room in smaller subsections, using one or more systematic "micro" patterns to clean within a section, where a section can be defined by physical boundaries, virtual boundaries, user defined boundaries and/or boundaries that adapt to the environmental conditions, and then replicates that pattern on other sections until all of the open areas of the floor is reached using a "macro" pattern to define and/or navigate between the subsections. (FIG. 32). FIG. 32 illustrates a combination of macro and micro cleaning patterns according to an embodiment of the invention.

d) Cases where the robot follows an overall row-like, spiral or other pattern to its path as it cleans but executes a variety of smaller patterns within each segment of the path to provide deeper cleaning with multiple passes along the path. (FIG. 33). FIG. 33 illustrates a deep cleaning pattern with a systematic path according to an embodiment of the invention.

e) Cases the robot cleans in a semi-random pattern in a specific section of the floor, but uses tracking of areas covered to intermittently relocate its position to uncovered areas and/or stay within a certain boundary, and then moves onto new sections of the floor once its has achieved adequate coverage, where one embodiment can include but is not limited to applying avoidance behaviors to navigate away from covered areas to probabilistically guide itself to uncovered areas (FIG. 34), and where another embodiment could include but not be limited to rapid actions where the robot's local movements can be fast and unpredictable, such as having the entire robot spin rapidly to buff, scrub or otherwise clean the floor with rapid action. FIG. 34 illustrates a semi-random cleaning with a system pattern according to an embodiment of the invention.

f) Cases where the robot cleans using one of the above methods and/or other variations and completes by cleaning around the edges of the room and/or around objects in the room.

g) Cases where the robot uses a cleaning pattern to consistently push any remnant matter and/or fluid towards a specific area of the floor to concentrate it one or more specific locations for user, the robot, and/or other device to collect. (FIG. 35). FIG. 35 illustrates a cleaning pattern with a refreshing station according to an embodiment of the invention.

h) Cases where the robot follows one or more of the above cleaning methods and/or other variations, but engages in multiple cycles where it varies its activity for different stages in the cleaning process, such as removing dirt first with one system and applying a protective finish with a second system as just one embodiment; and/or any combination of the above approaches.

The ability for a robot and/or robots to clean with one of the above methods and/or other variations where the robot returns to one or more stations that allow it to refresh its cleaning mechanism (which may include) but is not limited to:

1) unloading collected dirt, fluid, consumables and/or waste material, 2) taking on new cleaning materials, fluids and/or consumables, and/or recharging its batteries) and/or returns to clean where it last left off or continue to new areas as needed; the robot cleans with one of the above methods and refreshes it owns cleaning mechanism(s) based on area covered, time of operation and/or other means; and/or any combination of the above methods. One embodiment can be similar to the method exhibited above in FIG. 35.

2) The ability to use position information to navigate to one or more base stations, with or without direct line of sight a base station, from within the same room/zone and/or from outside of a room/zone, where the robot may or may not engage path planning techniques to develop optimized routes to one or more base stations. One embodiment can include but is not limited where a station includes a position signal emitter that enables the robot to automatically learn the physical location of the station and/or allow the robot to automatically recalibrate the physical location of the station if the station is moved from its original point.

Figure 36:
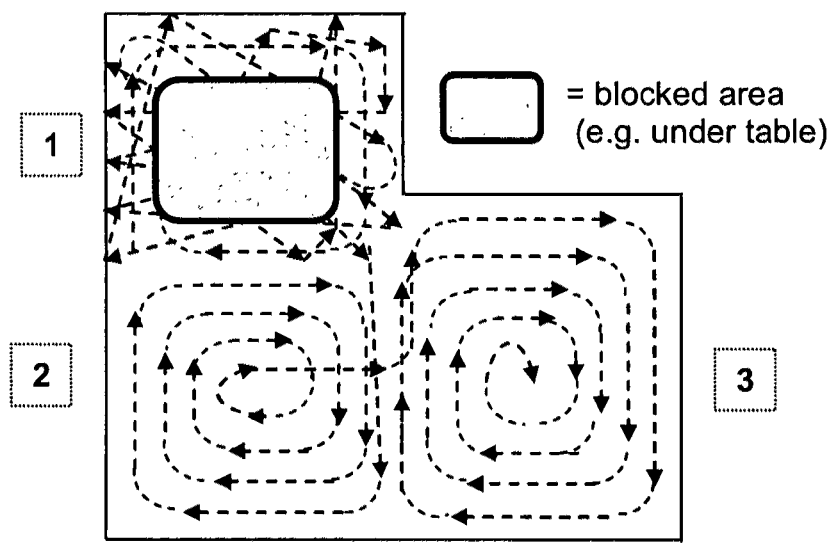
FIG. 36 illustrates a semi-random cleaning pattern in areas where position information is limited according to an embodiment of the invention.

3) The ability to clean randomly or semi-randomly in areas where position information is not locally available, is only intermittently available and/or is less reliable, while being able to navigate back to an area where position information is available. (FIG. 36 exhibits one embodiment where robot cleans under a table where position is not locally available.) FIG. 36 illustrates a semi-random cleaning pattern in areas where position information is limited according to an embodiment of the invention.

4) The ability to clean with some degree of systematic coverage in areas where position information is not locally available, is intermittently available and/or is less reliable, by making estimates of the position of those areas by their boundary relative to one or more known areas and/or through the use of other measures or estimates of changes in distance, orientation and/or relative position from one or more known positions (such as but not limited to control of motors and/or wheels, feedback from motors, odometer readings, accelerometer readings, compass sensor readings, gyroscope sensor reading, proximity sensor readings, bump sensor readings, optical flow sensor reading, vision based sensor readings, sonic based sensors readings, measurement of signal intensity of a faint, reflected and/or multipath signal, and/or other systems that provide indication of relative position.) In one embodiment related to the scenario shown in FIG. 36, the robot can reacquire its position anytime it emerges from beneath the table, and use that location information to enhance the estimate of areas covered in the beneath the table through the above methods.

5) The ability to use position information to travel from room-to-room and/or zone-to-zone while maintaining abilities to clean the combined area systematically, where the robot may or may not engage path planning techniques, mapping of obstacles and/or open areas, and/or user input on paths to develop optimized routes between locations in different rooms and/or zones.

6) The ability to travel from room-to-room and/or zone-to-zone where position information may or may not be continuously available in transitional areas between rooms and/or zones, where the robot may employ one or more methods for transitioning in areas where position information is not locally available, is intermittently available and/or is less reliable, by making estimates of the position of those areas by their boundary relative to one or more known areas and/or through the use of other measures or estimates of changes in distance, orientation and/or relative position from one or more known positions (such as but not limited to random and/or semi-random exploration, control of motors and/or wheels, feedback from motors, odometer readings, accelerometer readings, compass sensor readings, gyroscope sensor reading, proximity sensor readings, bump sensor readings, optical flow sensor reading, vision based sensor readings, sonic based sensors readings, measurement of signal intensity of a faint, reflected and/or multipath signal, and/or other systems that provide indication of relative position.)

7) The ability to expand the range of coverage and/or increase the accuracy of the position estimate through the placement of one or more mobile devices to a known location that provides a secondary system of one or more reference points for the robot to derive its relative position. One embodiment could include a system where the robot itself temporarily places one or more mobile devices and/or objects at known positions, and uses those devices and/or objects to obtain and/or enhance position information for specific region, and may or may not have the ability to retrieve the devices in order to repeat the process in additional areas.

8) The ability to use detection of the original source of one or more emitted signals and/or reflections of one or more emitted signals to navigate around obstacles and/or through open pathways (such as but not limited to doorways, hallways, paths around furniture, etc.) where direct detection of the original emitted signal(s) may or may not be available and/or may not be strong enough to provide immediate and/or reliable absolute local position information.

9) The ability to use faint detection of one or more emitted signals and/or reflections from far away from the originating point of one or more signals in combination with exploring behaviors to progressively move toward areas where the signal(s) are stronger and/or eventually progress to an area where the signals(s) are strong enough to acquire local position information.

10) The ability to use position information to enable users to train and/or provide other inputs to the robot for helping define areas, paths, behaviors, priorities and/or techniques for cleaning, either by boundary, areas of focus (e.g. spot cleaning,) specific paths to follow, patterns to execute, sequence of coverage, areas to avoid, and/or areas to ensure not to miss. One embodiment can include but is not limited to a device and/or configuration which enables the user to control the movement and/or other actions of the robot during the training period, where the robot records the positioning information and/or other user input related to the desired cleaning behavior for those locations. Embodiments of this approach can include but are not limited to: a pointing device that enables the user to direct the robot where to go, which may or may not include the means to input additional commands to the robot that assign different cleaning behaviors for the location; a device which the user to holds and/or wears that the robot can follow as the user moves through the environment; a device that controls the robot with an RF controller or other type remote control; a device that remotely controls another mobile robot or device that the robot can track; and/or a configuration where the user manually moves the robot around in the desired areas as it records its location and/or desired cleaning behaviors. Another set of embodiments can involve devices and/or configurations where the robot observes the movement of a second device is that is manually or remotely controlled, and the robot records the motion of the second device to learn location information for cleaning. The training for the above systems may or may not include a multi-room and/or multi-zone memory system, whereby the trained information can be tied to specific rooms and/or zones, where the robot can access the trained information when it detects and/or is instructed that it is in a certain room/zone. Another set of embodiments can include but is not limited to physical placement of one or more devices and/or object the robot can detect and integrate with its positioning system adapt its cleaning behavior, such as but not limited to devices that define a boundary, define a direction to follow, define an area to avoid, define an area to focus on for deeper cleaning, define an area to use a specific type of cleaning mode (such as steam cleaning only on certain carpeted areas as just one possible example.)

11) The ability to use positioning information to have a robot learn areas through exploration where it tracks position information and integrates learning of the environment (such as but not limited to: obstacle detection, types floor surfaces, areas of higher concentration of dirt, pathways between areas, user input regarding the environment, and/or other means) to adapt its cleaning routines and/or other operations to optimize performance for that environment.

12) The ability to use positioning information to integrate user input through the physical positioning of the robot to influence how the robot cleans and/or make cleaning more efficient and/or effective for a specific area.

a) One embodiment can include but would not be limited to having the user place the robot in corner of a room (such as the bottom right corner) as a starting point and combining that placement with a behavior where the robot cleans from one corner to the other following a right to left progression.

b) Another embodiment can include the user placing the robot in multiple locations to train it on boundaries of the room, areas to cover, desired starting point and/or direction for cleaning, and/or patterns to use to while cleaning.

13) The ability to integrate location identification connected to the position information, such as input regarding the type of room it is in, such as a kitchen, dinner room, other type of room, to optimize which behavior(s) and/or algorithm(s) the robot selects to attempt to clean the room based on one more models of configurations and conditions likely for that type of room.

a) One embodiment can be using the selection of a room ID of a NorthStar projector (e.g. by its frequency or other means) to indicate the type of room, by which the NorthStar sensor on the robot is immediately aware upon detection of the signal and room ID. In that scenario, if for example the room ID indicated the room was a dinning room, the robot could select behavior(s) and/or algorithm(s) designed to detect the location of a primary table, pursue primary cleaning path around the full perimeter of table, and engage routines for cleaning beneath the table where it expects to come into contact with the legs of the table and chairs.

14) The ability to have position information transferred from one device another to optimize the performance of the system, through means which can include but is not limited to containing all or part of the localization system into a modular detachable device (such as a "robotic brain") that can be connected to a variety of robots, robotic-enabled devices and/or non-robotic devices, so that position information and/or other learning from the operation of the module in conjunction with one or more robots, robotic-enabled devices and/or non-robotic devices can be utilized when the module is later used in conjunction with another robot or robotic-enabled device, as is described in Transferrable Intelligent Control Device, application Ser. No. 12/234,543, filed Sep. 19, 2008, which is hereby incorporated by reference herein.

a) Another embodiment can include but is not limited to where the means for transforming information is primarily digital rather than physical, so that position information and/or other learning from the operation from one or more robots, robotic-enabled devices and/or non-robotic devices can be shared by electronic means (such as through wired communication, wireless communication, use of electronic data storage device, download through a computing platform, and/or other means) with other robots or robotic-enabled devices, in cases where the robots or devices operate within the same environment but may or may not perform similar tasks.

b) Another embodiment could involve the same approach described above, but where the learning is not limited to a specific environment, but may provide for more generalized leaning and/or application of localization-related behaviors across multiple robots and robotics enabled devices in different environments, by abstracting descriptions of environments and identifying which behaviors or combination of behaviors performed most successfully and/or predicting which behaviors may best perform given the new environment, specific robot or robotic-enabled device platform, desired user goals, and/or other situational conditions. Description of this technique is disclosed in U.S. Pat. No. 6,889,118, issued May 3, 2005, which is hereby incorporated by reference herein.

17) The ability to use position information and/or one or more of the abilities described above to coordinate behavior across two or more robots and/or cooperatively perform one or more tasks, which can include but is not limited to designating specific tasks for each robot, designating areas for each robot, and/or sharing information of tasks performed and/or areas covered in order to have the robots operate as an integrated system rather than independent devices.

Figure 37:
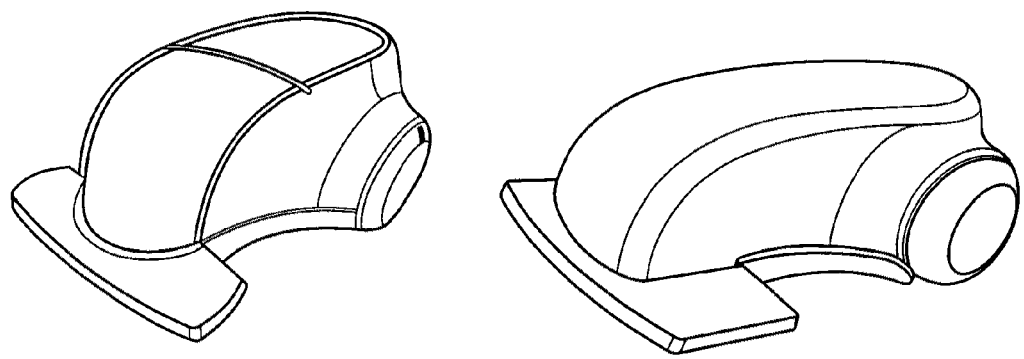
FIG. 37 illustrates embodiments of a robotic cleaner having a cleaning pad that can hold a cleaning cloth.

FIG. 37 illustrates embodiments of a robotic cleaner according to an embodiment of the invention which includes a cleaning pad that can hold a cleaning cloth, but in different form factor and shell configuration. The pad is extended out forward from the wheels and the design allows for a much larger robot body relative to the size of the cleaning pad. In an embodiment on this invention, the extra volume within the shell may house additional cleaning mechanisms, which may include a vacuum that uses the cleaning pad as an intake nozzle. The cleaning cloth may cover part of all of the vacuum intake area under the cleaning pad, so that dirt is drawn into the cleaning cloth as a filter to add additional ability to remove dust, dirt, and debris from the floor. In models of the robotic cleaner, the robot may or may not have an internal dust bin for collecting the dirt based on whether the design allows for dirt to get past the cleaning pad.

Figure 38:
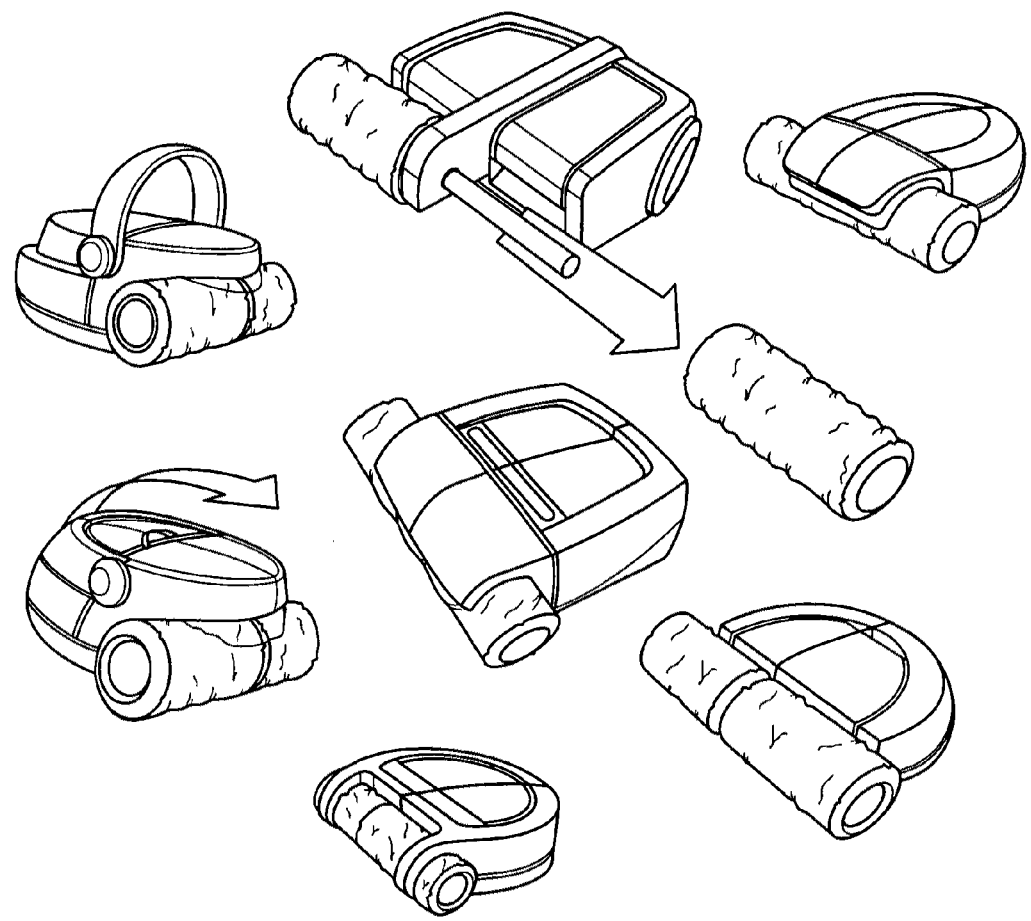
FIG. 38 illustrates embodiments of a robotic cleaner which have a horizontal rotating brush as part of the cleaning mechanism.
Figure 46:
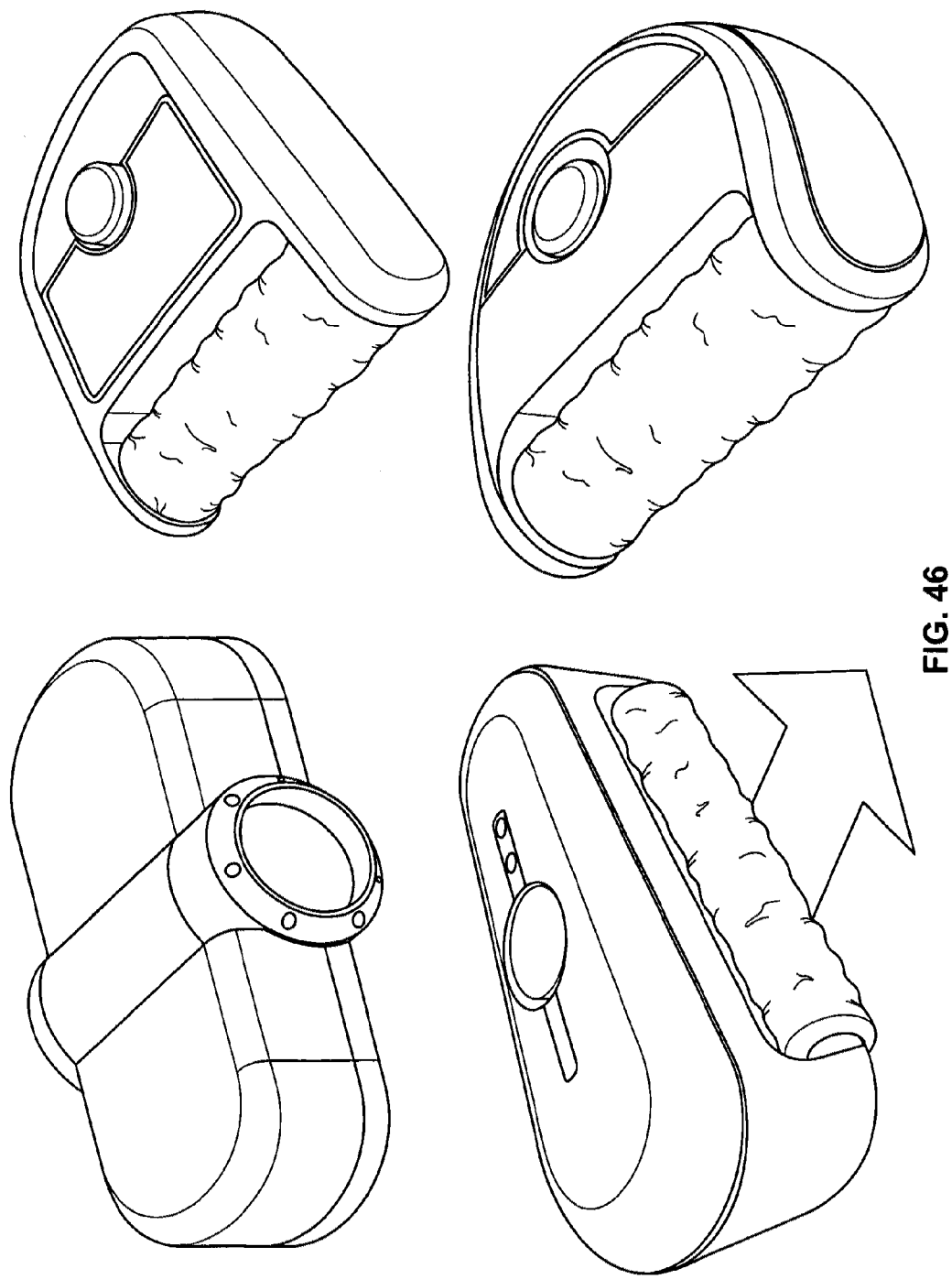
FIG. 46 illustrates embodiments of a robotic cleaner which have a horizontal rotating brush as part of the cleaning mechanism.

FIG. 38 and FIG. 46 illustrate various embodiments of a robotic cleaner according to embodiment of the invention which use a horizontal rotating brush as part of the cleaning mechanism. The robotic cleaner may include a collection bin behind the brush for collecting dust, dirt and debris. The brush may be removable, either as a single component, or in two or more sections. The brush may be disposable. The brush may be composed of a non-woven material (similar to the material in the cleaning cloths described in other embodiments) or other type of material that collects dirt and dust on the brush itself as part of the cleaning function.

Figure 39:
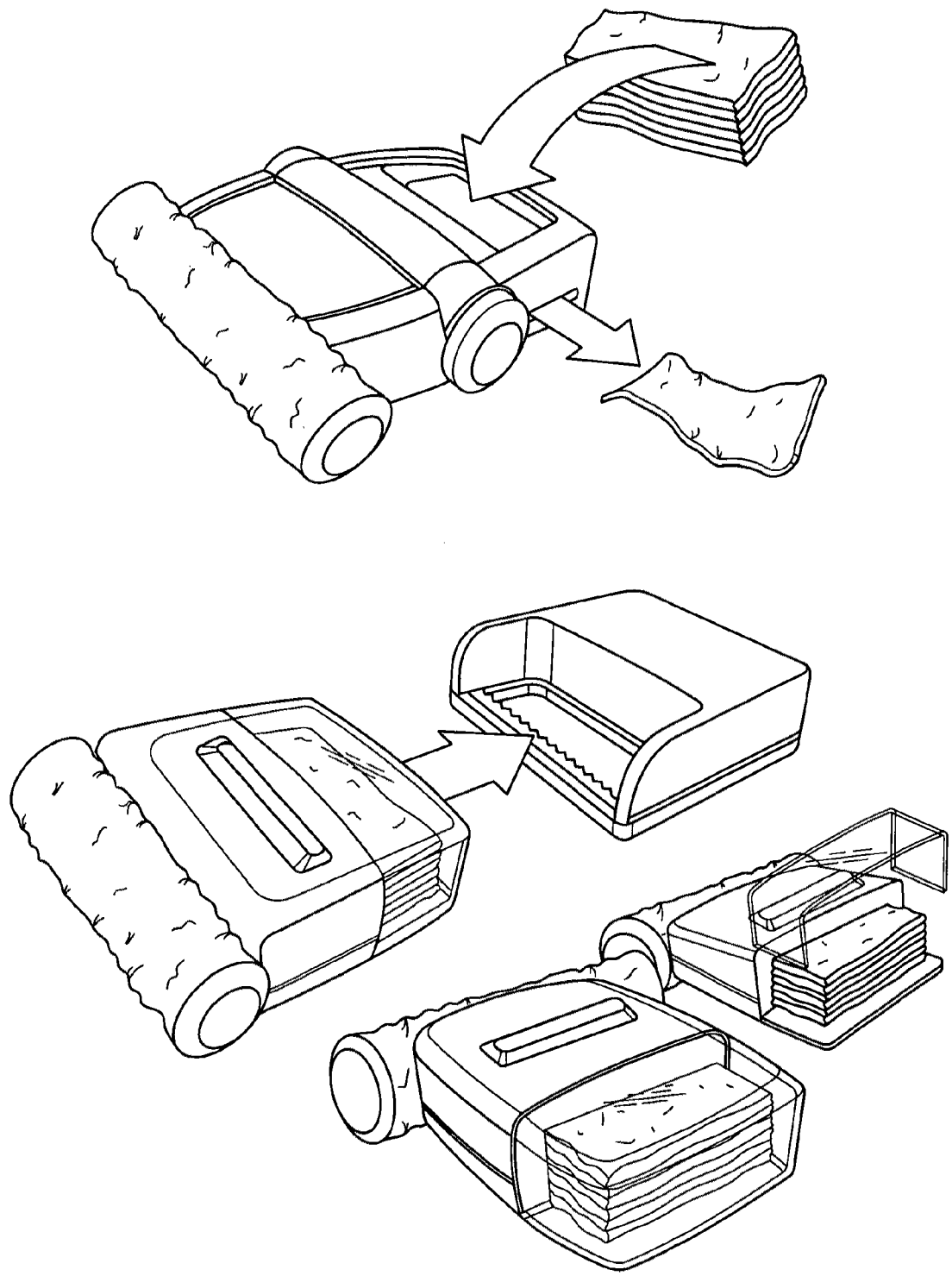
FIG. 39 illustrates embodiments of a robotic cleaner including a loadable tray for holding multiple cleaning cloths, cleaning pads, or other material.
Figure 40:
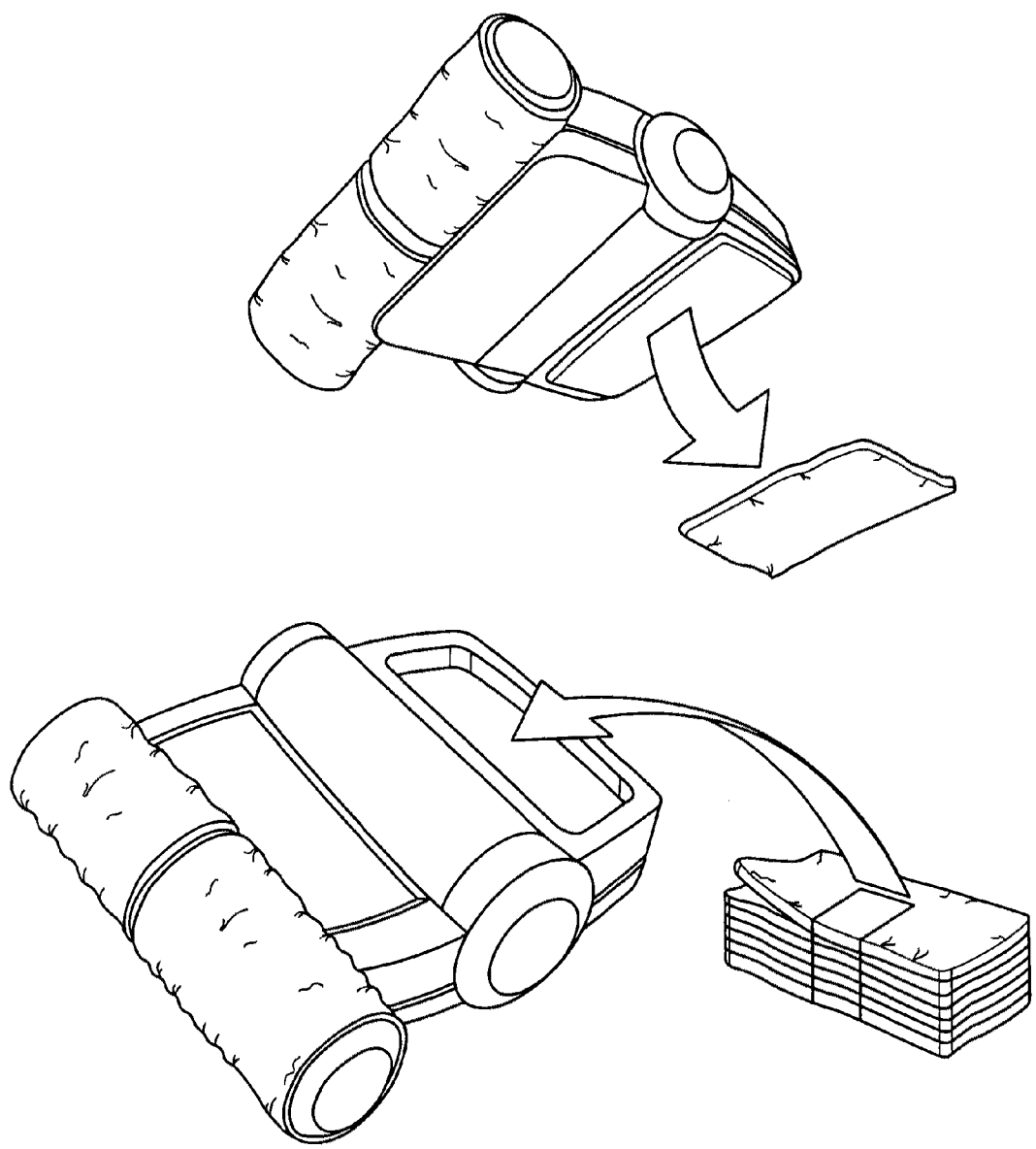
FIG. 40 illustrate embodiments of a robotic cleaner including a loadable tray for holding multiple cleaning cloths, cleaning pads, or other material.

FIG. 39 and FIG. 40 illustrate embodiments of a robotic cleaner according to an embodiment of the invention which include a loadable tray for holding multiple cleaning cloths, cleaning pads, or other material. The assembly in the drawings is integrated with a robot that includes a roller brush at the opposite end of the robot, but the mechanism may be used with other robot bodies. The cleaning cloth may be loaded into the robot in a variety of ways, which include but are not limited to loading the cleaning cloths or cleaning pads into the top of the loadable tray, or opening a cover over the loadable tray will allows the user to place the cleaning cloths or cleaning pads in the tray. In models of the robotic cleaner, dirty or used cleaning cloths and cleaning pads may be manually removed by the user, such as by pulling the bottom cleaning cloth or cleaning pad out from the side of the loadable tray, or pulling the cleaning cloth or cleaning pad out from the bottom of the robot, leaving a clean and fresh cleaning cloth or cleaning pad exposed and ready for use. In models of the robotic cleaner, a docking station for the robot may be available which the robot can automatically dock with, where the entry point for the robot into the docking station includes directional teeth or some type of gripping surface, where by the bottom cleaning pad is pulled off from the robot as the robot backs out of the dock, thus providing a means for automatically removing the cleaning cloth or cleaning pad.

Figure 41:
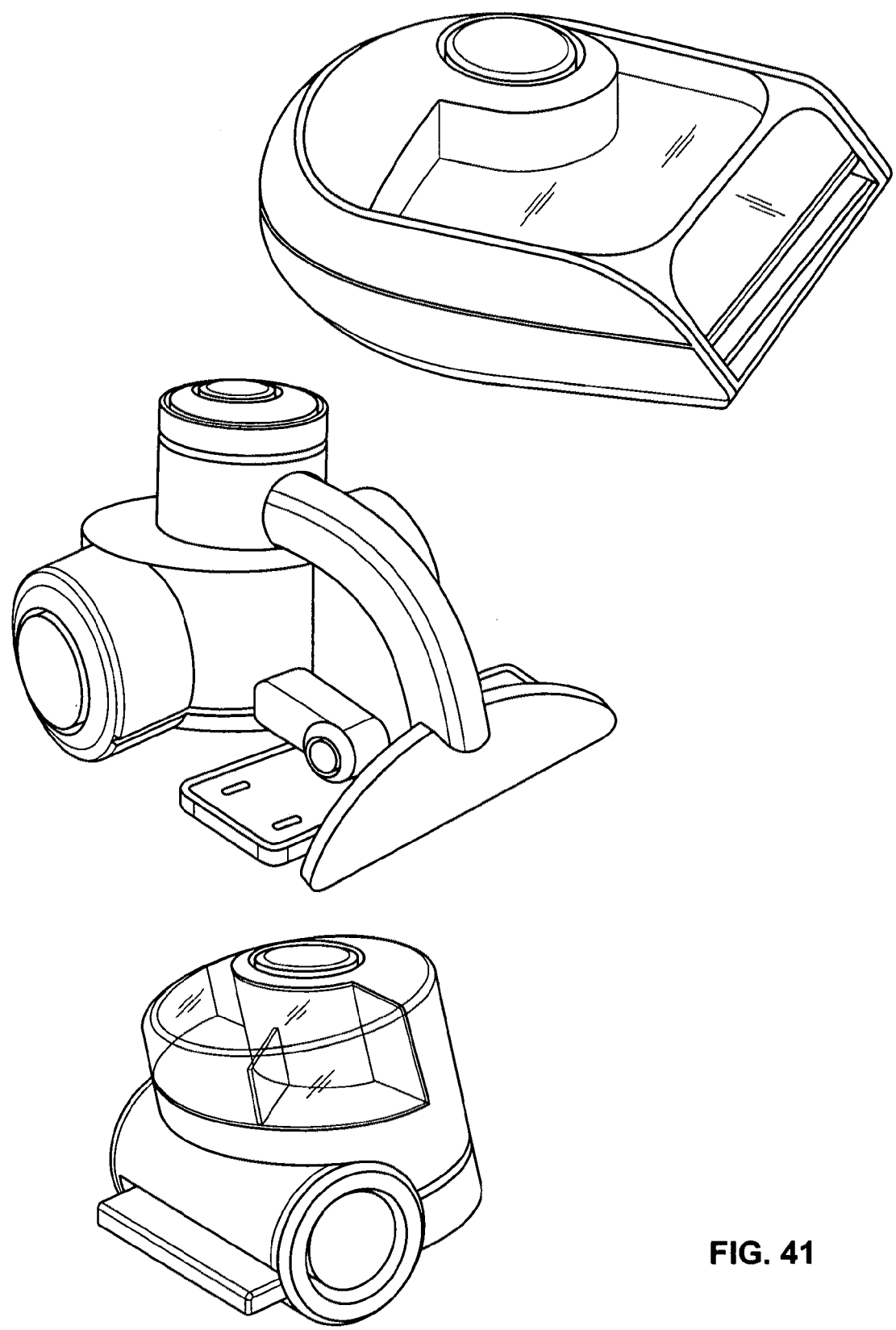
FIG. 41 illustrates embodiments of a robotic cleaner including a vacuum and collection bin in various configurations according to an embodiment of the invention.

FIG. 41 illustrates embodiments of a robotic cleaner according to an embodiment of the invention which include a vacuum and collection bin in various configurations. A cleaning pad is included in the design to provide behind the intake area of the vacuum to allow the pad to pick up dust, dirt and debris that the vacuum may have missed. In models of the robotic cleaner, the height of the robot may be extended to provide more space for the vacuum system, battery and bin space to provide better vacuum strength and or debris capacity. In models of the robotic cleaner, the collection bin is transparent to allow the user to easily see when the robot is reaching its maximum holding capacity and needs the bin needs to be emptied, without requiring the user to manually open and or remove the bin to check its status.

Figure 42:
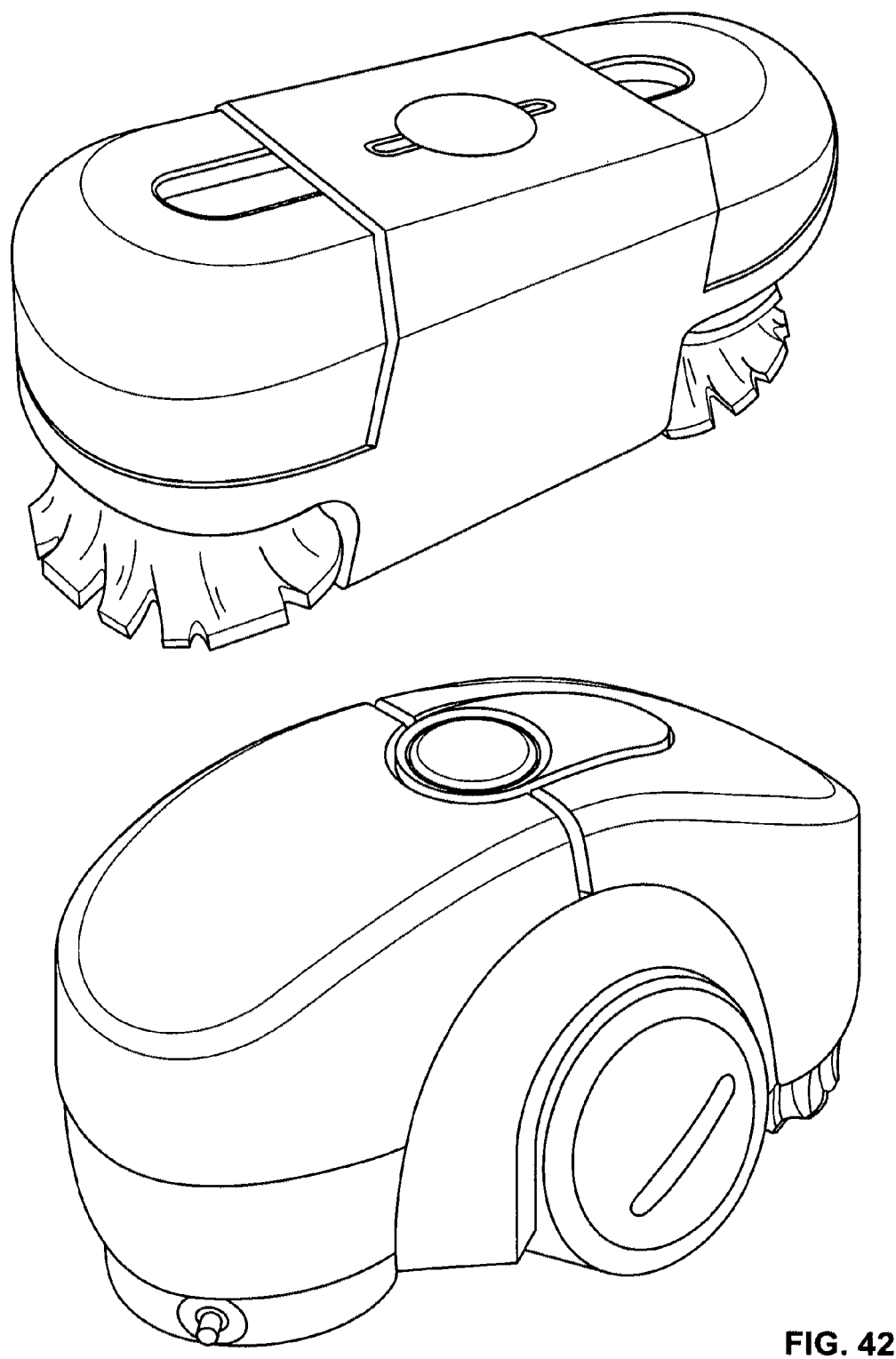
FIG. 42 illustrates embodiments of a robotic cleaner which use one or more vertically oriented scrubbing brushes mounted along the exterior of the robot according to an embodiment of the invention.
Figure 44:
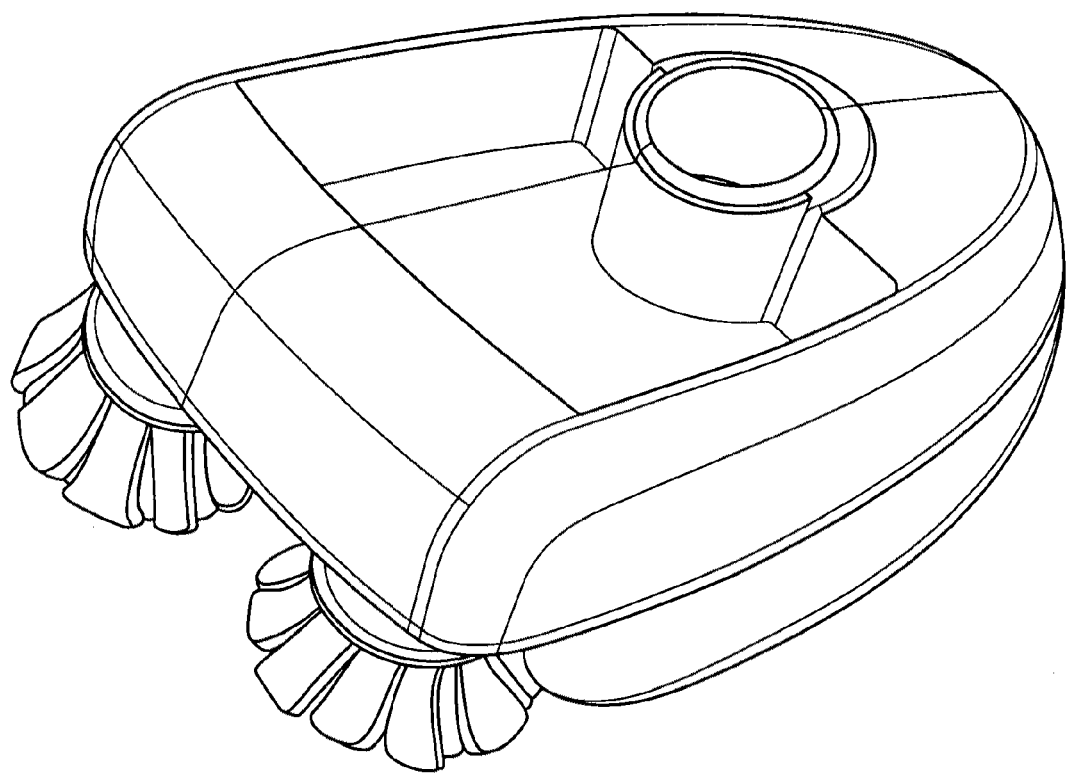
FIG. 44 illustrates embodiments of a robotic cleaner which use one or more vertically oriented scrubbing brushes mounted along the exterior of the robot according to an embodiment of the invention.
Figure 47:
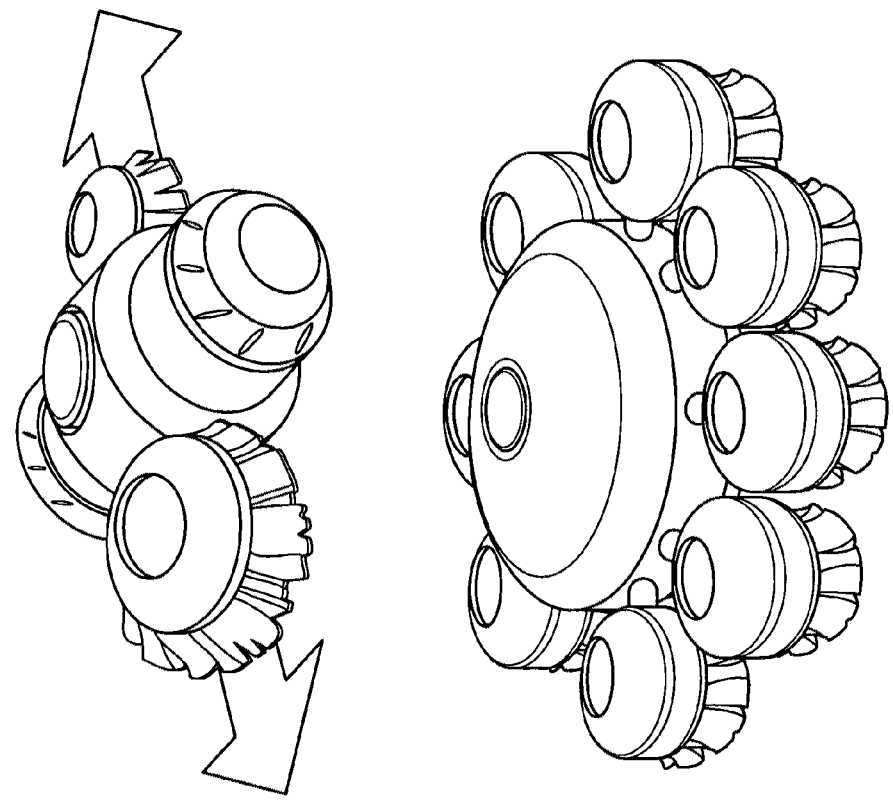
FIG. 47 illustrates various embodiments of a robotic cleaner which use one or more vertically oriented scrubbing brushes mounted along the exterior of the robot according to an embodiment of the invention.
Figure 47:
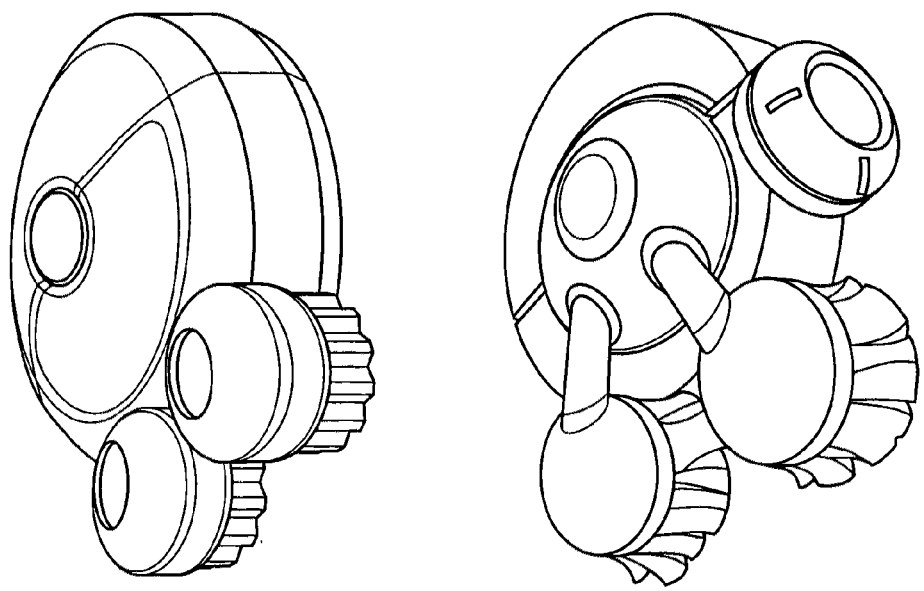
Figure 48:
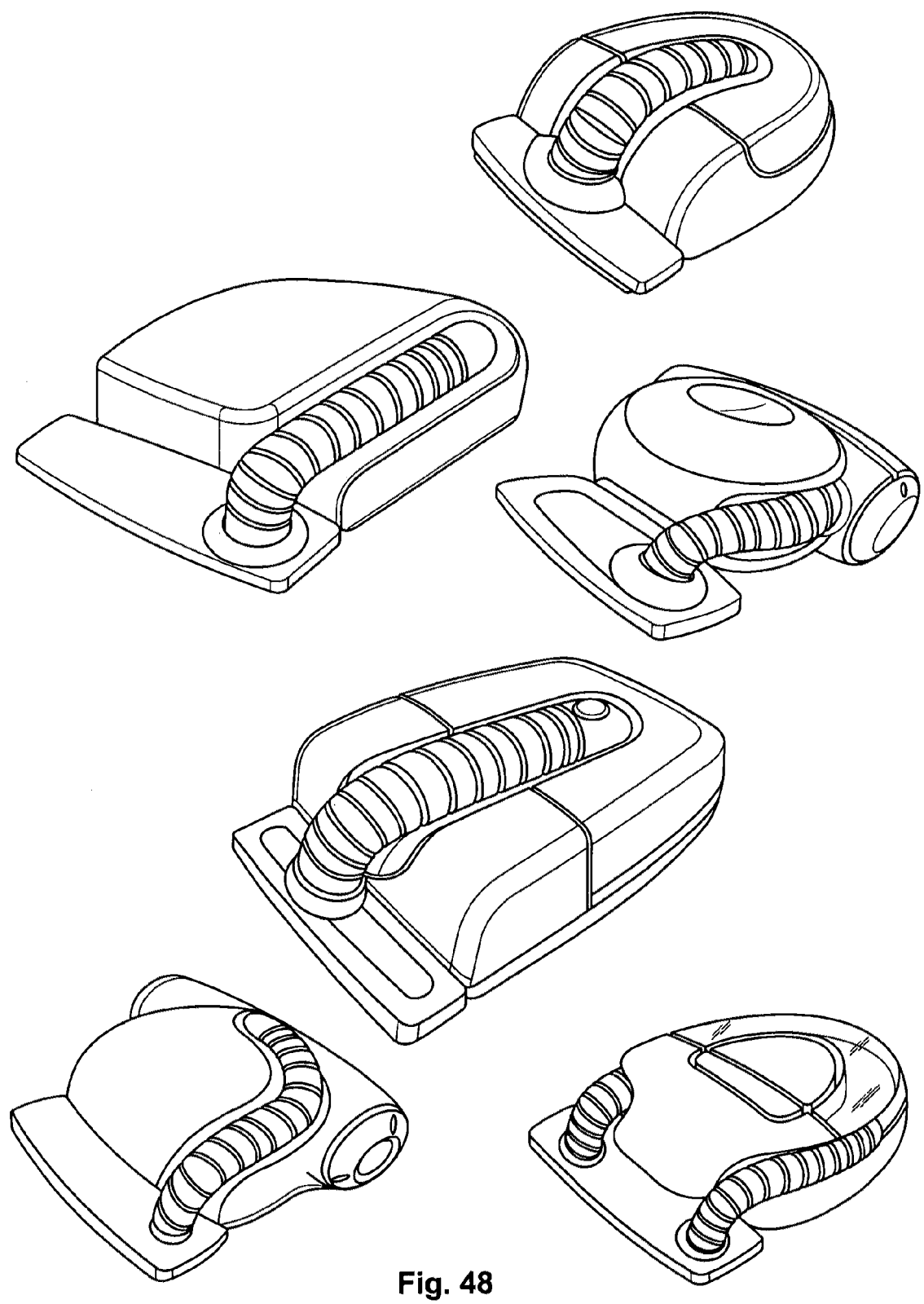
FIG. 48 illustrates additional embodiments of a robotic cleaner which use a vacuum as part of the cleaning mechanism according to an embodiment of the invention.

FIG. 42, FIG. 44, and FIG. 47 illustrate various embodiments of a robotic cleaner according to embodiment of the invention which use one or more vertically oriented scrubbing brushes mounted along the exterior of the robot. The robotic cleaner may include a bin for storing cleaning fluid which the robot dispenses for use with the scrubbing brush. The robotic cleaner may include a second container bin for storing spent cleaning fluid and dirt that has been taken up from the floor by another mechanism on the robot. In models of the robotic cleaner, different configurations of the brush and floor solutions may be used, such as having one brush scrub and one brush or rotating pad buff the floor. In models of the robotic cleaner, different solutions may be dispensed within or near the different brush mechanisms, such as a cleaning solution near the scrubbing brush and a waxing solution need the buffing brush or pad.

Figure 43:
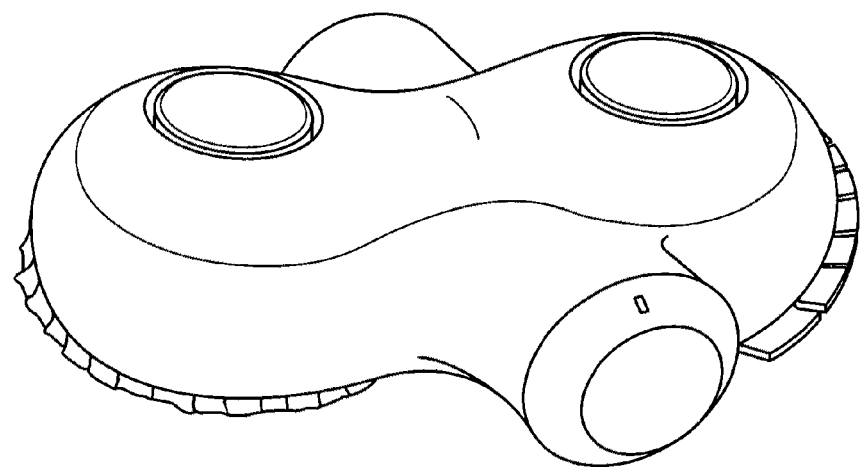
FIG. 43 illustrates embodiments of a robotic cleaner which includes a horizontally oriented rotating brush with a spraying nozzle above the brush that dispenses cleaning fluid in the area in front of the brush according to an embodiment of the invention.
Figure 43:
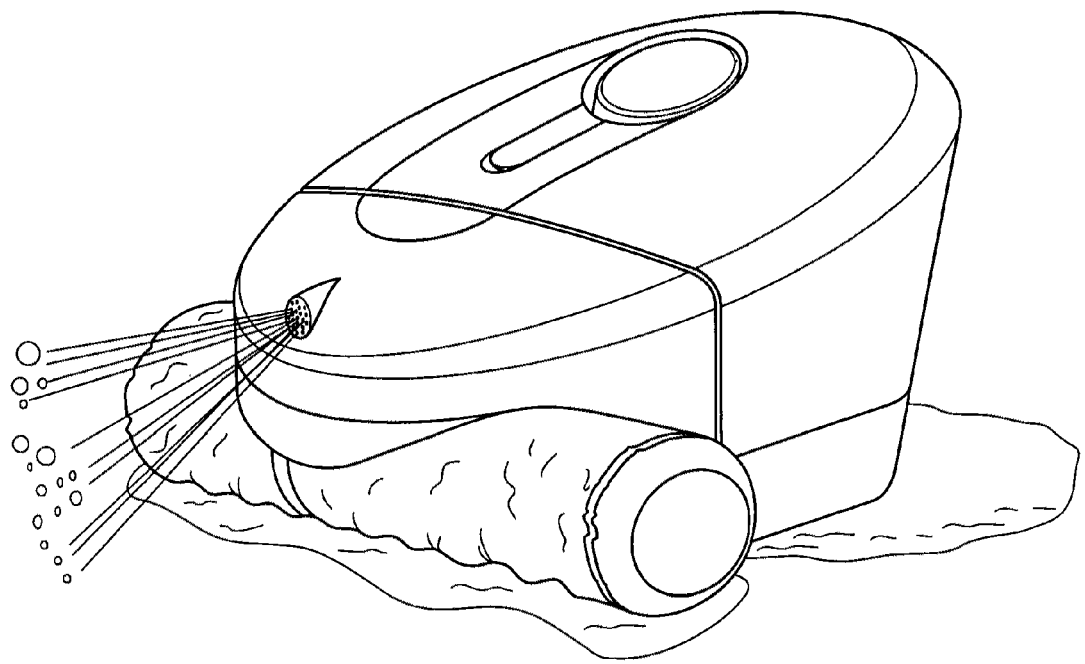

FIG. 43 illustrates embodiments of a robotic cleaner according to an embodiment of the invention which includes a horizontally oriented rotating brush with a spraying nozzle above the brush that dispenses cleaning fluid in the area in front of the brush. Models of this robotic cleaner may be programmed to drive to a certain point, and then back away a fixed distance before spraying to ensure the robot does not spray onto a wall or other surface of the floor, such as carpeting, which is near the cleaning area.

Figure 45:
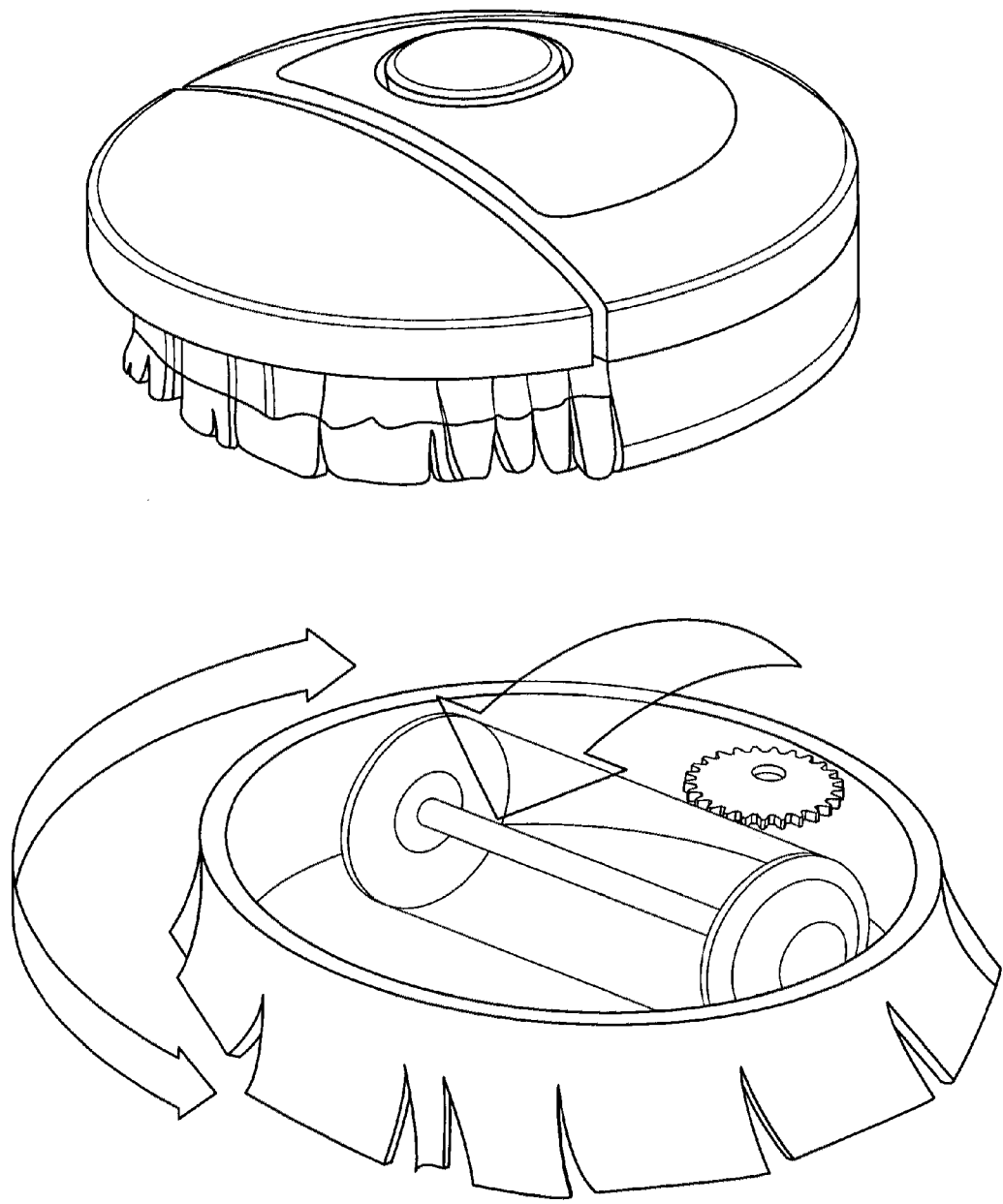
FIG. 45 illustrates an embodiment of a robotic cleaner where the robot is in a circular form and includes a vertically oriented circular brush that extends to the outer of perimeter of the robot as a ring and spins around the robot's center axis according to an embodiment of the invention.

FIG. 45 illustrates an embodiment of a robotic cleaner according to an embodiment of the invention where the robot is in a circular form and includes a vertically oriented circular brush that extends to the outer of perimeter of the robot as a ring and spins around the robot's center axis. To maximize the reach of the brush, the wheels and other mechanisms of the robot are placed within the ring of the brush. In models of the robotic cleaner, the brush may be exposed at all side edges, partially exposed as shown in FIG. 45, such as in the front of the robot, or fully covered by the shell of the robot. In models of the robotic cleaner, counter rotating brushes may be used, where one or more brushes are nested within the ring of another brush that travels in an opposite direction. In models of the robotic cleaner where part of the brush is exposed at the sides of the robot, the brushes may be angled in such away that they extend past the perimeter of the exterior robot shell and area able to make contact with side obstacles and walls to provide for side surface cleaning in addition to floor surface cleaning.

FIG. 47 illustrates embodiments of a robotic cleaner according to an embodiment of the invention in different configurations with exterior mounted vertically oriented scrubbing brushes. In models of the robotic cleaner, one or more of the scrubbing brush units may be detachable from the main robot body for independent use. This may include where the detachable brush unit has its own rechargeable battery which powers the brush function while detached from the main robot body. The batteries in the detachable brush unit may be able to charge from the main robot when connected to the main robot body, as well as may be able to be utilized by the main robot's power system when connected to the main robot body. A control interface between the detachable brush unit and the main robot body may allow the main robot to control the functions of the detachable brush unit while connected. In models of the robotic cleaner, the detachable brush may be designed for manual use, such as a hand held powered brush. In models of the robotic cleaner, the detachable brush unit may have its own control system for autonomous operation. To support autonomous operation, the detachable brush unit may also have its own means for locomotion, which may include but are not limited to: using the rotation of the cleaning brush to move the brush unit, using wheels nested within the cleaning brush unit to move and control the brush unit, and/or a combination of the two methods. In models of the robotic cleaner, the main robot body may emit a signal or set of signals that enable the detachable brush unit to navigate away from and return from the main robot body to detach and re-attached autonomously. In models of the robotic cleaner, the detachable brush unit may emit a signal or set of signals that enable the main robot body to determine the relative location of the detachable brush unit and remotely send commands to control the movement of the detachable brush unit. In alternative embodiments of the invention, similar systems may be used for a main robot to control one or more remote cleaning devices which may be configured with a variety of cleaning functions.

FIG. 37 illustrates embodiments of a robotic cleaner according to an embodiment of the invention which includes a cleaning pad that can hold a cleaning cloth, The vacuum hose may be mounted on the exterior of the robot, leading up to a forward air intake that is flush with the floor surface. Multiple hoses may be used to provide more even distribution of the suction over a cross section of the air intake. A cleaning pad, cleaning cloth or other cleaning material may or may not be used in combination with the vacuum function.

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (which may include volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A robotic cleaner for cleaning a surface with a cleaning cloth, the robotic cleaner comprising:
a main robot body comprising:
a drive system configured to drive the robotic cleaner in a forward direction toward the surface to be cleaned; and
a microcontroller configured to control the movement of the robotic cleaner;
a cleaning assembly connected at a front end of the main robot body whereby the cleaning assembly is in front of the main robot body when driven in the forward direction; wherein the cleaning assembly is configured to detachably hold the cleaning cloth; wherein the cleaning assembly comprises a cleaning pad configured to press the cleaning cloth against the surface to be cleaned; and
at least one drop sensor connected to the cleaning assembly, each drop sensor comprising a member configured to move a direction substantially perpendicular to the surface to be cleaned; wherein the member is configured to apply pressure to the cleaning cloth and to protrude outward with respect to the cleaning pad when at least a portion of the cleaning cloth losses contact with the surface to be cleaned.

2. The robotic cleaner of claim 1, wherein the cleaning assembly is characterized by a first width perpendicular to the forward direction of the robotic cleaner, wherein the main robot body is characterized by a second width perpendicular to the forward direction of the robotic cleaner, and wherein the first width is greater than the second width.

3. The robotic cleaner of claim 1, wherein the cleaning assembly is detachably connected to the main robot body.

4. The robotic cleaner of claim 3, further comprising a locking mechanism to lock the cleaning assembly to the main robot body.

5. The robotic cleaner of claim 1, further comprising an electrical interface coupling the cleaning assembly to the main robot body, the electrical interface configured to provide sensor data from the at least one drop sensor from the cleaning assembly to the main robot body.

6. The robotic cleaner of claim 1, wherein the main robot body comprises a drop sensor at a back end of the main robot body.

7. The robotic cleaner of claim 1, wherein the cleaning cloth is a dry cloth.

8. The robotic cleaner of claim 1, wherein the cleaning cloth is a wet cloth.

9. The robotic cleaner of claim 1, further comprising a current sensor coupled to the microcontroller and the drive system comprising a motor; wherein the microcontroller is configured to identify interference between the robotic cleaner and an obstacle based, in part, on changes in a current drawn by the motor.

10. The robotic cleaner of claim 1, further comprising a gyroscope coupled to the microcontroller; wherein the microcontroller is configured to identify interference between the robotic cleaner and an obstacle based, in part, on changes in orientation of the robotic cleaner sensed by the gyroscope.

11. The robotic cleaner of claim 1, further comprising an accelerometer coupled to the microcontroller; wherein the microcontroller is configured to identify interference between the robotic cleaner and an obstacle based, in part, on changes in velocity of the robotic cleaner sensed by the accelerometer.

12. The robotic cleaner of claim 1, further comprising at least one retractable bumper connected to the main robot body via the cleaning assembly, wherein the at least one retractable bumper is configured to:

extend in front of the cleaning cloth when not in contact with an obstacle, and retract behind the cleaning cloth when in contact with an obstacle.

13. The robotic cleaner of claim 1, wherein the microcontroller is configured to drive the robotic cleaner along a wall with the cleaning assembly maintaining pressure against the wall.

14. The robotic cleaner of claim 1, wherein the microcontroller is configured to drive the robotic cleaner perpendicular against a wall.

15. The robotic cleaner of claim 14, wherein the microcontroller is configured to:

rotate the robotic cleaner ninety degrees after driving the robotic cleaner perpendicular against the wall; and then drive the robotic cleaner parallel to the wall.

16. The robotic cleaner of claim 1, further comprising one or more light detectors; wherein the robotic cleaner is configured to:

determine its position in response to the light detectors; and navigate based on the determined position.

17. The robotic cleaner of claim 1, wherein the microcontroller is configured to automatically navigate to a docking station.

18. The robotic cleaner of claim 17, further configured to be charged at the docking station.

* * * * *